US012452956B2

(12) United States Patent
Kim et al.

(10) Patent No.: US 12,452,956 B2
(45) Date of Patent: Oct. 21, 2025

(54) METHOD AND APPARATUS FOR SUPPORTING RAPID CELL ACTIVATION IN CONNECTION RESUMPTION PROCEDURE IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Anil Agiwal, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/433,368

(22) Filed: Feb. 5, 2024

(65) Prior Publication Data
US 2024/0179803 A1   May 30, 2024

Related U.S. Application Data

(63) Continuation of application No. 16/863,894, filed on Apr. 30, 2020, now Pat. No. 11,895,737.

(30) Foreign Application Priority Data

May 2, 2019 (KR) .................. 10-2019-0051759
May 10, 2019 (KR) .................. 10-2019-0054904
Aug. 9, 2019 (KR) .................. 10-2019-0097446

(51) Int. Cl.
*H04W 80/08* (2009.01)
*H04W 12/10* (2021.01)
(Continued)

(52) U.S. Cl.
CPC .......... *H04W 80/08* (2013.01); *H04W 12/10* (2013.01); *H04W 28/06* (2013.01); *H04W 76/19* (2018.02); *H04W 76/27* (2018.02); *H04W 76/30* (2018.02)

(58) Field of Classification Search
CPC ... H04W 12/03; H04W 12/10; H04W 12/106; H04W 28/06; H04W 76/19; H04W 76/27
See application file for complete search history.

(56) References Cited

U.S. PATENT DOCUMENTS

| 9,414,223 B2 | 8/2016 | Ginzboorg |
| 2016/0006748 A1 | 1/2016 | Yi et al. |

(Continued)

FOREIGN PATENT DOCUMENTS

| CN | 107211015 A | 9/2017 |
| CN | 110022224 A | 7/2019 |

(Continued)

OTHER PUBLICATIONS

Intellectual Property India, "Examination Report under sections 12 & 13 of the Patents Act," dated Feb. 7, 2023, in connection with Indian Patent Application No. 202137054195, 7 pages.

(Continued)

*Primary Examiner* — Zhensheng Zhang

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In addition, a method of a terminal in a radio communication system according to the disclosure includes:

(Continued)

performing, by a packet data convergence protocol (PDCP) entity of the terminal, deciphering and integrity verification of first data; if the integrity verification of the first data fails, indicating a failure of the integrity verification to an upper layer; and discarding the first data and considering that the first data has not been received.

16 Claims, 20 Drawing Sheets

(51) Int. Cl.
  *H04W 28/06* (2009.01)
  *H04W 76/19* (2018.01)
  *H04W 76/27* (2018.01)
  *H04W 76/30* (2018.01)

(56) References Cited

U.S. PATENT DOCUMENTS

| | | |
|---|---|---|
| 2016/0066203 A1 | 3/2016 | Yoon |
| 2016/0302075 A1 | 10/2016 | Dudda et al. |
| 2017/0105162 A1* | 4/2017 | Kim .................. H04L 5/14 |
| 2018/0316690 A1 | 11/2018 | Cho et al. |
| 2018/0359800 A1* | 12/2018 | Wu .................. H04W 76/15 |
| 2018/0368018 A1 | 12/2018 | Kim et al. |
| 2019/0014614 A1* | 1/2019 | Chang ............... H04W 76/19 |
| 2019/0053324 A1* | 2/2019 | Tseng ............... H04W 76/30 |
| 2019/0123908 A1 | 4/2019 | Morita et al. |
| 2019/0313333 A1 | 10/2019 | Kim et al. |
| 2020/0205123 A1* | 6/2020 | Byun ............... H04W 76/27 |
| 2021/0051734 A1* | 2/2021 | Chang ............ H04W 74/0833 |
| 2021/0099883 A1 | 4/2021 | Jo et al. |

FOREIGN PATENT DOCUMENTS

| | | |
|---|---|---|
| KR | 20190116885 A | 10/2019 |
| WO | 2009049570 A1 | 4/2009 |
| WO | 2016208950 A1 | 12/2016 |
| WO | 2019041761 A1 | 3/2019 |

OTHER PUBLICATIONS

Qualcomm et al., "Correction to NR PDCP Test case 7.1.3.5.4," 3GPP TSG-RAN5, Meeting #83 R5-xxxxx, Athens, Greece, Feb. 25-Mar. 1, 2019, 6 pages.
European Patent Office, "Supplementary European Search Report" issued May 3, 2022, in connection with European Patent Application No. 20799217.3, 10 pages.
3GPP TS 36.323 V15.3.0 (Mar. 2019), Technical Specification, 3rd Generation Partnership Project; Technical Specification Group Radio Access Network; Evolved Universal Terrestrial Radio Access (E-UTRA); Packet Data Convergence Protocol (PDCP) specification (Release 15), Mar. 2019, 52 pages.
International Search Report in connection with International Application No. PCT/KR2020/005876 dated Aug. 6, 2020, 3 pages.
Communication pursuant to Article 94(3) EPC dated Oct. 31, 2023, in connection with European Patent Application No. 20799217.3, 5 pages.
Office Action dated Nov. 25, 2023, in connection with Chinese Patent Application No. 202080038229.8, 14 pages.
Communication pursuant to Article 94(3) EPC dated Jul. 31, 2024, in connection with European Patent Application No. 20799217.3, 4 pages.
Hearing Adjournment Notice issued Aug. 30, 2024, in connection with Indian Patent Application No. 202137054195, 2 pages.
Office Action dated Mar. 17, 2025 in connection to KR Application No. 10-2019-0097446, 12 pages.

\* cited by examiner

METHOD AND APPARATUS FOR SUPPORTING RAPID CELL ACTIVATION IN CONNECTION RESUMPTION PROCEDURE IN NEXT GENERATION MOBILE COMMUNICATION SYSTEM

CROSS-REFERENCE TO RELATED APPLICATIONS

This application is a continuation of application Ser. No. 16/863,894 filed Apr. 30, 2020, now U.S. Pat. No. 11,895,737, which is based on and claims priority under 35 U.S.C. § 119 to Korean Patent Application No. 10-2019-0051759 filed on May 2, 2019, Korean Patent Application No. 10-2019-0054904 filed on May 10, 2019, and Korean Patent Application No. 10-2019-0097446 filed on Aug. 9, 2019 in the Korean Intellectual Property Office, the disclosures of which are herein incorporated by reference in their entirety.

BACKGROUND

1. Field

The disclosure relates to a method and an apparatus for supporting rapid cell activation in a connection resumption procedure in a next generation mobile communication system.

In addition, the disclosure relates to a method and an apparatus for efficient received data processing of a packet data convergence protocol (PDCP) entity (PDCP layer) in a next generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology. The above information is presented as background information only to assist with an understanding of the disclosure. No determination has been made, and no assertion is made, as to whether any of the above might be applicable as prior art with regard to the disclosure.

SUMMARY

In order to support a service having a high data transmission rate and a low transmission delay in a next generation mobile communication system, a base station is required to rapidly configure, for a terminal, a carrier aggregation (CA) technology or a dual connectivity (DC) technology. However, a frequency measurement result of a terminal is required to configure the technologies for a terminal. Accordingly, a method which may rapidly receive a report for a frequency measurement result of a terminal is required. In addition, in case that a base station shifts an RRC connected mode terminal to an RRC inactive mode for a designated reason, the terminal and the base station require a technology for storing configuration information on PCells or SCells for a carrier aggregation technology or configuration information on a master cell group (MCG) (PCells or SCells) or configuration information on a secondary cell group (SCG) (PSCells or SCells) for a dual connectivity technology, and rapidly activating the carrier aggregation technology or the dual connectivity technology in an RRC connection resumption procedure.

In addition, a function of enhancing security so as to prevent a data error according to a channel environment and an external attack when a terminal and a base station transmit or receive data in a next generation mobile communication system may be implemented in a PDCP entity (PDCP layer). Accordingly, a reception operation of a PDCP entity (PDCP layer) should be efficiently designed in accordance with the enhancement of security.

The disclosure for solving the above-described problem relates to a method of a terminal in a radio communication system, the method including: performing, by a PDCP entity of the terminal, deciphering and integrity verification for first data; in case that the integrity verification for the first data fails, indicating a failure of the integrity verification to an upper layer; and discarding the first data and considering that the first data has not been received.

In addition, the disclosure for solving the above-described problem relates to a method of a base station in a radio communication system, the method including: performing, by a PDCP entity of the base station, deciphering and integrity verification for received first data; in case that the integrity verification for the first data fails, indicating a failure of the integrity verification to an upper layer; and discarding the first data and considering that the first data has not been received.

Moreover, the disclosure for solving the above-described problem relates to a terminal in a radio communication system, the terminal including: a transceiver; and a controller, wherein the controller is configured to: perform, by a PDCP entity of the terminal, deciphering and integrity verification for received first data; in case that the integrity verification for the first data fails, indicate a failure of the integrity verification to an upper layer; and discard the first data and consider that the first data has not been received.

Furthermore, the disclosure for solving the above-described problem relates to a base station in a radio communication system, the base station including: a transceiver; and a controller, wherein the controller is configured to: perform, by a PDCP entity of the base station, deciphering and integrity verification for received first data; in case that the integrity verification for the first data fails, indicate a failure of the integrity verification to an upper layer; and discard the first data and consider that the first data has not been received.

The disclosure proposes a method in which, in a next generation mobile communication system, an RRC idle mode or RRC inactive mode terminal may rapidly report a periphery frequency measurement result to a base station, such that the base station may rapidly configure, for the terminal, a carrier aggregation technology or a dual connectivity technology. Specifically, before a terminal configures connection with a network, the terminal may perform, based on preconfigured frequency configuration information, frequency measurement, and, as soon as connection with the network is configured, the terminal may report a frequency measurement result, such that a carrier aggregation (CA) technology or a dual connectivity (DC) technology may be rapidly configured for the terminal.

In addition, the disclosure specifically proposes methods in which, in case that a base station shifts an RRC connected mode terminal to an RRC inactive mode for a designated reason, the terminal and the base station may store configuration information on PCells or SCells for a carrier aggregation technology or configuration information on an MCG (PCells or SCells) or configuration information on an SCG (PSCells or SCells) for a dual connectivity technology and the carrier aggregation technology or the dual connectivity technology may be rapidly activated in an RRC connection resumption procedure by using, without discarding, the pieces of configuration information in the RRC connection resumption procedure, such that a signaling overhead may be reduced and a data transmission rate may be increased to be more rapid.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2I illustrates the structure of a terminal or a radio node to which embodiments are applicable.

DETAILED DESCRIPTION

Figure 1A:
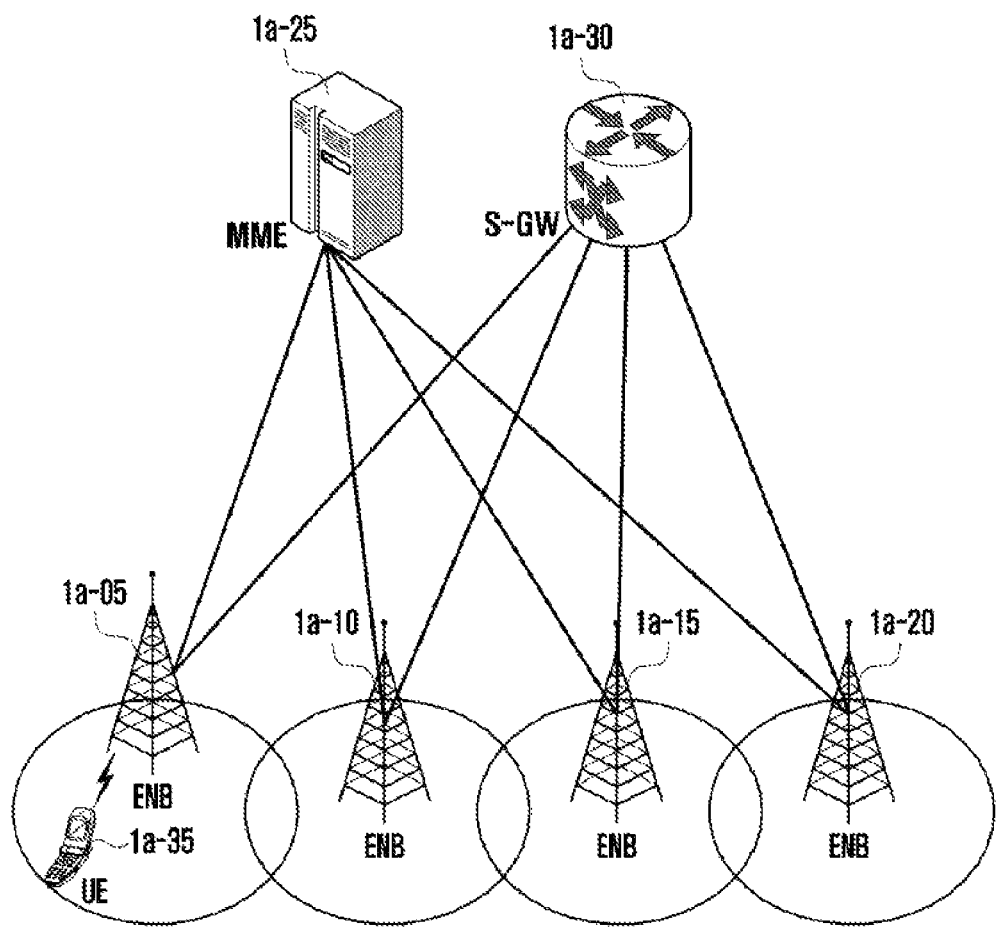
FIG. 1A illustrates a view of the structure of an LTE system to which the disclosure is applicable.

FIGS. 1A through 2J, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In describing embodiments of the disclosure, descriptions related to technical contents well-known in the art and not associated directly with the disclosure will be omitted. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

The disclosure proposes a method in which an RRC inactive mode terminal may perform frequency measurement before configuring RRC connection with a network and may rapidly report a frequency measurement result when configuring RRC connection or after configuring RRC connection, such that a base station may rapidly configure, for the terminal, a carrier aggregation (CA) technology or a dual connectivity (DC) technology.

In the disclosure, a terminal, for which a carrier aggregation (CA) technology or a dual connectivity (DC) technology is configured, is considered, and a proposed method is specified using the following terms.

Primary cell (PCell): means a serving cell used when a terminal firstly configures connection with a base station, and may configure connection by transmitting or receiving a major RRC message by using the PCell. In addition, since a PCell always has a PUCCH transmission resource, the PCell may indicate HARQ ACK or NACK, may always have both an uplink and a downlink that are configured, and may be used as a reference cell for timing adjustment (timing advance, a primary timing advance group (pTAG)). For example, in case that an SCell is added as a carrier aggregation technology is configured after a PCell is configured, the SCell may perform uplink data transmission with reference to a timing adjustment value of the PCell. Moreover, in case that a dual connectivity technology is configured, a PCell may mean a PCell of an MCG.

MCG: means a group of cells supported in a base station or serving cells for which a terminal firstly configures connection with the base station, and in case that a dual connectivity technology is configured, major RRC messages are transmitted or received through an MCG.

Secondary cell group (SCG): After a terminal configures connection with a base station, the terminal may add cells of another base station in addition to an MCG, wherein a group of the cells supported in the other base station means an SCG, and in case that a dual connectivity technology is configured, an SCG may be added to increase a data transmission rate or to efficiently support mobility of a terminal.

Primary secondary cell (PSCell): When a terminal configures connection with a base station and adds a group of cells of another base station in addition to an MCG and a dual connectivity technology is configured, a cell corresponding to a PCell in an SCG is referred to as a PSCell.

Secondary cell (SCell): A cell additionally configured by a base station to configure a carrier aggregation technology after a terminal firstly configures connection with the base station is referred to as an SCell. The SCell may have a PUCCH transmission resource according to configuration of a base station, may have both an uplink or a downlink configured according to configuration of a base station, and may be used as a reference cell for timing adjustment (timing advance, a secondary timing advance group (sTAG)) according to configuration of a base station. For example, in case that SCells are added and an sTAG is configured as a carrier aggregation technology is configured after a PCell is configured, other SCells of the sTAG may perform uplink data transmission with reference to a timing adjustment value of a designated SCell. In addition, in case that a dual connectivity technology is configured for a terminal, an SCell may mean an SCell except for a PCell of an MCG or an SCell except for a PSCell of an SCG.

The disclosure proposes methods in which, when a base station applies a carrier aggregation technology or a dual connectivity technology to a terminal, the carrier aggregation technology or the dual connectivity technology may be rapidly activated.

For example, a base station may configure, for a terminal, frequency configuration information as an RRCRelease message together with a state shift indicator (for example, indication of a shift to an RRC idle mode or indication of a shift to an RRC inactive mode (for example, suspendconfig)) so as to allow frequency measurement to be performed in an RRC idle mode or an RRC inactive mode, or may transmit the frequency configuration information through system information. A terminal may receive the frequency configuration information to perform frequency measurement in an RRC idle mode or an RRC inactive mode, and may later configure or resume connection with a network to report a frequency measurement result to the base station at the time of a shift to an RRC connected mode, such that the base station may rapidly configure or activate, based on the frequency measurement result, a carrier aggregation technology or a dual connectivity technology.

In addition, the disclosure proposes a short cycle-based channel measurement reporting (short CSI reporting) method at the time of activating a PCell, an SCell, or a PSCell by configuration of an MAC CE or RRC message, such that a terminal may rapidly report, to a base station, channel measurement in a short cycle for the activated PCell, SCell, or PSCell and thus allow the base station to rapidly assign, based thereon, a transmission resource to the terminal, and data transmission/reception may rapidly start. Configuring, for a terminal by a base station, a channel measurement report having a short cycle (for example, configuration using an RRCReconfiguration, RRCResume, or RRCSetup message) may mean that the base station temporarily or continuously transmits a signal having a short cycle according to a period configured for the terminal. That is, the base station may temporarily or continuously transmit the short cycle signal for channel measurement and configure and notify the short cycle to the terminal, and thus the terminal may measure the signal for channel measurement and report the measurement to the base station. The base station may also configure an uplink transmission resource or cycle or a cyclic transmission resource by which the terminal reports a signal or channel measurement result.

Configuration information for the short cycle-based channel measurement reporting method may be configured by a base station via an RRC message. At this time, the configuration information may be configured to include at least one piece of information from among: a measurement cycle of measuring a channel; a transmission resource (for example, a PUCCH transmission resource, a specific sub-frame number which may report a transmission resource, or the like) for reporting a measurement result; frequency information to be measured; a signal intensity critical value which may be determined by a cell identifier or a valid measurement result (for example, the intensity of a signal, which is larger than a critical value, may be determined as a valid measurement result); a measurement method; or when a time point at which the RRC message is performed is n (for example, a sub-frame n), the value of X and the value of Y (for example, a sub-frame, a TTI, or a symbol unit) for performing, based on a short cycle, a frequency channel measurement report between n+X and n+Y.

In addition, in the disclosure, a base station may directly configure an active, inactive, or idle state of an SCell or a PSCell via an RRC message.

Moreover, in the disclosure, PCell, SCell, or PSCell configuration information, which has been configured for an RRC connected mode terminal, may be stored as terminal context information when the terminal shifts to an RRC inactive mode. In addition, in the disclosure, when the terminal later starts an RRC connection resumption procedure to configure connection with a network, the PCell, SCell, or PSCell configuration information may be used, without being discarded, for rapid serving cell activation, rapid carrier aggregation technology activation, or rapid dual connectivity technology activation. When the terminal transmits an RRCRelease message for indicating a shift to an RRC inactive mode, the base station may provide, to the terminal, indication of an indicator for indicating whether to discard or store, by the terminal, each piece of the PCell, SCell, or PSCell configuration information.

For example, if the RRCRelease message does not have an indicator for PCell, SCell, or PSCell configuration information, a terminal may discard the PCell, SCell, or PSCell configuration information when the RRCRelease message is received or when an RRC connection resumption procedure is performed later.

In addition, if the RRCRelease message includes only an indicator for PCell configuration information, a terminal may store only configuration information about the PCell configuration information from among PCell, SCell, or PSCell configuration information, and may discard the other configuration information when the terminal receives the RRCRelease message or when an RRC connection resumption procedure is performed later.

Moreover, if the RRCRelease message includes only an indicator for SCell configuration information, a terminal may store only configuration information about the SCell configuration information from among PCell, SCell, or PSCell configuration information, and may discard the other configuration information when the terminal receives the RRCRelease message or when an RRC connection resumption procedure is performed later.

Furthermore, if the RRCRelease message includes only an indicator for MCG configuration information, a terminal may store only configuration information about the MCG (PCell or SCell) configuration information from among PCell, SCell, or PSCell configuration information, and may discard the other configuration information when the terminal receives the RRCRelease message or when an RRC connection resumption procedure is performed later.

In addition, if the RRCRelease message includes only an indicator for SCG configuration information, a terminal may store only configuration information about the SCG (PSCell or SCell) configuration information from among PCell, SCell, or PSCell configuration information, and may discard the other configuration information when the terminal receives the RRCRelease message or when an RRC connection resumption procedure is performed later.

Moreover, if the RRCRelease message includes an indicator for MCG and SCG configuration information, a terminal may store configuration information about the MCG (PCell or SCell) and SCG configuration information from among PCell, SCell, or PSCell configuration information. Information stored by indication by the indicator of the RRCRelease message is not discarded by a terminal or a base station when an RRC connection resumption procedure is performed.

As another method, when the RRCRelease is received, a terminal may store all of PCell, SCell, or PSCell configuration information. Even when the terminal starts an RRC connection resumption procedure, all of the information is not discarded. In addition, as proposed in the above-described RRCRelease message, when the terminal performs the RRC connection resumption procedure and receives an RRCRelease message from a base station, an indicator for each piece of the PCell, SCell, or PSCell configuration information may be defined for the RRCRelease message to determine whether or not to discard the PCell, SCell, or PSCell configuration information and to indicate a change in partial configuration information, and a new indicator (for example, fullconfig) may be used to discard all of existing configuration information and indicate completely new configuration.

In addition, in the disclosure, as described above, when a terminal stores PCell, SCell, or PSCell configuration information and uses the configuration information for an RRC connection resumption procedure, a base station may directly configure an active state for an SCell or a PSCell by an RRCResume message, such that a carrier aggregation technology or a dual connectivity technology may be rapidly configured or activated. When the RRCResume message is received, in case that an active state for an SCell or a PSCell is indicated by the RRCResume message, a terminal may use the short cycle-based channel measurement reporting method proposed by the disclosure. Moreover, when the RRCResume message is received, a terminal may also apply the short cycle-based channel measurement reporting method to a serving cell, that is, a PCell.

Moreover, in the disclosure, when a PCell, an SCell, a PSCell, or a partial bandwidth configured for the cell (the PCell, the SCell, or the PSCell) is either activated by configuration of an MAC CE or RRC message, triggered by L1 signaling (for example, downlink control information (DCI) of a PDCCH), or provided with indication of partial bandwidth switching, a short cycle-based channel measurement reporting (short channel state information (CSI) reporting or short channel quality information (CQI) reporting) method is proposed, and thus a terminal may rapidly perform a channel measurement report to a base station, the channel measurement report being based on a short cycle with respect to the activated PCell, SCell, PSCell, or partial bandwidth configured for the cell. Accordingly, a base station may rapidly assign, based thereon, a transmission resource to the terminal and data transmission/reception may rapidly start.

As another method, when the cell or the partial bandwidth is activated, not only applied is a short cycle-based channel measurement reporting method, but also a new state (for example, an idle state) is defined for the cell or the partial bandwidth. Accordingly, the cell or the partial bandwidth may be managed after a shift to the new state, such that, as in an inactive state, a channel measurement report is continuously performed although a PDCCH is not read. For each of cells, a base station may configure, for a terminal via an RRC message, or indicate, to the terminal via a partial bandwidth identifier, the partial bandwidth for supporting the idle state, and switching, for each of cells, a partial bandwidth to the separate idle state-supporting partial bandwidth may be indicated to a terminal by a base station by using L1 signaling (DCI of a PDCCH) or an MAC CE or RRC message. Accordingly, rapid activation of the cells and rapid data transmission/reception may be supported.

As another method, a base station may indicate, by using L1 signaling (DCI of a PDCCH) or an MAC CE or RRC message, whether or not a terminal should perform PDCCH monitoring for each of cells, and may prevent the terminal from unnecessarily reading a PDCCH for all of cells (a PCell, an SCell, or a PSCell), such that a battery of the terminal may be saved.

As another method, a base station may indicate, via L1 signaling (DCI of a PDCCH) or an MAC CE or RRC message, whether or not a terminal should perform a channel measurement report for each of cells, and may allow the terminal to perform, even in an inactive state, a channel measurement report to an indicated cell (a PCell, an SCell, or a PSCell), such that rapid activation or rapid data transmission/reception may be supported for each of cells.

FIG. 1A illustrates a view of the structure of an LTE system to which the disclosure is applicable.

Referring to FIG. 1A, as illustrated therein, a radio access network of an LTE system is composed of a next generation base station (an evolved node B, hereinafter, an ENB, a node B, or a base station) 1A-05, 1A-10, 1A-15, or 1A-20, a mobility management entity (MME) 1A-25, and a serving-gateway (S-GW) 1A-30. User equipment (hereinafter, UE or a terminal) 1A-35 accesses an external network through ENBs 1A-05 to 1A-20 and an S-GW 1A-30.

In FIG. 1A, ENBs 1A-05 to 1A-20 correspond to an existing node B of a UMTS system. An ENB is connected to UE 1A-35 through a radio channel and performs a more complicated role than that of an existing node B. Since in an LTE system, all user traffics as well as a real time service such as voice over IP (VoIP) using an Internet protocol are serviced through a shared channel, a device for performing scheduling by gathering state information such as buffer states, available transmission power states, and channel states of pieces of UE is required, and ENBs 1A-05 to 1A-20 serves as the device. One ENB generally controls multiple cells. For example, in order to implement a transmission speed of 100 Mbps. An LTE system uses, as a radio access technology, an orthogonal frequency division multiplexing (hereinafter, referred to as OFDM) scheme, for example, in a bandwidth of 20 MHz. In addition, an adaptive modulation & coding (hereinafter, referred to as AMC) scheme for determining a modulation scheme and a channel coding rate according to a channel state of a terminal is applied. An S-GW 1A-30 is a device for providing a data bearer and produces or removes a data bearer according to a control of an MME 1A-25. An MME is a device in charge of multiple control functions as well as a mobility management function for a terminal and is connected to multiple base stations.

Figure 1B:
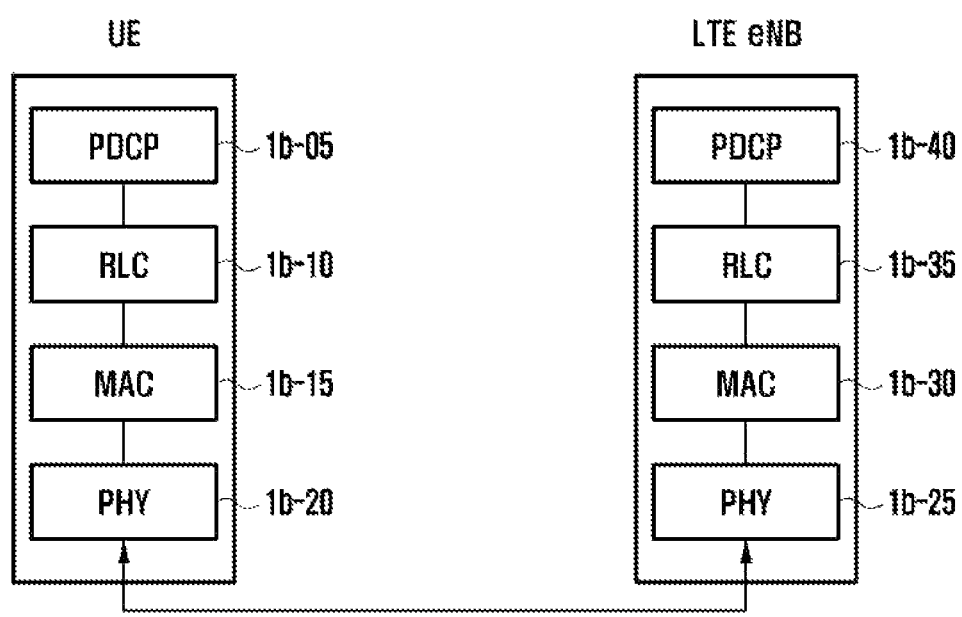
FIG. 1B illustrates a view showing a radio protocol structure in an LTE system to which the disclosure is applicable.

FIG. 1B illustrates a view showing a radio protocol structure in an LTE system to which the disclosure is applicable.

Referring to FIG. 1B, a radio protocol of an LTE system is composed of, in each of a terminal and an ENB, a packet data convergence protocol (PDCP) 1B-05 or 1B-40, a radio link control (RLC) 1B-10 or 1B-35, and a medium access control (MAC) 1B-15 or 1B-30. A packet data convergence protocol (PDCP) 1B-05 or 1B-40 is in charge of an operation such as IP header compression/restoration. The major functions of a PDCP are summarized as follows.

- Header compression and decompression function (header compression and decompression: ROHC only).
- User data transmission function (transfer of user data)
- Sequential delivery function (in-sequence delivery of upper layer PDUs at PDCP re-establishment procedure for RLC AM).
- Sequence rearrangement function (for split bearers in DC (only support for RLC AM): PDCP PDU routing for transmission and PDCP PDU reordering for reception)
- Overlap detection function (duplicate detection of lower layer SDUs at PDCP re-establishment procedure for RLC AM).
- Retransmission function (retransmission of PDCP SDUs at handover and, for split bearers in DC, of PDCP PDUs at PDCP data-recovery procedure, for RLC AM).
- Ciphering and deciphering function.
- Timer-based SDU removal function (timer-based SDU discard in uplink).

A radio link control (hereinafter, referred to as RLC) 1B-10 or 1B-35 reconfigures a PDCP packet data unit (PDU) to have an appropriate size and performs an ARQ operation or the like. The major functions of an RLC are summarized as follows.

- Data transmission function (transfer of upper layer PDUs).
- ARQ function (error correction through ARQ (only for AM data transfer)).
- Concatenation, segmentation and reassembly function (concatenation, segmentation and reassembly of RLC SDUs (only for UM and AM data transfer)).
- Re-segmentation function (re-segmentation of RLC data PDUs (only for AM data transfer)).
- Sequence rearrangement function (reordering of RLC data PDUs (only for UM and AM data transfer)).
- Overlap detection function (duplicate detection (only for UM and AM data transfer)).
- Error detection function (protocol error detection (only for AM data transfer)).
- RLC SDU removal function (RLC SDU discard (only for UM and AM data transfer)).
- RLC re-establishment function.

An MAC 1B-15 or 1B-30 is connected to multiple RLC entity (or RLC layer) configured in one terminal and performs an operation of multiplexing RLC PDUs to an MAC PDU and demultiplexing the RLC PDUs from the MAC PDU. The major functions of an MAC are summarized as follows.

- Mapping function (mapping between logical channels and transport channels).
- Multiplexing and demultiplexing function (multiplexing/demultiplexing of MAC SDUs belonging to one or different logical channels into/from transport blocks (TB) delivered to/from the physical layer on transport channels).
- Scheduling information reporting function.
- HARQ function (error correction through HARQ)
- Function of adjusting priority between logical channels (priority handling between logical channels of one UE).
- Function of adjusting priority between terminals (priority handling between pieces of UE by means of dynamic scheduling).
- MBMS service identification function.
- Transmission format selection function (transport format selection)
- Padding function.

A physical layer 1B-20 or 1B-25 performs an operation of performing channel coding and modulation on higher layer data to make an OFDM symbol therefrom and transmitting the OFDM symbol to a radio channel or an operation of performing demodulation and channel decoding on an OFDM symbol received through a radio channel and delivering the demodulated and channel-decoded symbol to a higher layer.

Figure 1C:
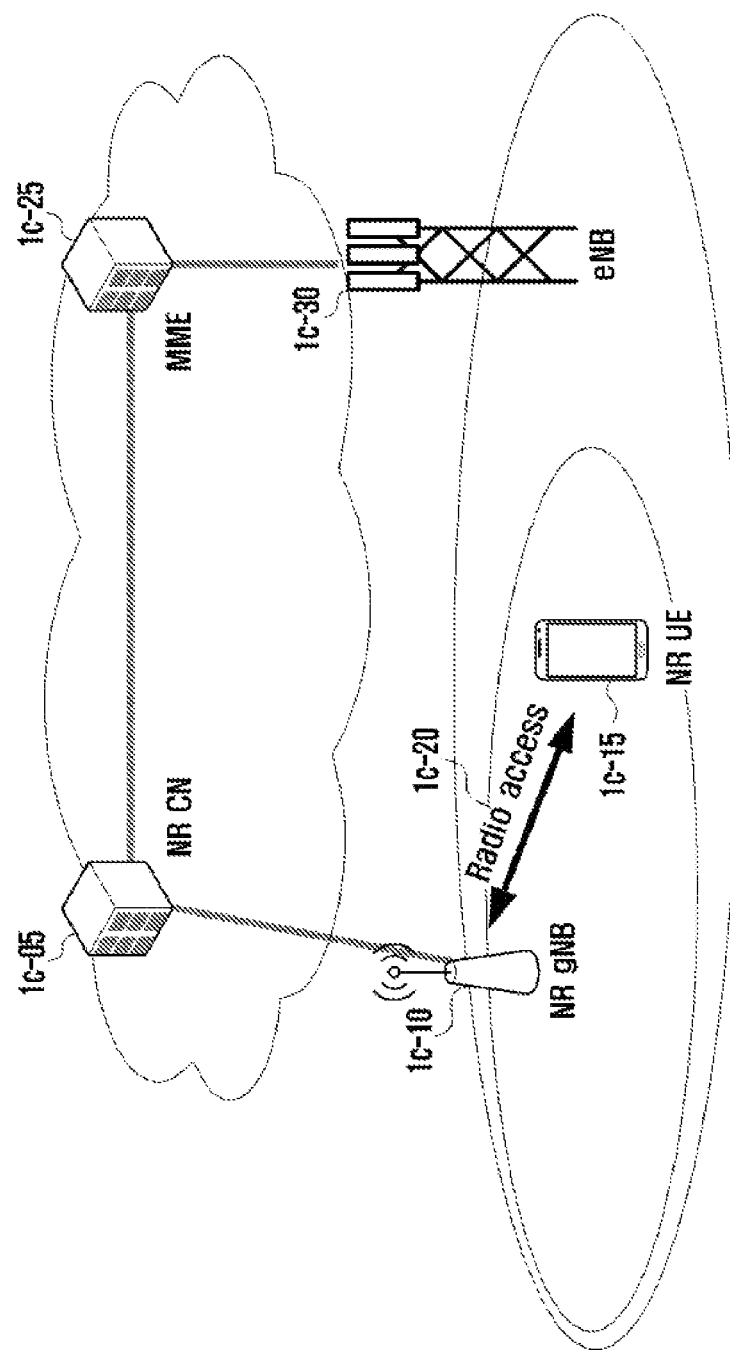
FIG. 1C illustrates a view of the structure of a next generation mobile communication system to which the disclosure is applicable.

FIG. 1C illustrates a view of the structure of a next generation mobile communication system to which the disclosure is applicable.

Referring to FIG. 1C, as illustrated therein, a radio access network of a next generation mobile communication system (hereinafter, NR or 5G) is composed of a next generation base station (a new radio node B, hereinafter, an NR gNB or an NR base station) 1C-10 and new radio core network (NR CN) 1C-05. New radio user equipment (hereinafter, NR UE or a terminal) 1C-15 accesses an external network through an NR gNB 1C-10 and an NR CN 1C-05.

In FIG. 1C, an NR gNB 1C-10 corresponds to an evolved node B (eNB) of an existing LTE system. An NR gNB is connected to NR UE 1C-15 through a radio channel and may provide a better service than that of an existing node B. Since in a next generation mobile communication system, all user traffics are serviced through a shared channel, a device for performing scheduling by gathering state information such as buffer states, available transmission power states, and channel states of pieces of UE is required, and an NR NB 1C-10 serves as the device. One NR gNB generally controls multiple cells. In order to implement ultrahigh-speed data transmission compared to current LTE, an existing maximum bandwidth or a larger bandwidth may be included, and by using an orthogonal frequency division multiplexing (OFDM) scheme as a radio access technology, a beamforming technology may be additionally grafted. In addition, an adaptive modulation & coding (hereinafter, referred to as AMC) scheme for determining a modulation scheme and a channel coding rate according to a channel state of a terminal is applied. An NR-CN 1C-05 performs a function such as mobility support, bearer configuration, QoS configuration, or the like. An NR-CN is a device in charge of multiple control functions as well as a mobility management function for a terminal and is connected to multiple base stations. Moreover, a next generation mobile communication system may be linked with an existing LTE system, and an NR CN is connected to an MME 1C-25 through a network interface. An MME is connected to eNB 1C-30, an existing base station.

Figure 1D:
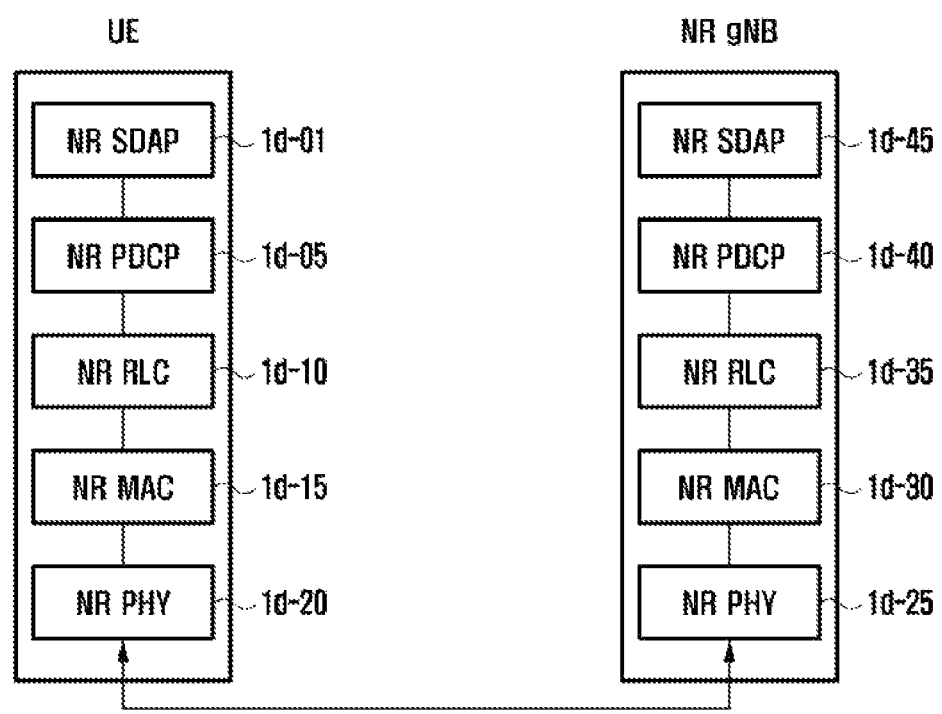
FIG. 1D illustrates a view showing a radio protocol structure of a next generation mobile communication system to which the disclosure is applicable.

FIG. 1D illustrates a view showing a radio protocol structure of a next generation mobile communication system to which the disclosure is applicable.

Referring to FIG. 1D, a radio protocol of a next generation mobile communication system is composed of, in each of a terminal and an NR base station, an NR SDAP 1D-01 or 1D-45, an NR PDCP 1D-05 or 1D-40, an NR RLC 1D-10 or 1D-35, an NR MAC 1D-15 or 1D-30.

The major functions of an NR SDAP 1D-01 or 1D-45 may include a part of the following functions.

User data delivery function (transfer of user plane data).

Function of mapping a QoS flow and a data bearer for an uplink and a downlink (mapping between a QoS flow and a DRB for both DL and UL).

Function of marking QoS flow ID for an uplink and a downlink (marking QoS flow ID in both DL and UL packets).

Function of mapping a reflective QoS flow to a data bearer for uplink SDAP PDUs (reflective QoS flow to DRB mapping for the UL SDAP PDUs).

In relation to an SDAP entity (or SDAP layer), whether or not to use a header of the SDAP entity or whether or not to use a function of the SDAP entity may be configured for a terminal by an RRC message for each of PDCP entity (PDCP layer)s, each of bearers, or each of logical channels, and in case that an SDAP header is configured, an NAS QoS reflection configuration 1 bit indicator (NAS reflective QoS) and an AS QoS reflection configuration 1 bit indicator (AS reflective QoS) of the SDAP header may provide indication to a terminal such that the terminal may renew or reconfigure mapping information on a data bearer and a QoS flow of an uplink and a downlink. The SDAP header may include QoS flow ID information representing QoS. The QoS information may be used as data processing priority, scheduling information, or the like to support an active service.

The major functions of an NR PDCP 1D-05 or 1D-40 may include a part of the following functions.

Header compression and decompression function (header compression and decompression: ROHC only).

User data transmission function (transfer of user data).

Sequential delivery function (in-sequence delivery of upper layer PDUs).

Non-sequential delivery function (out-of-sequence delivery of upper layer PDUs).

Sequence rearrangement function (PDCP PDU reordering for reception).

Overlap detection function (duplicate detection of lower layer SDUs).

Retransmission function (retransmission of PDCP SDUs).

Ciphering and deciphering function.

Timer-based SDU removal function (timer-based SDU discard in uplink).

The sequence rearrangement function (reordering) for NR PDCP devices refers to a function of sequentially rearranging, based on a PDCP sequence number (SN), PDCP PDUs received from a lower layer, may include a function of delivering data to an upper layer in a rearranged sequence or a function of directly delivering data without considering a sequence, may include a function of recording lost PDCP PDUs by rearranging a sequence, may include a function of reporting, to a transmitter side, a state about lost PDCP PDUs, and may include a function of requesting for retransmission of lost PDCP PDUs.

The major functions of an NR RLC 1D-10 or 1D-35 may include a part of the following functions.

Data transmission function (transfer of upper layer PDUs).

Sequential delivery function (in-sequence delivery of upper layer PDUs).

Non-sequential delivery function (out-of-sequence delivery of upper layer PDUs).

ARQ function (error Correction through ARQ).

Concatenation, segmentation and reassembly function (concatenation, segmentation and reassembly of RLC SDUs).

Re-segmentation function (re-segmentation of RLC data PDUs).

Sequence rearrangement function (reordering of RLC data PDUs).

Overlap detection function (duplicate detection).

Error detection function (protocol error detection).

RLC SDU removal function (RLC SDU discard).

RLC re-establishment function (RLC re-establishment).

The sequential delivery function of an NR RLC device refers to a function of sequentially delivering RLC SDUs received from a lower layer to an upper layer, may have a function of, in case that original one RLC SDU is dividedly received as multiple RLC SDUs, reassembling and delivering the RLC SDUs, may include a function of rearranging, based on an RLC sequence number (SN) or a PDCP sequence number (SN), received RLC PDUs, may include a function of recording lost RLC PDUs by rearranging a sequence, may include a function of reporting, to a transmitter side, a state about lost RLC PDUs, may include a function of requesting for retransmission of lost RLC PDUs, and may include a function of, in case that there is a lost RLC SDU, sequentially delivering, to an upper layer, only RLC SDUs before the lost RLC SDU, a function of, if a designated timer expires although there is a lost RLC SDU, sequentially delivering, to an upper layer, all RLC SDUs received before the timer starts, or a function of, if a designated timer expires although there is a lost RLC SDU, sequentially delivering, to an upper layer, all RLC SDUs having been received until the present time. In addition, RLC PDUs may be processed in the order the RLC PDUs are received (in the order of arrival irrespective of a sequence of a sequence number), and may be delivered to a PDCP device irrespective of a sequence (out-of-sequence delivery). In case of a segment, segments stored in a buffer or to be received later may be received, reconstituted into one complete RLC PDU, processed, and delivered to a PDCP device. The NR RLC layer may not include a concatenation function. The function may be performed in an NR MAC layer or may be replaced by a multiplexing function of an NR MAC layer.

The non-sequential delivery function (out-of-sequence delivery) of an NR RLC device refers to a function of directly delivering, to an upper layer, irrespective of a sequence, RLC SDUs received from a lower layer, may include a function of, in case that original one RLC SDU is dividedly received as multiple RLC SDUs, reassembling and delivering the RLC SDUs, and may include a function of storing an RLC SN or a PDCP SN of received RLC PDUs and arranging sequences to record lost RLC PDUs.

An NR MAC 1D-15 or 1D-30 may be connected to multiple NR RLC entities configured in one terminal, and the major functions of an NR MAC may include a part of the following functions.

Mapping function (mapping between logical channels and transport channels).

Multiplexing and demultiplexing function (multiplexing/demultiplexing of MAC SDUs).

Scheduling information reporting function.

HARQ function (error correction through HARQ).

Function of adjusting priority between logical channels (priority handling between logical channels of one UE).

Function of adjusting priority between terminals (priority handling between pieces of UE by means of dynamic scheduling).

MBMS service identification function.

Transmission format selection function (transport format selection).

Padding function.

An NR PHY layer 1D-20 or 1D-25 performs an operation of performing channel coding and modulation on higher layer data to make an OFDM symbol therefrom and transmitting the OFDM symbol to a radio channel or an operation of performing demodulation and channel decoding on an OFDM symbol received through a radio channel and delivering the demodulated and channel-decoded symbol to an upper layer.

In a next generation mobile communication system, a terminal performs frequency measurement while performing a cell reselection procedure in an RRC idle mode. The frequency measured while a cell reselection procedure is performed may mean intra-frequency measurement or serving cell or PCell measurement for frequencies configured by a base station or transmitted from a camp-on cell. However, a terminal does not perform inter-frequency measurement except for intra-frequency measurement or serving cell measurement, and a frequency measurement result is not separately reported to a network.

That is, in case that a terminal firstly performs a cell reselection procedure, finds a suitable cell, and performs, after camp-on, an RRC connection configuration procedure to shift to an RRC connected mode, a base station may configure, for the RRC connected mode terminal, which frequencies (for example, a frequency list) or which frequency bands are to be measured, in which sequence measurement is to be performed by priority configured for each of frequencies, which beam is to be measured, which filtering method is to be used to measure the intensity of a frequency at the time of measuring a frequency (for example, an L1 filtering, L2 filtering, or L3 filtering method, or which coefficient is to be used and by which calculation method measurement is to be performed), under which event or condition measurement is to start at the time of measuring a frequency, under which standard measurement is to be performed compared to a current serving cell (or current camp-on frequency), under which event or condition a measured frequency result is to be reported, which standard or condition should be satisfied to report a frequency compared to a current serving cell (or a current camp-on frequency), in which cycle a frequency measurement result is to be reported, or the like. A terminal measures corresponding frequencies according to frequency configuration configured by a base station as described above, and reports frequency measurement results to the base station according to a corresponding event or condition. In addition, a base station may determine whether or not to apply a carrier aggregation technology or a dual connectivity technology by using a frequency measurement result received from a terminal.

The disclosure proposes a method in which, in a next generation mobile communication system, a terminal may perform frequency measurement in an RRC idle mode or RRC inactive mode terminal before a shift to an RRC connected mode, may indicate a measurement result to a base station when configuring connection with a network, and may rapidly report a frequency measurement result after entering an RRC connected mode. Based on the method, for a terminal, a base station may rapidly configure, based on a result measured by the terminal in an RRC idle mode or an RRC inactive mode, a carrier aggregation technology or a dual connectivity technology.

Specifically, when an RRC connected mode terminal, for which connection with network has been configured, is shifted to an RRC idle mode or an RRC inactive mode, a base station may configure information on a frequency to be measured, via an RRC message, by the terminal in an RRC idle mode or an RRC inactive mode, information on a time (or a period) of measuring a frequency by the terminal in an RRC idle mode or an RRC inactive mode, or information of an area (or a cell list) in which a frequency is to be measured by the terminal in an RRC idle mode or an RRC inactive mode, and may provide indication to the terminal such that the terminal performs frequency measurement in an RRC idle mode or an RRC inactive mode. In addition, the disclosure proposes an efficient terminal operation in which a terminal may read system information of a new camp-on cell while performing a cell reselection operation whenever the terminal moves, such that the terminal may perform, according to the system information, a procedure about whether to continue or terminate frequency measurement in an RRC idle mode or an RRC inactive mode, whether or not to extend a measurement period (for example, timer restart), whether or not to report a frequency measurement result, or whether or not to discard a frequency measurement result.

In the disclosure, a bearer may mean including an SRB and a DRB, wherein the SRB may mean a signaling radio bearer and the DRB may mean a data radio bearer. In addition, a UM DRB may mean a DRB using an RLC entity operated in an unacknowledged mode (UM), and an AM DRB may mean a DRB using an RLC entity operated in an acknowledged mode (AM).

Figure 1E:
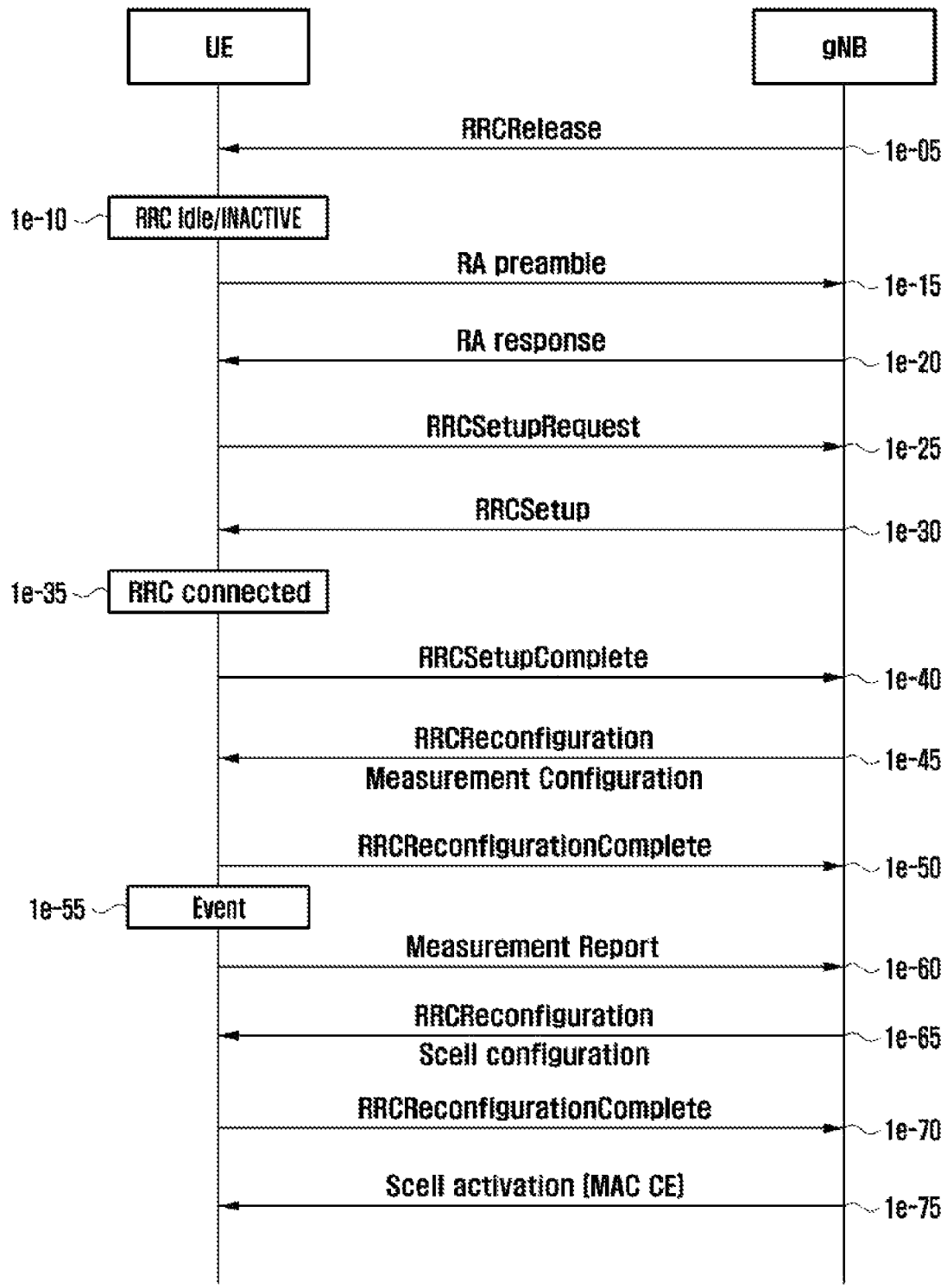
FIG. 1E illustrates a view showing a procedure in which, in a next generation mobile communication system of the disclosure, a terminal shifts from an RRC idle mode or an RRC inactive mode to an RRC connected mode and configures a carrier aggregation technology.

FIG. 1E illustrates a view showing a procedure in which, in a next generation mobile communication system of the disclosure, a terminal shifts from an RRC idle mode or an RRC inactive mode to an RRC connected mode and configures a carrier aggregation technology.

In FIG. 1E, a base station may shift an RRC connected mode terminal, for which connection with a network has been configured, to an RRC idle mode or an RRC inactive mode for a designated reason. For example, the designated reason may be the lack of scheduling resources in the base station, the stop of data transmission/reception during a certain period of time, or the like.

In step 1E-05, the base station may transmit an RRCRelease message to the terminal to provide indication to the terminal such that the terminal shifts to an RRC idle mode or an RRC inactive mode.

The base station may provide indication to a terminal by an indicator (suspend-config) included in an RRCRelease message, such that the terminal shifts to an RRC inactive mode, and the terminal may shift to an RRC idle mode if the RRCRelease message does not include the indicator (suspend-config).

If connection with a network is required for a designated reason, a terminal 1E-10, which has shifted to an RRC idle mode or an RRC inactive mode, may perform RRC connection configuration by performing a random access procedure, receiving a random access response, requesting for RRC connection configuration, and receiving an RRC message (1E-10, 1E-15, 1E-20, 1E-25, 1E-30, 1E-35, and 1E-40).

Via a random access process, a terminal may establish reverse direction transmission synchronization with a base station and transmit an RRCSetupRequest message to the base station (1E-25). The RRCSetupRequest message may include a reason (establishmentCause) that connection with an identifier of a terminal is to be configured, or the like.

A base station may transmit an RRCSetup message to configure RRC connection (1E-30).

The RRCSetup message may include at least one of logical channel-specific configuration information, bearer-specific configuration information, PDCP entity (PDCP layer) configuration information, RLC layer configuration information, and MAC layer (MAC entity) configuration information.

The RRCSetup message may assign a bearer identifier (for example, an SRB identifier or a DRB identifier) to each of bearers, and may provide, to each of bearers, indication of PDCP layer (PDCP entity), RLC layer, MAC layer, and PHY layer configuration.

In addition, for each of bearers, the RRCConnectionSetup message may configure a length (for example, 12 bits or 18 bits) of a PDCP sequence number used in a PDCP entity (PDCP layer), and may configure a length (for example, 6 bits, 12 bits, or 18 bits) of an RLC sequence number used in an RLC entity.

Moreover, for each of bearers, the RRCConnectionSetup message may provide, to a PDCP entity (PDCP layer), indication of whether or not to use a header compression and decompression protocol in an uplink or downlink, and may indicate whether or not to perform an integrity protection or authentication procedure. In addition, whether or not to perform a non-sequential delivery function (out-of-order delivery) in a PDCP entity (PDCP layer) may be indicated by the message.

A terminal, for which RRC connection has been configured, may transmit an RRCSetupComplete message to a base station (1E-40). The RRCSetupComplete message may include a control message (for example, SERVICE REQUEST) by which, to an AMF or MME, a terminal requests for bearer configuration for a designated service. A base station may transmit, to an AMF or MME, a SERVICE REQUEST message stored in an RRCConnetionSetupComplete message, and the AMF or the MME may determine whether or not to provide a service requested by a terminal.

As a result of the determination, if it is determined to provide a service requested by a terminal, an AMF or an MME may transmit, to a base station, an INITIAL CONTEXT SETUP REQUEST message. An INITIAL CONTEXT SETUP REQUEST message may include at least one of quality of service (QoS) information to be applied at the time of data radio bearer (DRB) configuration, security-related information (for example, a security key or a security algorithm) to be applied to a DRB, or the like.

In order to configure security with a terminal, a base station may transmit or receive a SecurityModeCommand message and a SecurityModeComplete message, and if security configuration is completed, the base station may transmit an RRCConnectionReconfiguration message to the terminal (1E-45).

The RRCConnectionReconfiguration message may assign a bearer identifier (for example, an SRB identifier or a DRB identifier) to each of bearers, and may provide, to each of bearers, indication of PDCP layer (PDCP entity), RLC layer, MAC layer, and PHY layer device configuration.

In addition, for each of bearers, the RRCConnectionReconfiguration message may configure a length (for example, 12 bits or 18 bits) of a PDCP sequence number used in a PDCP entity (PDCP layer), and may configure a length (for example, 6 bits, 12 bits, or 18 bits) of an RLC sequence number used in an RLC entity.

Moreover, for each of bearers, the RRCConnectionReconfiguration message may provide, to a PDCP entity (PDCP layer), indication of whether or not to use a header compression and decompression protocol in an uplink or downlink, and may indicate whether or not to perform an integrity protection or authentication procedure. In addition, whether or not to perform a non-sequential delivery function (out-of-order delivery) in a PDCP entity (PDCP layer) may be indicated by the message.

Furthermore, configuration information of a DRB, by which user data is to be processed, may be included in the RRCConnectionReconfiguration message, and a terminal may configure the DRB by applying the information and transmit an RRCConnectionReconfigurationComplete message to a base station (1E-45). A base station, which has completed DRB configuration with a terminal, may transmit an INITIAL CONTEXT SETUP COMPLETE message to an AMF or an MME and may complete connection (1E-50).

Once the above-described process is entirely completed, a terminal may transmit or receive data to or from a base station through a core network (1E-55 and 1E-60). According to a part of embodiments, a data transmission process may include three broad steps such as RRC connection configuration, security configuration, and DRB configuration. In addition, in order to renew, add, or change configuration for a terminal for a designated reason, a base station may transmit an RRCConnectionReconfiguration message (1E-65).

For the RRCConnectionReconfiguration message, frequency configuration information (for example, a list of frequencies to be measured, a period of measuring a frequency, a condition of measuring a frequency, a condition of reporting a frequency after frequency measurement, or a cell identifier for reporting a frequency) to be measured by a terminal may be configured.

A terminal performs frequency measurement according to the frequency measurement configuration information, and if a designated condition is satisfied (for example, in case that the signal intensity of a specific frequency is larger than a certain standard (for example, a critical value) or in case that the signal intensity of a current serving cell (frequency) is smaller than a certain standard (for example, a critical value)), a measured frequency measurement result may be reported to a base station (1E-60).

When the frequency measurement result is received, a base station may transmit, based on the frequency measurement result, an RRCReconfiguration message 1E-65, while including SCell configuration information therein, to a terminal to configure additional SCells (that is, to configure a carrier aggregation technology for the terminal), and the RRCReconfiguration message 1E-65, while including secondary cell group configuration information therein, to the terminal to configure, for the terminal, a dual connectivity technology.

In case that the base station configures, for the terminal, a carrier aggregation technology, the base station may shift, by using an MAC control element (MAC CE), the configured SCells in an active, inactive, or idle state.

A procedure in which a base station configures, for a terminal, a carrier aggregation technology or a dual connectivity technology as described above may be summarized as follows. First, if a terminal configures connection with a base station and a base station configures, for the terminal in an RRC connected mode, frequency measurement configuration information, the terminal may perform, based on the frequency measurement configuration information, frequency measurement and may report a measurement result to the base station. In addition, in order to configure, based on the frequency measurement result of the terminal, a carrier aggregation technology for the terminal, the base station may configure, via an RRC message, configuration information for additional SCells, and may transmit an MAC CE to activate, idle, or inactivate the SCells. Moreover, in order to configure, based on the frequency measurement result of the terminal, a dual connectivity technology for the terminal, the base station may configure additional cell group (SCG) configuration information.

When the base station configures, for the terminal, a carrier aggregation technology or a dual connectivity technology, the terminal should firstly enter an RRC connected mode, receive frequency configuration information, perform frequency measurement, and then report the measurement. Thus, there is a problem in that a measurement report is performed very late and thus a carrier aggregation technology or a dual connectivity technology cannot but be configured late. Accordingly, to solve this, in the disclosure below, a terminal may efficiently perform frequency measurement in an RRC idle mode or an RRC inactive mode, and may report a frequency measurement result as soon as connection with a network is configured.

A partial bandwidth may be configured via an RRCSetup message, an RRCResume message 1E-30, or an RRCReconfiguration message 1E-45 of RRC connection configuration, and the RRC message may include configuration information for a PCell, a PSCell, or a plurality of SCells, and may configure a plurality of partial bandwidths for each of the cells (the PCell, the PSCell, or the SCells).

When a plurality of partial bandwidths are configured for each of the cells, a plurality of partial bandwidths to be used in a downlink of each of the cells may be configured by a base station. In case of an FDD system, separately from downlink partial bandwidths, a plurality of partial bandwidths to be used in an uplink of each of the cells may be configured. In case of a TDD system, a plurality of partial bandwidths to be commonly used in a downlink and an uplink of each of the cells may be configured.

Information for configuring partial bandwidths of each of the cells (the PCell, the PSCell, or the SCells) may include at least one of the following pieces of information.
  Downlink partial bandwidth configuration information of the cell(s).
    Initial downlink partial bandwidth (initial downlink BWP) configuration information.
    A plurality of pieces of partial bandwidth configuration information, and a partial bandwidth identifier (BWP ID) corresponding to each of partial bandwidths.
    A partial bandwidth identifier for indicating a first active downlink partial bandwidth (first active downlink BWP).
    A partial bandwidth identifier for indicating a default partial bandwidth (default BWP).
    Partial bandwidth inactive timer configuration and a timer value.
    A partial bandwidth identifier for indicating a partial bandwidth for supporting an idle state.
    A partial bandwidth identifier for indicating a partial bandwidth for supporting a short cycle channel measurement reporting method.
  Uplink partial bandwidth configuration information of the cell(s).
    Initial uplink partial bandwidth (initial uplink BWP) configuration information.
    A plurality of pieces of partial bandwidth configuration information, and a partial bandwidth identifier (BWP ID) corresponding to each of partial bandwidths.
    A partial bandwidth identifier for indicating a first active uplink partial bandwidth (first active uplink BWP).
    A partial bandwidth identifier for indicating a partial bandwidth for supporting an idle state.
    A partial bandwidth identifier for indicating a partial bandwidth for supporting a short cycle channel measurement reporting method.

An initial partial bandwidth (initial BWP), a default partial bandwidth (default BWP), or a first active partial bandwidth (first active BWP) configured as described above may be used for the following tasks and may be operated as follows according to the tasks.

The initial partial bandwidth (initial BWP) may be sued as a partial bandwidth determined at a cell level (cell-specific) and present as one for each of cells, and may be used as a partial bandwidth for allowing synchronization of a terminal accessing a cell first may configure connection for the cell via a random access procedure or a terminal, for which connection has been configured. In addition, a base station may configure, for each of cells, an initial downlink partial bandwidth (initial downlink BWP) to be used in a downlink and an initial uplink partial bandwidth (initial uplink BWP). Moreover, configuration information for the initial partial bandwidth may be transmitted from first system information (system information 1, SIB1) indicated by CORESET, and may be reconfigured by a base station for a connected terminal by an RRC message. Furthermore, the initial partial bandwidth may be used after being designated as no. 0 of a partial bandwidth identifier in each of an uplink and a downlink. That is, any terminal accessing the same cell may use the same initial partial bandwidth after identically designating the initial partial bandwidth as partial bandwidth identifier no. 0. It is because, when a random access procedure is performed, a base station may transmit a random access response (RAR) message to an initial partial bandwidth readable by any terminal and thus there may be an advantage of facilitating a competition-based random access procedure.

The first active partial bandwidth (first active BWP) may be configured to be different for each of terminals (UE-specific) and may be indicated from among a plurality of partial bandwidths by designation by a partial bandwidth identifier.

The first active partial bandwidth may be configured for each of a downlink and an uplink and may be configured, by partial bandwidth indicator, as each a first active downlink partial bandwidth (first active downlink BWP) and a first active uplink partial bandwidth (first active uplink BWP). When a plurality of partial bandwidths are configured for one cell, the first active partial bandwidth may be used to indicate which partial bandwidth is to be activated first to be used. For example, when a PCell, a PSCell, and a plurality of SCells are configured for a terminal and a plurality of partial bandwidths are configured for each of the PCell, the PSCell, or the SCells, if the PCell, the PSCell, or the SCell is activated, the terminal may activate and use a first active partial bandwidth (first active BWP) from among the plurality of partial bandwidths configured for the PCell, the PSCell, or the SCells. That is, by a terminal, a first active downlink partial bandwidth (first active downlink BWP) may be activated and used for a downlink, and a first active uplink partial bandwidth (first active uplink BWP) may be activated and used for an uplink.

An operation in which a terminal, for an SCell, switches a downlink partial bandwidth to be activated to a first active downlink partial bandwidth and switches an uplink partial bandwidth to be activated to a first active uplink partial bandwidth may be performed when indication of activating an SCell or a partial bandwidth from an inactive state is received via an RRC message, MAC control information, or DCI. In addition, the operation may be performed when indication of shifting an SCell or a partial bandwidth to an idle state is received via an RRC message, MAC control information, or DCI. It is because, when an SCell or a partial bandwidth is activated, a downlink partial bandwidth and an uplink partial bandwidth are to be switched to be activated to a first active downlink partial bandwidth and to be activated to a first active uplink partial bandwidth, respectively, and thus a base station may effectively use a carrier aggregation technology only if a frequency/channel should be measured and reported for a first active downlink/uplink partial bandwidth when a channel measurement report is performed in an idle state.

A default partial bandwidth (default BWP) may be configured to be different for each of terminals (UE-specific) and may be indicated from among a plurality of partial bandwidths by using a partial bandwidth identifier. The default partial bandwidth may be configured only for a downlink. The default partial bandwidth may be used as a partial bandwidth to fall back after a certain period of time from an active partial bandwidth from among a plurality of downlink partial bandwidths. For example, a partial bandwidth inactive timer (BWP inactivity timer) may be configured for each of cells or each of partial bandwidths via an RRC message, and the timer may start or restart at the time of the occurrence of data transmission/reception in an active partial bandwidth, not in a default partial bandwidth, or may start or restart at the time of a switch of an active partial bandwidth to another partial bandwidth. When the timer expires, a terminal may allow a downlink partial bandwidth activated for a cell to fall back or switch to a default bandwidth. The switching may mean a procedure of inactivating a current active partial bandwidth and activating a partial bandwidth to which indication of the switching has been provided, and the switching may be triggered by an RRC message, MAC control information (an MAC control element), or L1 signaling (downlink control information (DCI) of a PDCCH). The switching may be triggered by indicating a partial bandwidth to be switched or to be activated, and a partial bandwidth may be indicated by a partial bandwidth indicator (for example, 0, 1, 2, 3, or 4).

The default partial bandwidth is used only for a downlink because a baes station allows a terminal to fall back to a basic partial bandwidth for each of cells after a certain period of time and to receive indication (for example, DCI of a PDCCH) from the base station and thus base station scheduling may be facilitated. For example, if a base station configures, as initial partial bandwidths, default partial bandwidths of terminals accessing one cell, the base station may continuously perform scheduling indication only in the initial partial bandwidths after a certain period of time. In case that the default partial bandwidths are not configured in an RRC message, initial partial bandwidths may be considered as the basic partial bandwidths which may fall back to initial partial bandwidths when a partial band inactive timer expires.

As another method, in order to enhance the degree of implementing freedom of abase station, a default partial bandwidth may be defined and configured also for an uplink and may be used as a default partial bandwidth of a downlink.

In addition, by using an RRCSetup message, an RRCResume message (1E-30), or an RRCReconfiguration message (1E-45) of RRC connection configuration, a base station may configure a state shift timer to allow a terminal to autonomously perform a state shift although the terminal does not receive indication by an RRC message, MAC control information, or DCI of a PDCCH. For example, an inactive timer may be configured for each of SCells or partial bandwidths, and the SCells or the partial bandwidths may be shifted to an inactive state if the inactive timer expires. Moreover, an idle timer may be configured for each of SCells or partial bandwidths, and the SCells or the partial bandwidths may be shifted to an idle state if the idle timer expires. When the idle timer expires, only SCells or partial bandwidths in an active state are shifted to an idle state, and SCells in an inactive state or an idle state are not shifted to an idle state. Furthermore, an idle state inactive timer may be configured for each of SCells or partial bandwidths, SCells or partial bandwidths in an idle state may be shifted to an inactive state. When the idle state inactive timer expires, only SCells or partial bandwidths in an idle state are shifted to an inactive state, and SCells or partial bandwidths in an active state or an inactive state are not shifted to an inactive state. In case that an inactive timer and an idle timer are configured together, the idle timer may be prioritized. That is, in case that an idle timer is configured, corresponding SCells or partial bandwidths are not inactivated although an inactive timer expires. In other words, in case that an idle timer is configured, as the idle state expires, SCells or partial bandwidths are firstly shifted from an active state to an idle state, and cells or partial bandwidths shifted to an idle state are re-shifted to an inactive state step by step as an idle state inactive timer expires. Accordingly, if an idle timer is configured, an inactive timer does not affect a state shift of SCells or partial bandwidths, and if the idle timer is configured, SCells or partial bandwidths are not shifted to an inactive state although the inactive timer expires.

In case that an inactive timer is not configured for an RRC message, a terminal may consider that the inactive timer is configured in an infinite value.

In addition, for an RRCSetup message, an RRCResume message (1E-30), or an RRCReconfiguration message (1E-45) of RRC connection configuration, short cycle channel measurement reporting method configuration information may be configured for a partial bandwidth of each of cells. For example, a specific partial bandwidth is configured as a partial bandwidth to which a short cycle channel measurement reporting method may be applied, and short cycle channel measurement reporting method configuration information may be configured for the specific partial bandwidth. The specific partial bandwidth may be configured as a first active partial bandwidth. It is because a first active partial bandwidth is activated and used when a cell is activated. As another method, the specific partial bandwidth may be indicated as one of a plurality of partial bandwidths by a partial bandwidth identifier, and thus may be indicated as the same partial bandwidth as an initial partial bandwidth, a default partial bandwidth, or a first active partial bandwidth. As another method, the short cycle channel measurement reporting method configuration information may be configured while being included in PHY layer or MAC layer configuration information. When activation is indicated, by L1 signaling, an MAC CE, or an RRC, to each of cells (an SCell, a PCell, or a PSCell) configured for a terminal or when a partial bandwidth is indicated by L1 signaling, an MAC CE, or an RRC, it is identified whether or not the short cycle channel measurement reporting method configuration information is configured for a specific partial bandwidth or a first active partial bandwidth indicated by an RRC message, and a short cycle channel measurement reporting method may be performed for the partial bandwidth.

In the disclosure, a partial bandwidth may indicate an uplink partial bandwidth or a downlink partial bandwidth.

Figure 1F:
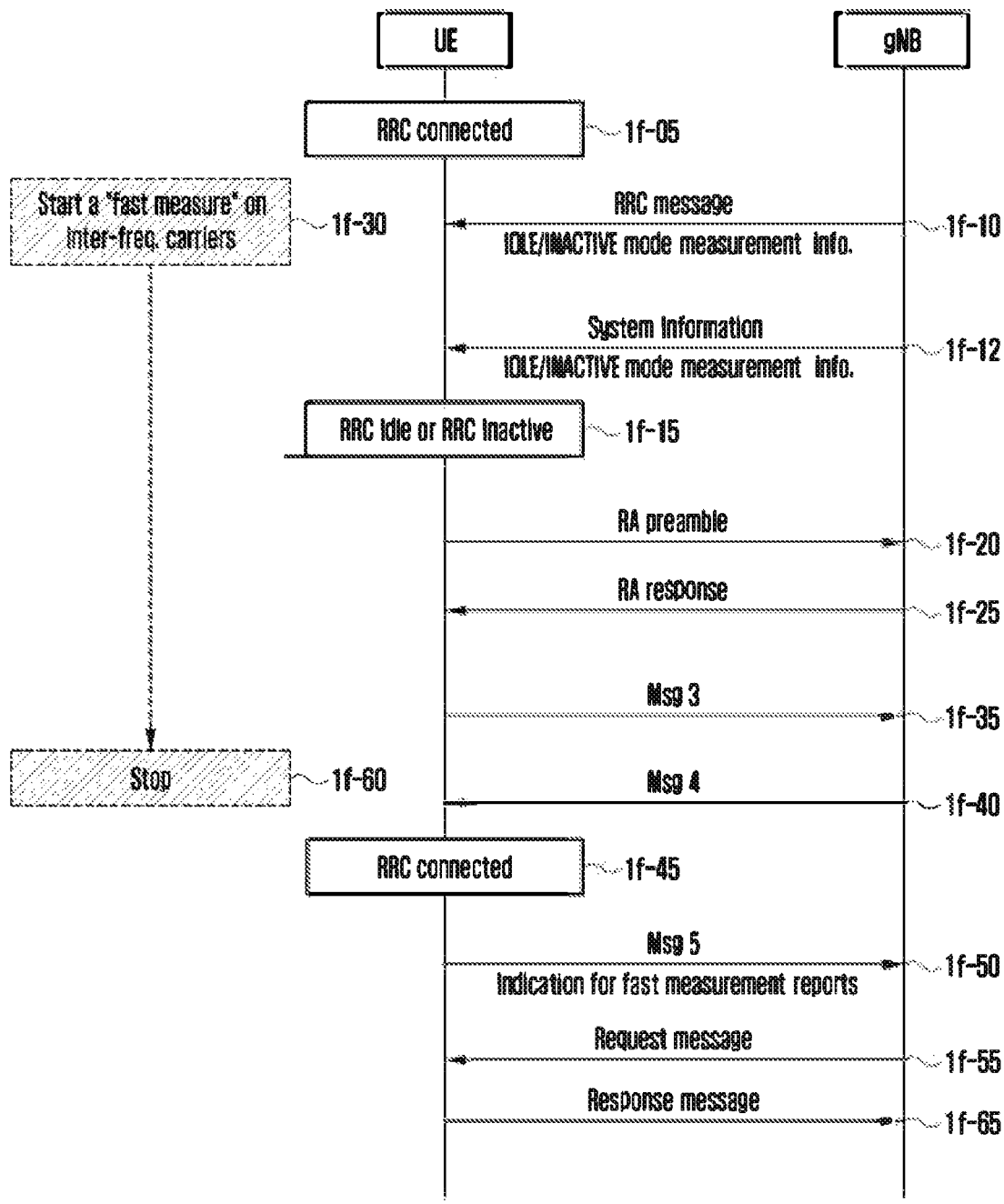
FIG. 1F illustrates a view showing a first embodiment in which, in a next generation mobile communication system of the disclosure, a terminal is allowed to perform early frequency measurement in an RRC idle mode or an RRC inactive mode and to rapidly report a frequency measurement result.

FIG. 1F illustrates a view showing a first embodiment in which, in a next generation mobile communication system of the disclosure, a terminal is allowed to perform early frequency measurement in an RRC idle mode or an RRC inactive mode and to rapidly report a frequency measurement result.

In the first embodiment, when for a terminal, a base station configures, via an RRCRelease message, frequency measurement configuration information by which the terminal is to perform frequency measurement in an RRC idle mode or an RRC inactive mode, a plurality of frequency measurement groups may be configured, and the terminal may perform frequency measurement in an RRC idle mode or an RRC inactive mode.

In addition, the disclosure proposes configuring a separate frequency measurement list or a separate timer according to a frequency configuration group or a radio access technology (or for each of cells or for each of beams) when frequency measurement configuration information is indicated to an RRC inactive mode or RRC idle mode terminal. That is, the disclosure proposes a method in which a period or a timer value which provides, to an LTE frequency (for each of frequencies or for each of cells), indication of how long frequency measurement is to be performed may be configured, and a period or a timer value which provides, to an NR frequency (for each of frequencies, for each of cells, or for each of beams), indication of how long frequency measurement is to be performed may be separately configured, such that a separate timer may be configured for each of frequency configuration groups and thus a separate period may be configured. That is, a separate timer may be operated for each of frequency groups, and frequency measurement may be performed until the timer expires. As described above, if a separate timer may be configured for each of radio access technologies, for each of cells, or for each of beams, a frequency measurement period may be varied by reflecting a frequency characteristic, a beam characteristic, or a cell characteristic, and thus battery consumption of a terminal may be advantageously optimized.

In the first embodiment, a terminal which may perform frequency measurement in an RRC idle mode or an RRC inactive mode and rapidly report a frequency measurement result may be a terminal corresponding to one or more of the following cases.
1. Any terminal of which capability supports rapid frequency measurement in an RRC idle mode or an RRC inactive mode and a rapid frequency measurement result reporting method.
2. From among RRC idle mode or inactive mode terminals, a terminal which receives configuration information indicating frequency measurement in an RRC idle mode or an RRC inactive mode when a base station shifts, via an RRC message, the terminal from an RRC connected mode to an RRC idle mode or an RRC inactive mode.

For example, a terminal for which frequency configuration information for performing frequency measurement in an RRC idle mode or an RRC inactive mode, a measurement period (for example, a timer value), or information of an area (for example, a list of cell identifiers) in which the frequency measurement is to be performed have been configured.

In FIG. 1F, a terminal 1F-05 in an RRC connected mode may be shifted to an RRC idle mode or an RRC inactive mode by a base station for a designated reason (for example, because there is no transmission/reception for a certain period of time, or the like) (1F-15). When the base station shifts the mode of the terminal, an RRC message is transmitted (1F-10). For example, an RRCRelease message (indication of a shift to an RRC idle mode) or an RRCRelease message including suspend-config (indication of a shift to an RRC inactive mode) may be transmitted.

The RRC message may include the following multiple pieces of information or a part thereof to be applied when a terminal performs early frequency measurement in an RRC idle mode or an RRC inactive mode.

Frequency configuration information to be measured in an RRC idle mode or an RRC inactive mode.
  Frequency configuration information.
    LTE frequency measurement information group or list (EUTRA frequency configuration information/list/group).
      Configuration may be made to include frequency measurement configuration information (early measurement setup) such as which frequencies (for example, a frequency list) or which frequency bands are to be measured, in which sequence measurement is to be performed by priority configured for each of frequencies, which filtering method is to be used to measure the intensity of a frequency at the time of measuring a frequency (for example, an L1 filtering, L2 filtering, or L3 filtering method, or which coefficient is to be used and by which calculation method measurement is to be performed), under which event or condition measurement is to start at the time of measuring a frequency, under which standard (for example, when the intensity of a signal is equal to or larger than an indicated critical value) measurement is to be performed compared to a current serving cell (or current camp-on frequency), under which event or condition a measured frequency result is to be reported, which standard or condition should be satisfied to report a frequency compared to a current serving cell (or a current camp-on frequency), or in which cycle a frequency measurement result is to be reported.
    NR frequency measurement information group or list (NR frequency configuration information/list/group).
      Configuration may be made to include frequency measurement configuration information (early measurement setup) such as which frequencies (for example, a frequency list) or which frequency bands are to be measured, in which sequence measurement is to be performed by priority configured for each of frequencies (or SSB-specific), SSB identifier information or SSB transmission resource (frequency and time resources, beam identifiers, or beam indicators) of each of frequencies, which filtering method is to be used to measure the intensity of a frequency at the time of measuring a frequency (for example, an L1 filtering, L2 filtering, or L3 filtering method, or which coefficient is to be used and by which calculation method measurement is to be performed), under which event or condition measurement is to start at the time of measuring a frequency, under which standard (for example, when the intensity of a signal is equal to or larger than an indicated critical value) measurement is to be performed compared to a current serving cell (or current camp-on frequency), under which event or condition a measured frequency result is to be reported, which standard or condition should be satisfied to report a frequency compared to a current serving cell (or a current camp-on frequency), or in which cycle a frequency measurement result is to be reported.

A frequency measurement performing period or a frequency measurement performing timer value (for example, T331) may be separately configured in an RRC idle mode or an RRC inactive mode, or a timer for an LTE frequency and a timer for an NR frequency may be separately configured in an RRC idle mode or an RRC inactive mode. It is because an LTE frequency characteristic (a low frequency band) and an NR frequency characteristic (a high frequency band) are different from each other and thus a frequency measurement time of a terminal may be separately adjusted such that a battery of the terminal may be saved. For example, in case that, in RRCRelease, frequency measurement is indicated in an RRC idle mode or an RRC inactive mode, frequency measurement may be performed while the timer is operated after starting, and frequency measurement may be stopped if the timer expires.

Valid area information, for example, a list of physical cell identifiers (PCIDs), for performing frequency measurement in an RRC idle mode or an RRC inactive mode is indicated. In case that terminal is in a cell indicated by the area information, frequency measurements may be performed, and in case that the terminal is out of the area information, the frequency measurement may be stopped. For example, in case that the terminal is out of the area information, a timer may be stopped and frequency measurement may be stopped. As another method, in case of a terminal shifting to an RRC inactive mode, a base station may use an indicator to determine whether or not to use a LAN indication area as a valid area. For example, in case that a base station provides, via an indicator to a terminal shifting to an RRC inactive mode, indication of using a LAN indication area as a valid area, the terminal may perform frequency measurement in the LAN indication area while maintaining an RRC inactive mode in the LAN indication area. As another method, indication of using a valid area as a LAN indication area may be provided via an indicator. As another method, in an RRC inactive mode, a terminal may consider and apply a LAN indication area as a valid area even without an indicator, and a separate valid area may be configured for the terminal in an RRC idle mode. In an RRC message, since both a LAN indication area and a valid area are indicated as a list of cell identifiers, a signaling overhead may be reduced via the proposed method. Since terminal implementation does not require separate management of a valid area, the burden of terminal implementation may be reduced.

A measurement report critical value may be configured, and a plurality of frequencies having a better signal intensity than the critical value in a configured frequency group may be reported.

In addition, in an RRCRelease message, a second timer value may be defined and configured to indicate how long a frequency measurement result measured by a terminal is valid. For example, a second timer operated by the second timer value may store and use the timer value when an RRCRelease message is received. The second timer defined above may start when a terminal receives the RRCRelease message, and when the second timer expires, it may be determined that a measured frequency measurement result is not valid and the result may be discarded. That is, the result is not reported to a base station. As another method, the second timer defined above may start when a first timer expires or is stopped. It is because while frequency measurement is performed, a frequency measurement result may be continuously renewed, and thus a validity period of the most recent frequency measurement result may be indicated as the second timer starts as soon as frequency measurement is stopped after a first timer expires or is stopped. In addition, when the second timer expires, it may be determined that a measured frequency measurement result is not valid and the result may be discarded. That is, the result is not reported to a base station. As another method, a first timer may be defined and used to perform the function of the second timer instead.

When an RRCRelease message is received, if rapid frequency measurement configuration information is included, a terminal may cancel or discard the stored frequency measurement configuration information or frequency measurement result, and may perform frequency measurement after saving, renewing, and applying new rapid frequency measurement configuration information. As another method, if only a frequency measurement period or a timer value is set in rapid frequency measurement setting information, a terminal may restart a timer with the value, maintain existing frequency configuration information, and continue frequency measurement configuration, or the terminal may start a timer with the value, cancel existing frequency configuration information, receive system information from a camp-on cell via a cell reselection procedure, and perform frequency measurement by applying frequency configuration information if there is the frequency configuration information. As another method, a new indicator may be defined for an RRCRelease message to indicate whether to continue or stop frequency measurement by existing frequency measurement configuration information, or whether or not to cancel frequency measurement configuration information. As another method, only in case that the RRCRelease message has frequency measurement configuration information, existing frequency configuration information is canceled, and if there is no frequency configuration information, the existing frequency configuration information may be maintained and applied.

When a terminal performs rapid frequency measurement in an RRC idle mode or an RRC inactive mode, frequency measurement may start if a condition for starting frequency measurement satisfies one of the following conditions (1F-30).

1. When a terminal receives an RRCRelease message, in case that an indicator for providing indication of performing frequency measurement in an RRC idle mode or an RRC inactive mode is included and frequency information to be measured and a period of measuring a frequency (for example, a timer value) are configured, a timer may start and frequency measurement may be performed according to the frequency information.
2. When a terminal receives an RRCRelease message, in case that an indicator for providing indication of performing frequency measurement in an RRC idle mode or an RRC inactive mode is included, a period of measuring a frequency (for example, a timer value) is configured, and frequency information to be measured is not included, the terminal may firstly starts a timer and may perform frequency measurement according to frequency information to be measured in an RRC idle mode or an RRC inactive mode, if the frequency information is transmitted from system information. If the terminal moves to another cell, in case that frequency information to be measured in an RRC idle mode or an RRC inactive mode is transmitted from system information from a new camp-on cell, frequency measurement may be performed according to new frequency information.

That is, if, for an RRCRelease message, frequency measurement configuration information for performing frequency measurement in an RRC idle mode or an RRC inactive mode is not configured, in case that a terminal transmits frequency configuration information for RRC idle mode or RRC inactive mode frequency measurement from system information, frequency measurement may be performed, based thereon, in an RRC idle mode or an RRC inactive mode. If the terminal moves and camps on a new cell, frequency measurement information may be updated with frequency configuration information for RRC idle mode or RRC inactive mode frequency measurement, the frequency configuration information being transmitted to the new cell, and may re-perform frequency measurement (1F-12).

However, if, for an RRCRelease message, frequency measurement configuration information for performing frequency measurement in an RRC idle mode or an RRC inactive mode is configured, frequency measurement may be performed while frequency measurement configuration information configured by the RRCRelease message is applied by priority compared to RRC idle mode or RRC inactive mode frequency measurement information transmitted from system information. That is, if, for an RRCRelease message, frequency measurement configuration information for performing frequency measurement in an RRC idle mode or an RRC inactive mode is configured, a terminal does not reflect or consider or ignores frequency configuration information transmitted from system information.

A terminal may start rapid frequency measurement (early measurement) according to one or more of the conditions. The terminal may transmit message 3 (for example, an RRCSetupRequest or RRCResumeRequest message) to a base station while performing frequency measurement (1F-35), may recognize the success of a random access procedure by receiving message 4 (for example, an RRCSetup or an RRCResume message) from the base station in response thereto (1F-40), and may shift to an RRC connected mode (1F-45).

If an indicator for supporting RRC idle mode or RRC inactive mode frequency measurement or an indicator for providing indication of receiving an RRC idle mode or RRC inactive mode frequency measurement result is transmitted from system information (for example, SIB2) received before the terminal configures connection in a current cell, the terminal may provide, to a base station by message 5 (for example, an RRCSetupComplete message or an RRCResumeComplete message) using an indicator, notification of having a frequency measurement result measured in an RRC idle mode or an RRC inactive mode.

When a terminal transmits message 5 (for example, RRC Setup Complete or RRC Resume Complete), the transmitted message may include an indicator for indicating that frequency measurement (early measurement) has been performed in an RRC idle mode or an RRC inactive mode and that there is a frequency measurement result to be reported. For message 5, a new indicator may be defined to indicate that there is a rapid frequency measurement result, and an indicator for notifying that there is already defined terminal information in an RRC message (RRC Setup Complete or RRC Resume Complete) may be reused (1F-50). As another method, in system information, the indicator may define and use an indicator for indicating LTE frequency measurement support or NR frequency measurement support. In addition, when message 5 provides indication of having a frequency measurement result measured in an RRC idle mode or an RRC inactive mode, an indicator for a measurement result for an LTE frequency and an indicator for a measurement result for an NR frequency may be defined and perform indication, respectively.

When it is identified in message 5 by an indicator that rapid frequency measurement has been performed in an RRC idle mode or an RRC inactive mode and that there is a measurement result for reporting the measurement, a base station may transmit, to a terminal, a message for requesting a report for a measurement result so as to rapidly receive a report for a frequency measurement result (1F-55). For example, a base station may newly define and use UEinformationRequest as a DL-DCCH message to request for frequency measurement result information from a terminal. When the message is received, a terminal may rapidly report a rapid frequency measurement result (early measurement) to a base station (1F-65). For example, when the message is received, a terminal may newly define and use a UEInformationResponse message as a UL-DCCH message to report a frequency measurement result. The frequency measurement result may include a serving cell/frequency measurement result (for example, NR-SS RSRP/RSRQ), a serving cell/frequency peripheral cell/frequency measurement result, a peripheral cell/frequency measurement result measurable by a terminal, and a cell/frequency measurement result indicated to be measured, or the like. As another method, a base station may define an indicator for an RRCReconfiguration message and use the indicator to request for frequency measurement result information from a terminal. When the message is received, a terminal may rapidly report a rapid frequency measurement result (early measurement) to a base station (1F-65). For example, when the message is received, a terminal may report a frequency measurement result by using an RRCReconfigurationComplete message, and may define, in a UL-DCCH message by another method, new fields for reporting a frequency measurement result, and use the fields to perform a report.

In relation to the description above, conditions under which a terminal stops rapid frequency measurement in an RRC idle mode or inactive mode may be as follows.

1. In case that a rapid frequency measurement result report is supported in system information of a current cell, and after or when an RRC message (for example, message 5) is transmitted or is to be transmitted to a base station to notify that there is a measurement result report.
2. In case that a terminal configures connection with a network while performing RRC idle mode or RRC inactive mode frequency measurement and the terminal, when receiving an RRCSetup message or an RRCResume message by message 4, is to stop a timer, stop measurement, support a rapid frequency measurement result report in system information of a current cell, and transmit an RRC message (for example, message 5) to a base station to notify that there is a measurement result report.
3. In case that a measurement report timer (for example, T331) expires.
4. In case of departure from an area indicated in RRC idle mode or RRC inactive mode frequency measurement area information configured in an RRCRelease message.

A terminal may stop RRC idle mode or RRC inactive mode frequency measurement (IDLE mode/INACTIVE mode measurement) according to one or more of the conditions above (1F-60).

A terminal performs measurement for frequencies that the terminal may measure, that is, that the terminal supports in rapid frequency configuration-related information, and at this time, the terminal may select a frequency to be measured by priority according to designated configured priority.

In the disclosure, proposed as follows is a specific terminal operation of reporting a frequency measurement result in relation to the first embodiment, a method for rapidly performing and reporting frequency measurement in an RRC idle mode or an RRC inactive mode.

When a terminal receives an RRCSetup message or an RRCResume message by message 4 from a base station, the terminal may perform the following operations.

If system information (for example, SIB2) transmits or includes an indicator (IDLE or INACTIVE Mode Measurement) for indicating a support of RRC idle mode or RRC inactive mode frequency measurement and the terminal has a frequency measurement result measured in an RRC idle mode or an RRC inactive mode, the terminal configures, as message 5, an RRCSetupComplete message or an RRCResumeComplete message to include an indicator (idle or INACTIVE Measavailable) in the message, the indicator indicating that there is an RRC idle mode or RRC inactive mode frequency measurement result. Accordingly, it may be indicated by the message that there is RRC idle mode or RRC inactive mode frequency measurement information to be reported to a base station.

Since a frequency measurement result is to be reported, a timer (for example, T331) for RRC idle mode or RRC inactive mode frequency measurement is stopped. Frequency measurement is stopped, and frequency measurement configuration information may also be discarded.

Figure 1G:
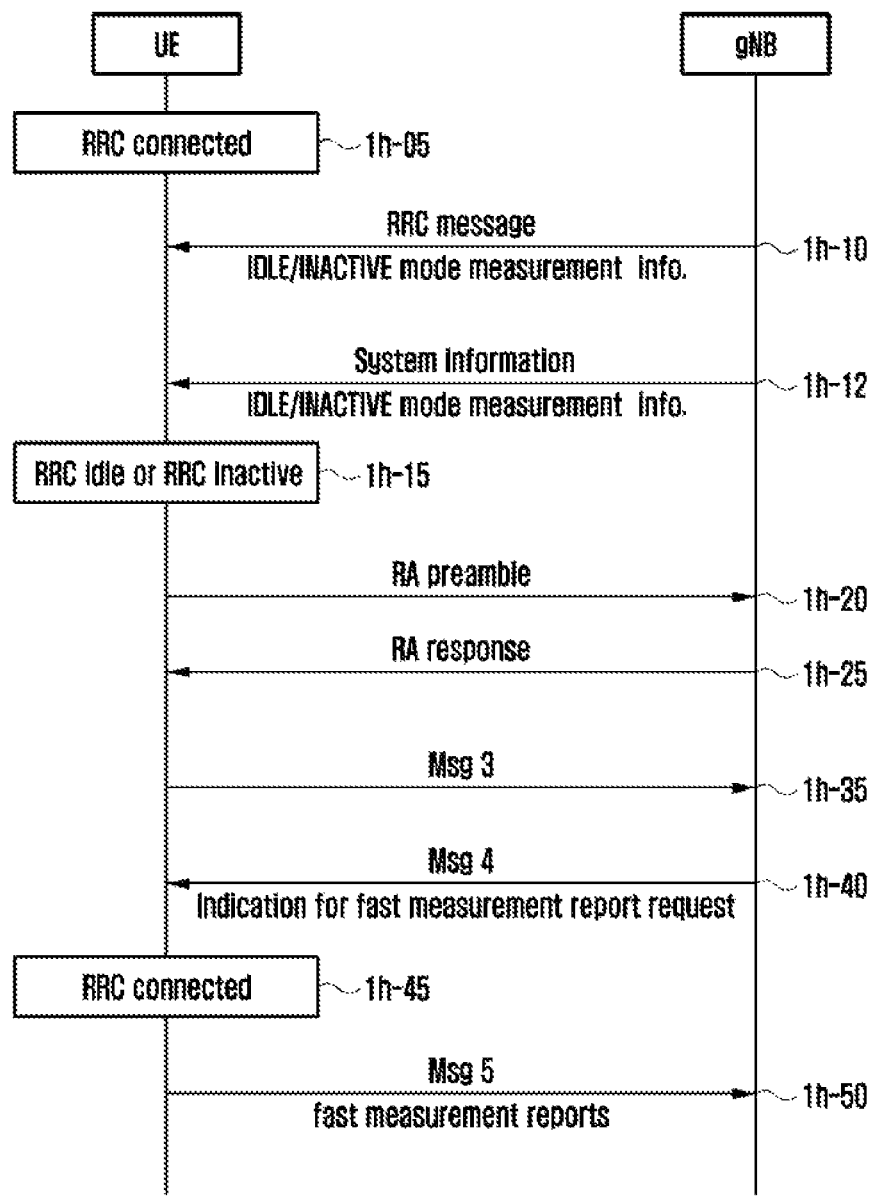
FIG. 1G illustrates a view showing a second embodiment in which, in a next generation mobile communication system of the disclosure, a terminal is allowed to perform early frequency measurement in an RRC idle mode or an RRC inactive mode and to rapidly report a frequency measurement result.

FIG. 1G illustrates a view showing a second embodiment in which, in a next generation mobile communication system of the disclosure, a terminal is allowed to perform early frequency measurement in an RRC idle mode or an RRC inactive mode and to rapidly report a frequency measurement result.

In the second embodiment, the description of the first embodiment may be applied. When for a terminal, a base station configures, via an RRCRelease message, frequency measurement configuration information by which the terminal is to perform frequency measurement in an RRC idle mode or an RRC inactive mode, a plurality of frequency measurement groups may be configured, and the terminal may perform frequency measurement in an RRC idle mode or an RRC inactive mode. When a terminal configures connection with a network, the terminal transmits message 3 to a base station, and when the base station transmits message 4 in response thereto, the base station performs measurement report indication in message 4 (for example, RRCResume) and performs a frequency measurement result report in message 5 (for example, RRCResumeComplete). Accordingly, compared to the first embodiment, a frequency measurement result report may be rapidly performed, and a measurement result may be reported with enhanced security. It is because an RRC inactive mode terminal activates security algorithms for SRB1 from a time point at which message 3 is transmitted. That is, message 4 and message 5 may be ciphered with a new security key in a PDCP entity (PDCP layer) and may be transmitted while integrity thereof is protected.

The terminal may perform frequency measurement in an RRC idle mode or an RRC inactive mode, store a measurement result, perform random access, and then transmit message 3 (for example, an RRCSetupRequest message or an RRCResumeRequest message). In addition, when the base station transmits message 4 (for example, an RRCSetup message or an RRCResume message) to the terminal, the base station may provide indication to the terminal while including an indicator for indicating a report for a frequency measurement result. As another method, message 4 may represent indication provided to the terminal as to reporting a frequency measurement result, and thus an indicator may be omitted. Moreover, the terminal may report a frequency measurement result in message 5 (for example, an RRCSetupComplete message or an RRCResumeComplete message). When transmitting an RRCResumeRequest message, the terminal in an RRC inactive mode resumes or activates a security procedure (ciphering and deciphering or integrity protection and authentication) for a signaling radio bearer SRB1, and thus the terminal has an advantage in that message 4 may be received with enhanced security and a frequency measurement result may be reported in message 5 with enhanced security. Furthermore, by using the information, the base station may transmit an RRC message while including therein carrier aggregation technology configuration or dual connectivity technology configuration information to rapidly restart, change, or newly configure a carrier aggregation technology or a dual connectivity technology for the terminal.

In FIG. 1G, if an RRC connected mode terminal receives, from a base station, indication of canceling RRC connection and shifting to an RRC idle mode or RRC inactive mode together with indication of frequency measurement configuration information, frequency measurement may be performed for a configured period or time in an RRC idle mode or an RRC inactive mode. However, if the frequency measurement configuration information does not include information on a list of frequencies to be measured, in case that frequency measurement configuration information for measuring a frequency of an RRC idle mode or RRC inactive mode terminal is transmitted from a camp-on cell while a cell reselection procedure is performed, the information may be received to perform frequency measurement.

In addition, when the terminal receives an RRCRelease message and shifts to an RRC inactive mode, the terminal may perform one of the following methods to efficiently treat SCells which have been configured for a carrier aggregation technology and SCGs which have been configured for a dual connectivity technology.

Method 1: All of configuration information for SCells or configuration information for SCGs may be canceled. In addition, when connection is configured later, a base station may rapidly configure, for a terminal via an RRCResume message or an RRCReconfiguration message, information for SCells for a carrier aggregation technology or SCGs for a dual connectivity technology, based on a rapid frequency measurement result report. Method 1 is advantageous in terms of a memory because a terminal does not have to maintain configuration information for SCells or configuration information for SCGs. Method 1 may be easily implemented because a base station does not have to collect existing configuration information for SCells or SCGs from a source base station.

Method 2: Configuration information for SCells or configuration information for SCGs may be stored, and transmission or bearer configuration for SCells or SCGs may be stopped (suspended). In addition, when connection is configured later, a base station may perform, for a terminal via an RRCResume message or an RRCReconfiguration message, resumption to reuse information for SCells for a carrier aggregation technology or SCGs for a dual connectivity technology, based on a rapid frequency measurement result report, wherein only partial configuration information may be updated (delta configuration) or information may be completely newly configured. In method 2, since a terminal maintains configuration information for SCells or configuration information for SCGs and thus a base station may use existing configuration information for SCells or SCGs as is, a signaling overhead may be reduced, and the terminal may rapidly apply and start a carrier aggregation technology or a dual connectivity technology. Even when an RRC inactive mode terminal resumes connection, configuration information for SCells or configuration information for SCGs is not canceled or discarded, and a base station defines an indicator in an RRCResume message to indicate whether to maintain or discard the configuration information for SCells or the configuration information for SCGs. As another method, whether to maintain or discard configuration information for SCells or configuration information for SCGs may be indicated by using a complete configuration information indicator (fullConfig). As another method, when a base station transmits an RRCRelease message to an RRC connected mode terminal to shift the terminal to an RRC inactive mode, whether to maintain or discard SCell (MCG or SCG) or SCG configuration information may be indicated to the RRCRelease message. Accordingly, a terminal may maintain configuration information of SCells or SCGs according to an indicator of an RRCRelease message, and may apply configuration information according to indication (for example, an RRC message) by a base station even when an RRC connection resumption procedure starts. For example, if an RRCRelease message does not include indication of SCell or SCG configuration information, SCell or SCG configuration information is canceled, and if there is an indicator for indicating maintenance, storage, or discarding of MCG SCell configuration information or SCG PSCell or SCell configuration information, configuration information is stored and maintained according thereto and is applied to an RRC connection resumption procedure to be applied according to indication (an RRC message) by a base station. Configuration information for SCells or configuration information for SCGs may refer to PDCP layer (PDCP entity) configuration information, SDAP layer configuration information, RLC layer configuration information, MAC layer configuration information, or PHY layer configuration information, and may indicate a part or all of the above-mentioned pieces of information. As another method, since an RRC inactive mode terminal moves while performing a LAN indication area update procedure, whether to maintain or discard configuration information for SCells or SCGs may be indicated by an RRCRelease message received in the LAN indication area update procedure. It is because, when an LAN indication area update procedure is performed, a context may be collected and terminal configuration information may be recognized by an identifier. As another method, in case that, when an RRC inactive terminal performs an RRC connection resumption procedure with a base station, the base station indicates falling-back by an RRCSetup message in response to an RRCResumeRequest message transmitted by the terminal for a designated reason (for example, if terminal context collection fails), the terminal may discard configuration information for SCells or configuration information for SCGs. It is because a base station may not collect a terminal context, and thus the base station may not recognize configuration information for SCells or configuration information for SCGs, the configuration information being stored in a terminal. Configuration information for SCells or configuration information for SCGs may refer to PDCP layer (PDCP entity) configuration information, SDAP layer configuration information, RLC layer configuration information, MAC layer configuration information, or PHY layer configuration information, and may indicate a part or all of the above-mentioned pieces of information. As the above-described methods are applied, a base station may rapidly configure, for a terminal, a carrier aggregation technology or a dual connectivity technology by an RRCResume message or an RRCReconfiguration message in an RRC connection resumption procedure by using existing SCell information or SCG information stored in the terminal. In case that dual connectivity technology is configured, preamble information, frequency information, or the like required when random access is performed for an SCG may be included in notification to a terminal. In addition, an RRCResume message or an RRCReconfiguration message may indicate activation of SCells or SCGs, and may indicate rapid channel measurement information (short CSI reporting or aperiodic CSI reporting) together.

In addition, when RRC connection with a network needs to be configured, a terminal, while configuring connection with a base station, may indicate that there is a result of performing frequency measurement in an RRC idle mode or an RRC inactive mode.

In case that, when a terminal is to reconfigure connection with a network in an RRC idle mode or an RRC inactive mode, an early report for a frequency measurement result is supported in a cell for which connection is to be currently configured, the terminal may prepare a frequency measurement result, perform random access, and then transmit message 3 (for example, an RRCSetupRequest message or an RRCResumeRequest message) to a base station (1H-35). In addition, in order to rapidly configure a carrier aggregation technology or a dual connectivity technology, a base station may transmit, to a terminal, message 4 (for example, an RRCSetup message or an RRCResume message) while including therein an indicator for indicating a report of a frequency measurement result, and as another method, an indicator may be omitted because transmission of message 4 by the base station may represent indication of a report for a frequency measurement result (1H-40). When message 4 is received, a terminal may transmit and report a frequency measurement result together with message 5 (for example, an RRCSetupComplete message or an RRCResumeComplete message) (1H-50). Moreover, connection with a network may be configured, and when a base station transmits message 4 (for example, an RRCSetup message or an RRCResume message) or an RRCReconfiguration message to a terminal, carrier aggregation technology configuration or dual connectivity technology configuration information may be included therein to rapidly restart, change, or newly configure a carrier aggregation technology or a dual connectivity technology for the terminal. As another method, if a plurality of pieces of frequency configuration information, information on SCells, or information on SCGs are provided to an RRCResume message, a terminal may select, based on a premeasured frequency result, a good frequency or SCG (for example, selection may be made based on a condition configured by the base station, for example, determination may be made by the intensity of a signal which is equal to or larger than a certain standard), and may report, by RRCResumeComplete, information on SCells or SCGs or frequencies satisfying a designated condition. Otherwise, the terminal may directly perform connection by performing a random access procedure for SCells or SCGs or frequencies satisfying a designated condition. In addition, if a terminal completes connection with a corresponding cell or base station which the terminal accesses, the base station may provide, to a source base station, notification of access of the terminal. The source base station may have requested for connection approvals from a plurality of different target base stations. When a timer is operated and the terminal does not access for a certain period of time, each of the target base stations may determine that connection has failed, may indicate that the source base station has configured connection for another target base station, or may directly indicate connection approval cancellation.

In relation to the description above, conditions under which a terminal stops rapid frequency measurement in an RRC idle mode or inactive mode may be as follows.
1. In case that a rapid frequency measurement result report is supported in system information of a current cell, and after or when message 3 is transmitted or is to be transmitted to a base station.
2. In case that a terminal receives, by message 4, indication of a report for a frequency measurement result in a random access procedure for configuring connection with a network while performing RRC idle mode or RRC inactive mode frequency measurement and the terminal is to stop a timer, stop measurement, support a rapid frequency measurement result report in system information of a current cell, and transmit an RRC message (for example, message 5) to a base station to notify that there is a measurement result report.
3. In case that a measurement result report is to be performed by message 5.
4. In case that a measurement report timer (for example, T331) expires.
5. In case of departure from an area indicated in RRC idle mode or RRC inactive mode frequency measurement area information configured in an RRCRelease message.

A terminal may stop RRC idle mode or RRC inactive mode frequency measurement (IDLE mode/INACTIVE mode measurement) according to one or more of the conditions above.

A terminal performs measurement for frequencies that the terminal may measure, that is, that the terminal supports in rapid frequency configuration-related information, and at this time, the terminal may select a frequency to be measured by priority according to designated configured priority.

In the disclosure, proposed as follows is a specific terminal operation of reporting a frequency measurement result in relation to the second embodiment, a method for rapidly performing and reporting frequency measurement in an RRC idle mode or an RRC inactive mode.

When a terminal receives a random access response and message 4 from a base station, the terminal may perform the following operations.
If system information (for example, SIB2) transmits or includes an indicator (IDLE or INACTIVE Mode Measurement) for indicating a support of RRC idle mode or RRC inactive mode frequency measurement and the terminal has a frequency measurement result measured in an RRC idle mode or an RRC inactive mode,
the terminal configures message 5 (an RRCSetupRequest message or an RRCResumeRequest message) to include an RRC idle mode or RRC inactive mode frequency measurement result in the message. As another method, an RRC message (for example, message 5) and a frequency measurement result may be transmitted after multiplexed in an MAC layer. Accordingly, it may be indicated by the message that there is RRC idle mode or RRC inactive mode frequency measurement information to be reported to a base station.
Since a frequency measurement result is to be reported, a timer (for example, T331) for RRC idle mode or RRC inactive mode frequency measurement is stopped. Frequency measurement is stopped, and frequency measurement configuration information and a frequency measurement result may also be discarded.

The disclosure below proposes a short cycle-based channel measurement reporting (short CSI reporting) method at the time of activating a PCell, an SCell, or a PSCell by configuration of an MAC CE or RRC message, such that a terminal may rapidly report, to a base station, channel measurement in a short cycle for the activated PCell, SCell, or PSCell and thus allow the base station to rapidly assign, based thereon, a transmission resource to the terminal, and data transmission/reception may rapidly start. Configuration information for the short cycle-based channel measurement reporting method may be configured by a base station via an RRC message identical to 1E-30 (an RRCSetup message), 1E-45 (an RRCReconfiguration message), or 1E-65 (an RRCReconfiguration message) in FIGS. 1E and 1h-40 (an RRCResume message) in FIG. 1G, and the configuration information may be configured to include: a measurement cycle of measuring a channel; a transmission resource (for example, a PUCCH transmission resource, a specific sub-frame number which may report a transmission resource, or the like), a measurement result of which should be reported; frequency information to be measured; a signal intensity critical value which may be determined by a cell identifier or a valid measurement result (for example, the intensity of a signal, which is larger than a critical value, may be determined as a valid measurement result); a measurement method; or when a time point at which the RRC message is performed is n (for example, a sub-frame n), the value of X and the value of Y for performing, based on a short cycle, a frequency channel measurement report between n+X and n+Y (for example, a sub-frame, a TTI, or a symbol unit).

In addition, the disclosure proposes that a base station may directly configure an active, inactive, or idle state of an SCell or a PSCell via an RRC message identical to 1E-30 (an RRCSetup message), 1E-45 (an RRCReconfiguration message), or 1E-65 (an RRCReconfiguration message) in FIGS. 1E and 1h-40 (an RRCResume message) in FIG. 1G. Moreover, the disclosure proposes that a state of an SCell or a PSCell may be directly configured to an active, inactive, or idle state via an RRC message or an MAC CE, and when an SCell or a PSCell receives indication of an active state by an MAC CE or an RRC message, in case that a short cycle-based channel measurement reporting method or configuration is configured for the SCell or the PSCell to which indication of activation has been provided, a terminal may report, based on the short cycle-based channel measurement reporting method, a rapid channel measurement result for the SCell or the PSCell to a base station.

In case that activation is indicated to an SCell or a PSCell by an MAC CE, when a time point at which the MAC CE is received is n (for example, a sub-frame, a TTI, or a symbol n), a terminal may rapidly report, to a base station, channel measurement for the SCell or the PSCell in a short cycle configured for the terminal between (n+A)th and (n+B)th. In case that activation is indicated to an SCell or a PSCell by an RRC message, when a time point at which the RRC message is received is n (for example, a sub-frame, a TTI, or a symbol n), a terminal may rapidly report, to a base station, channel measurement for the SCell or the PSCell in a short cycle configured for the terminal between (n+X)th and (n+Y)th. The value of A or the value of B may be smaller than the value of X or the value of Y. It is because an MAC CE processing speed is much more rapid than a speed in which an RRC message is processed and read. The values of A, B, X, and Y may be predefined and may be fixed values, and as another method, a base station may be configured to have different cell-specific values from each other, as configured by an RRC message. In addition, in order to save a battery of a terminal and prevent power consumption, the terminal stops the short cycle-based channel measurement reporting method after n+Y or after n+B, and if a general long cycle-based channel measurement reporting method is configured, the long cycle-based channel measurement reporting method (CSI reporting) may fall back after n+Y or after n+B. For example, the value of A and the value of B may be configured of defined as 8 and 34, respectively, and the value of X and the value of Y may be defined as 20 and 34, respectively.

Whether to activate, idle, or inactivate an SCell or a PSCell may be indicated by an RRC message identical to 1E-30 (an RRCSetup message), 1E-45 (an RRCReconfiguration message), or 1E-65 (an RRCReconfiguration message) in FIGS. 1E and 1h-40 (an RRCResume message) in FIG. 1G.

The short cycle-based channel measurement reporting method may be applied to and used for a PCell or a serving cell. For example, the method may be applied to and used for a handover procedure, an RRC connection re-establishment procedure, or an RRC connection resumption procedure. For example, when a terminal shifts from an RRC connected mode to an RRC idle mode or an RRC inactive mode, a base station may transmit, to the terminal, an RRCRelease message or a handover command message while including therein a short cycle-based channel measurement reporting method or configuration information which may be used for a handover procedure or may be applied to an RRC connection resumption procedure later. In case that a handover completion message is received from a target base station when the terminal performs a handover procedure (or in case of indication by an indicator in a random access response), the terminal may rapidly report channel measurement for a serving cell to the target base station by applying the short cycle-based channel measurement reporting method. When the terminal performs an RRC connection resumption procedure, the terminal may rapidly report channel measurement for a serving cell by applying the short cycle-based channel measurement reporting method when an RRCResume is performed. In the RRC connection resumption procedure, a terminal may transmit, to a base station, an RRCResumeRequest message and then receive an RRCSetup message, an RRCReject message, or an RRCResume message from the base station. The RRCSetup message and the RRCReject message are received from SRB0, and an RRCResume message is always received from SRB1. Accordingly, in case that a short cycle channel measurement reporting method or configuration is configured for a PCell or a serving cell in an RRCRelease message, the value of X and the value of Y may be configured to be smaller, and a terminal may transmit an RRCResumeRequest message in an RRC connection resumption procedure to enable a rapid channel measurement report, may then receive, in response thereto, data having a logical channel identifier corresponding to SRB1 from an MAC layer, and may immediately rapidly report, to a base station, a channel measurement result for a serving cell, based on short cycle-based channel measurement configuration information. Accordingly, a delay of processing for reading an RRCResume message may be reduced. In addition, if a terminal transmits an RRCResumeRequest message in an RRC connection resumption procedure and then receives, in response thereto, a logical channel identifier corresponding to SRB0 from an MAC layer, connection with the serving cell fails, and thus short cycle-based channel measurement configuration information is not performed.

As another method, a base station may transmit an RRCResume message while including therein a short cycle-based channel measurement reporting method or configuration information for a serving cell (a PCell), an SCell, or a PSCell, and thus a terminal may process and read the RRCResume message and report channel measurement for the serving cell (PCell), the SCell, or the PSCell in a short cycle between n+X and n+Y.

As another method, in order to apply a non-cyclic channel measurement reporting method (aperiodic CSI reporting), a base station may provide, to a terminal by using DCI of a PDCCH, indication of channel measurement for a PCell, an SCell, or a PSCell and may provide, by an uplink transmission resource indicated by the DCI of the PDCCH, indication of a report for the channel measurement. Accordingly, the non-cyclic channel measurement reporting method may perform a channel measurement report only once by the assigned uplink transmission resource, and may also perform triggering after indicating, by an RRCResume message or an RRCReconfiguration message, activation of the PCell, the SCell, or the PSCell.

Only in case that, when an RRC message or an MAC CE indicates activation of a PCell, an SCell, or a PSCell, a short cycle-based channel measurement reporting method or configuration information is configured for the PCell, the SCell, or the PSCell, a terminal performs a short cycle-based channel measurement report.

In addition, a terminal may perform the proposed short cycle channel measurement reporting method in a specific partial bandwidth configured or indicated for each of cells in an RRC message of FIG. 1E. The specific partial bandwidth in the RRC message is configured as a partial bandwidth to which a short cycle channel measurement reporting method may be applied, and short cycle channel measurement reporting method configuration information may be configured for the specific partial bandwidth. The specific partial bandwidth may be configured as a first active partial bandwidth. It is because a first active partial bandwidth is activated and used when the terminal activates a cell, and thus applying the short cycle channel measurement reporting method to the first active partial bandwidth may be efficient for rapid activation and data transmission/reception. As another method, the specific partial bandwidth may be indicated as one of a plurality of partial bandwidths by a partial bandwidth identifier, and thus may be indicated as the same partial bandwidth as an initial partial bandwidth, a default partial bandwidth, or a first active partial bandwidth. As another method, the short cycle channel measurement reporting method configuration information may be configured while being included in PHY layer or MAC layer configuration information. When activation is indicated, by L1 signaling, an MAC CE, or an RRC, to each of cells (an SCell, a PCell, or a PSCell) configured for a terminal or when a partial bandwidth is indicated by L1 signaling, an MAC CE, or an RRC, it is identified whether or not the short cycle channel measurement reporting method configuration information is configured for a specific partial bandwidth or a first active partial bandwidth indicated by an RRC message, and a short cycle channel measurement reporting method may be performed for the partial bandwidth.

In the disclosure, a partial bandwidth may indicate an uplink partial bandwidth or a downlink partial bandwidth.

The disclosure below proposes the first embodiment of a specific terminal operation of performing a short cycle-based channel measurement report. In the first embodiment, a short cycle-based channel measurement reporting method is applied only in case that a PCell, an SCell, or a PSCell is activated by an MAC CE. That is, in case that a PCell, an SCell, or a PSCell is activated by an RRC message, it is difficult to define an accurate timing of the value of X or the value of Y due to a delay of processing of reading the RRC message, and thus the short cycle-based channel measurement reporting method is not applied.

The first embodiment of a specific terminal operation of performing a short cycle-based channel measurement report in the disclosure is as follows.

Each of MAC entities of a terminal may perform, on each of TTIs, the following procedure for a PCell, an SCell, or a PSCell.

If an MAC entity of a terminal is configured, via configuration information for a PCell, an SCell, or a PSCell of an RRC message, to activate the PCell, the SCell, or the PSCell or if the MAC entity receives an MAC CE for indicating activation of the PCell, the SCell, or the PSCell, the terminal performs the following procedure according to timing requirements.

A PCell, an SCell, or a PSCell is activated according to indication by an RRC message or an MAC CE. Otherwise, a partial bandwidth of the PCell, the SCell, or the PSCell (a specific partial bandwidth or a first active partial bandwidth designated by the RRC message) is activated.

If a short cycle-based channel measurement reporting method (for example, cqi-shortConfigSCell) is configured for a PCell, an SCell, or a PSCell to which indication of activation has been provided, and activation of the PCell, the SCell, or the PSCell is indicated by an MAC CE (that is, if activation of the PCell, the SCell, or the PSCell is not indicated by an RRC message), or if a short cycle-based channel measurement reporting method (for example, cqi-shortConfigSCell) is configured for a partial bandwidth of the PCell, the SCell, or the PSCell (a specific partial bandwidth or a first active partial bandwidth designated by an RRC message), and activation of the partial bandwidth of the PCell, the SCell, or the PSCell (the specific partial bandwidth or the first active partial bandwidth designated by the RRC message) is indicated by an MAC CE (that is, if activation of the partial bandwidth of the PCell, the SCell, or the PSCell (the specific partial bandwidth or the first active partial bandwidth designated by the RRC message) is not indicated by the RRC message), a terminal performs a short cycle-based channel measurement reporting method for the PCell, the SCell, or the PSCell according to timing requirements, for example, between n+A and n+B. A channel measurement report may include information such as a channel quality indicator (CQI), a precoding matrix indicator (PMI), a rank indicator (RI), or a channel rank indicator (CRI).

In another case (if a short cycle-based channel measurement reporting method (for example, cqi-shortConfigSCell) is not configured for the PCell, the SCell, or the PSCell, if activation of the PCell, the SCell, or the PSCell is indicated by an RRC message, or if activation of a partial bandwidth of the PCell, the SCell, or the PSCell (a specific partial bandwidth or a first active partial bandwidth designated by an RRC message) is indicated by the RRC message), a channel measurement report may be performed by applying a general long cycle-based channel measurement reporting method (for example, cqi-ReportConfigSCell), if configured.

If the PCell, the SCell, or the PSCell or a partial bandwidth of the PCell, the SCell, or the PSCell (a specific partial bandwidth or a first active partial bandwidth designated by an RRC message) is in an active state and a time of performing a short cycle-based measurement reporting method according to timing requirements expires or should be stopped, a channel measurement report may be performed by applying a general long cycle-based channel measurement reporting method (for example, cqi-ReportConfigSCell), if configured. That is, a short cycle may fall back to a long cycle to save a battery of a terminal.

The disclosure below proposes the second embodiment of a specific terminal operation of performing a short cycle-based channel measurement report. In the second embodiment, a short cycle-based channel measurement reporting method is applied in case that a PCell, an SCell, or a PSCell is activated by an MAC CE and by an RRC message as well. That is, in case that a PCell, an SCell, or a PSCell is activated by an RRC message, a short cycle-based channel measurement reporting method is applied between the value of n+X and the value of n+Y in consideration of a delay of processing of reading the RRC message, and in case that a PCell, an SCell, or a PSCell is activated by an MAC CE, a short cycle-based channel measurement reporting method is applied between the value of n+A and the value of n+B.

The second embodiment of a specific terminal operation of performing a short cycle-based channel measurement report in the disclosure is as follows.

Each of MAC entities of a terminal may perform, on each of TTIs, the following procedure for a PCell, an SCell, or a PSCell.

If an MAC entity of a terminal is configured, via configuration information for a PCell, an SCell, or a PSCell of an RRC message, to activate the PCell, the SCell, or the PSCell or a partial bandwidth of the PCell, the SCell, or the PSCell (a specific partial bandwidth or a first active partial bandwidth designated by the RRC message) or if the MAC entity receives an MAC CE for indicating activation of the PCell, the SCell, or the PSCell or the partial bandwidth of the PCell, the SCell, or the PSCell (the specific partial bandwidth or the first active partial bandwidth designated by the RRC message), the terminal performs the following procedure according to timing requirements.

A PCell, an SCell, or a PSCell or a partial bandwidth of the PCell, the SCell, or the PSCell (a specific partial bandwidth or a first active partial bandwidth designated by an RRC message) is activated according to indication by the RRC message or an MAC CE.

If a short cycle-based channel measurement reporting method (for example, cqi-shortConfigSCell) is configured for a PCell, an SCell, or a PSCell to which indication of activation has been provided, or a partial bandwidth of the PCell, the SCell, or the PSCell (a specific partial bandwidth or a first active partial bandwidth designated by an RRC message), a terminal performs a short cycle-based channel measurement reporting method for the PCell, the SCell, or the PSCell or the partial bandwidth of the PCell, the SCell, or the PSCell (the specific partial bandwidth or the first active partial bandwidth designated by the RRC message) according to timing requirements, for example, between n+A and n+B (in case that activation is indicated by an MAC CE) or between n+X and n+Y (in case that activation is indicated by the RRC message). A channel measurement report may include information such as a channel quality indicator (CQI), a precoding matrix indicator (PI), a rank indicator (RI), or a channel rank indicator (CRI).

In another case (if a short cycle-based channel measurement reporting method (cqi-shortConfigSCell) is not configured for the PCell, the SCell, or the PSCell or a partial bandwidth of the PCell, the SCell, or the PSCell (a specific partial bandwidth or a first active partial bandwidth designated by an RRC message)), a channel measurement report may be performed by applying a general long cycle-based channel measurement reporting method (for example, cqi-ReportConfigSCell), if configured.

If the PCell, the SCell, or the PSCell, or a partial bandwidth of the PCell, the SCell, or the PSCell (a specific partial bandwidth or a first active partial bandwidth designated by an RRC message) is in an active state and a time of performing a short cycle-based measurement reporting method according to timing requirements expires or should be stopped, a channel measurement report may be performed by applying a general long cycle-based channel measurement reporting method (for example, cqi-ReportConfigSCell), if configured. That is, a short cycle may fall back to a long cycle to save a battery of a terminal.

In addition, in the disclosure, PCell, SCell, or PSCell configuration information, which has been configured for an RRC connected mode terminal, is stored as terminal context information when the terminal shifts to an RRC inactive mode. When the terminal later starts an RRC connection resumption procedure to configure connection with a network, the PCell, SCell, or PSCell configuration information may be used, without being discarded, for rapid serving cell activation, rapid carrier aggregation technology activation, or rapid dual connectivity technology activation. When the terminal transmits an RRCRelease message for indicating a shift to an RRC inactive mode, the base station may define an indicator for indicating whether to discard or store, by the terminal, each piece of the PCell, SCell, or PSCell configuration information and may provide indication to the terminal. For example, if the RRCRelease message does not have an indicator for PCell, SCell, or PSCell configuration information, a terminal may discard the PCell, SCell, or PSCell configuration information when the RRCRelease message is received or when an RRC connection resumption procedure is performed later. In addition, if the RRCRelease message includes only an indicator for PCell configuration information, only configuration information about the PCell configuration information from among PCell, SCell, or PSCell configuration information may be stored, and the other configuration information may be discarded when a terminal receives the RRCRelease message or when an RRC connection resumption procedure is performed later. Moreover, if the RRCRelease message includes only an indicator for SCell configuration information, only configuration information about the SCell configuration information from among PCell, SCell, or PSCell configuration information may be stored, and the other configuration information may be discarded when a terminal receives the RRCRelease message or when an RRC connection resumption procedure is performed later. Furthermore, if the RRCRelease message includes only an indicator for MCG configuration information, only configuration information about the MCG (PCell or SCell) configuration information from among PCell, SCell, or PSCell configuration information may be stored, and the other configuration information may be discarded when the terminal receives the RRCRelease message or when an RRC connection resumption procedure is performed later. In addition, if the RRCRelease message includes only an indicator for SCG configuration information, only configuration information about the SCG (PSCell or SCell) configuration information from among PCell, SCell, or PSCell configuration information may be stored, and the other configuration information may be discarded when a terminal receives the RRCRelease message or when an RRC connection resumption procedure is performed later. Moreover, if the RRCRelease message includes an indicator for MCG and SCG configuration information, configuration information about the MCG (PCell or SCell) and SCG configuration information from among PCell, SCell, or PSCell configuration information may be stored. Information stored by indication by the indicator of the RRCRelease message is not discarded by a terminal or a base station when an RRC connection resumption procedure is performed.

As another method, when the RRCRelease is received, a terminal may store all of PCell, SCell, or PSCell configuration information. Even when the terminal starts an RRC connection resumption procedure, all of the information is not discarded. As proposed in the above-described RRCRelease message, when the terminal performs the RRC connection resumption procedure and receives an RRCRelease message from a base station, an indicator for each piece of the PCell, SCell, or PSCell configuration information may be defined for the RRCRelease message to determine whether or not to discard the PCell, SCell, or PSCell configuration information and to indicate a change in partial configuration information, and a new indicator (for example, fullconfig) may be used to discard all of existing configuration information and indicate completely new configuration.

In addition, in the disclosure, as described above, when a terminal stores PCell, SCell, or PSCell configuration information and uses the configuration information for an RRC connection resumption procedure, a base station may directly configure an active state for an SCell or a PSCell by an RRCResume message, such that a carrier aggregation technology or a dual connectivity technology may be rapidly configured or activated. When the RRCResume message is received, in case that an active state for an SCell or a PSCell is indicated by the RRCResume message, a terminal may use the short cycle-based channel measurement reporting method proposed by the disclosure. Moreover, when the RRCResume message is received, a terminal may also apply the short cycle-based channel measurement reporting method to a serving cell, that is, a PCell.

Figure 1H:
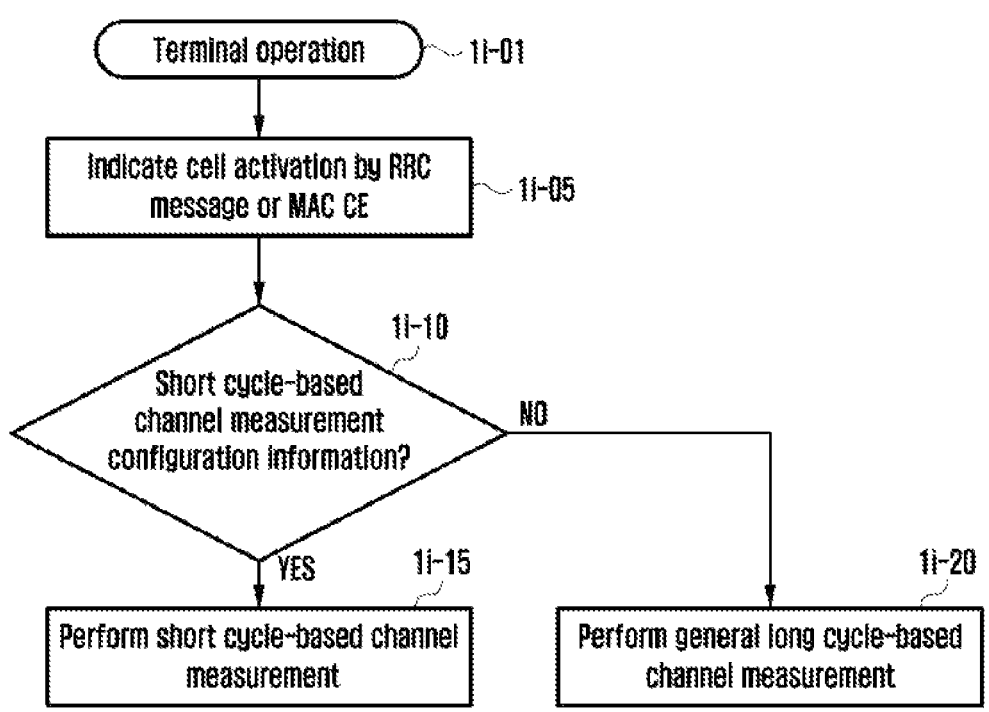
FIG. 1H illustrates a view showing a terminal operation of performing a short cycle-based frequency measurement reporting method, proposed by the disclosure.

FIG. 1H illustrates a view showing a terminal operation of performing a short cycle-based frequency measurement reporting method, proposed by the disclosure.

In FIG. 1H, each of MAC entities of a terminal may perform, on each of TTIs, the following procedure for a PCell, an SCell, or a PSCell or a partial bandwidth of the PCell, the SCell, or the PSCell (a specific partial bandwidth or a first active partial bandwidth designated by an RRC message).

If an MAC entity of a terminal is configured, via configuration information for a PCell, an SCell, or a PSCell of an RRC message, to activate the PCell, the SCell, or the PSCell or a partial bandwidth of the PCell, the SCell, or the PSCell (a specific partial bandwidth or a first active partial bandwidth designated by the RRC message) or if the MAC entity receives an MAC CE for indicating activation of the PCell, the SCell, or the PSCell or the partial bandwidth of the PCell, the SCell, or the PSCell (the specific partial bandwidth or the first active partial bandwidth designated by the RRC message) (1I-05), the terminal performs the following procedure according to timing requirements.

A PCell, an SCell, or a PSCell is activated according to indication by an RRC message or an MAC CE, and if a short cycle-based channel measurement reporting method (for example, cqi-shortConfigSCell) is configured for the PCell, the SCell, or the PSCell to which indication of activation has been provided, or a partial bandwidth of the PCell, the SCell, or the PSCell (a specific partial bandwidth or a first active partial bandwidth designated by the RRC message) (1I-10), a terminal may perform a short cycle-based channel measurement report for the PCell, the SCell, or the PSCell according to timing requirements, for example, between n+A and n+B (in case that activation is indicated by the MAC CE) or between n+X and n+Y (in case that activation is indicated by the RRC message) (1I-15). A channel measurement report may include information such as a channel quality indicator (CQI), a precoding matrix indicator (PMI), a rank indicator (RI), or a channel rank indicator (CRI).

In another case (if a short cycle-based channel measurement reporting method (cqi-shortConfigSCell) is not configured for the PCell, the SCell, or the PSCell) (1I-10), a channel measurement report may be performed by applying a general long cycle-based channel measurement reporting method (for example, cqi-ReportConfigSCell) (1I-20). If the PCell, the SCell, or the PSCell is in an active state and a time of performing a short cycle-based measurement reporting method according to timing requirements expires or should be stopped, a channel measurement report may be performed by applying a general long cycle-based channel measurement reporting method (for example, cqi-ReportConfigSCell). That is, a short cycle may fall back to a long cycle to save a battery of a terminal.

In the disclosure, indication of an active, idle, or inactive state of a partial bandwidth of a PCell, an SCell, or a PSCell (a specific partial bandwidth or a first active partial bandwidth designated by an RRC message) or switching or non-switching thereof to a specific partial bandwidth may be indicated by L1 signaling (DCI of a PDCCH).

Figure 1I:
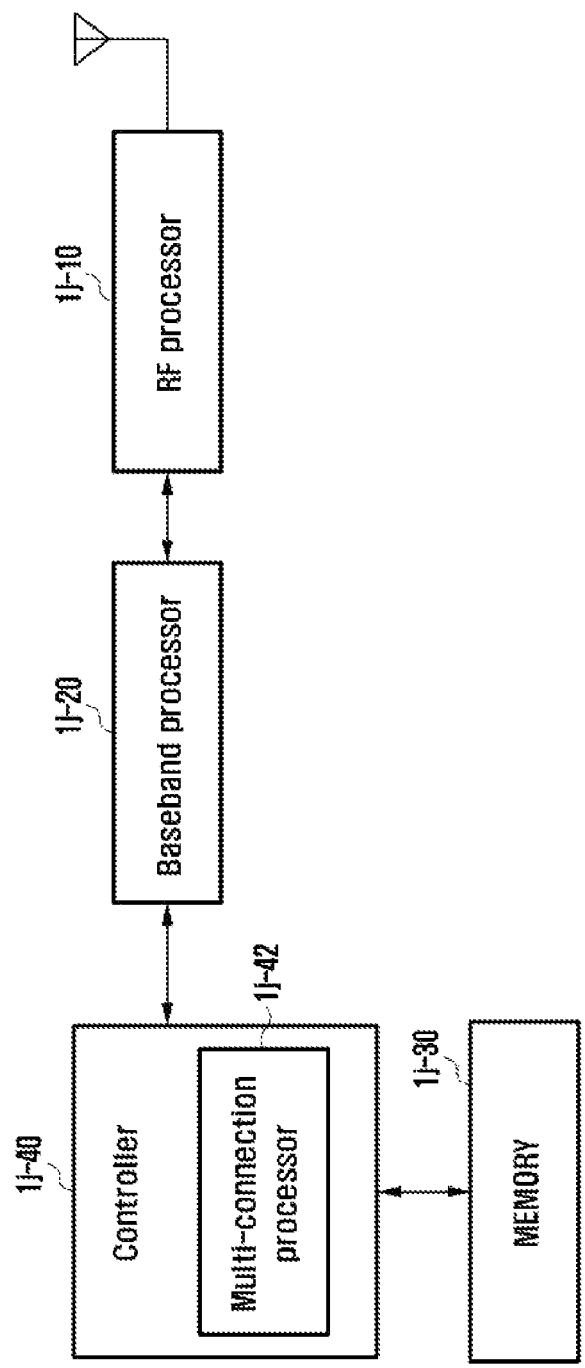
FIG. 1I illustrates the structure of a terminal to which embodiments are applicable.

FIG. 1I illustrates the structure of a terminal to which embodiments are applicable.

Referring to FIG. 1I, the terminal includes a radio frequency (RF) processor 1J-10, a baseband processor 1J-20, a memory 1J-30, and a controller 1J-40.

The radio frequency (RF) processor 1J-10 performs a function of transmitting or receiving a signal through a radio channel, such as band conversion and amplification of a signal. That is, the RF processor 1J-10 up-converts a baseband signal provided from the baseband processor 1J-20 into an RF band signal and then transmits the baseband signal through an antenna, and down-converts the RF band signal received through the antenna into the baseband signal. For example, the RF processor 1J-10 may include a transmission filter, a reception filter, an amplifier, a mixer, an oscillator, a digital to analog convertor (DAC), an analog to digital convertor (ADC), or the like. FIG. 1I illustrates only one antenna but the terminal may include multiple antennas. In addition, the RF processor 1J-10 may include multiple RF chains. Moreover, the RF processor 1J-10 may perform beamforming. For the beamforming, the RF processor 1J-10 may adjust a phase and a size of each of signals transmitted or received through multiple antennas or antenna elements. Furthermore, the RF processor may perform a MIMO operation and receive multiple layers when the MIMO operation is performed. The RF processor 1J-10 may appropriately configure multiple antennas or antenna elements according to a control of the controller so as to perform reception beam sweeping, or may adjust the direction of a reception beam and a beam width such that a reception beam accords with a transmission beam.

The baseband processor 1J-20 performs a function for conversion between a baseband signal and a bitstream according to the physical layer standard of a system. For example, at the time of data transmission, the baseband processor 1J-20 produces complex symbols by encoding and modulating a transmission bitstream. In addition, at the time of data reception, the baseband processor 1J-20 restores a reception bitstream by demodulating and decoding a baseband signal provided from the RF processor 1J-10. For example, according to an orthogonal frequency division multiplexing (OFDM) scheme, at the time of data transmission, the baseband processor 1J-20 produces complex symbols by encoding and modulating a transmission bitstream, maps the complex symbols to subcarriers, and then configures OFDM symbols via an inverse fast Fourier transform (IFFT) operation and a cyclic prefix (CP) insertion. Moreover, at the time of data reception, the baseband processor 1J-20 divides a baseband signal provided from the RF processor 1J-10 into OFDM symbol units, restores signals mapped to subcarriers via a fast Fourier transform (FFT) operation, and then restores a reception bitstream via demodulation and decoding.

The baseband processor 1J-20 and the RF processor 1J-10 transmit and receive a signal, as described above. Accordingly, each of the baseband processor 1J-20 and the RF processor 1J-10 may be referred to as a transmitter, a receiver, a transceiver, or a communicator. In addition, at least one of the baseband processor 1J-20 or the RF processor 1J-10 may include multiple communication modules so as to support multiple different radio access technologies from each other. Moreover, at least one of the baseband processor 1J-20 and the RF processor 1J-10 may include different communication modules from each other to process signals of different frequency bands from each other. For example, the different radio access technologies from each other may include an LTE network, an NR network, and the like. Furthermore, the different frequency bands from each other may include a super-high frequency (SHF) (for example: 2.5 GHz and 5 GHz) band and a millimeter (mm) wave (for example: 60 GHz) band.

The memory 1J-30 stores data such as a basic program, an application program, and configuration information for operations of the terminal. The memory 1J-30 provides stored data according to a request from the controller 1J-40.

The controller 1J-40 controls overall operations of the terminal. For example, the controller 1J-40 transmits or receives a signal through the baseband processor 1J-20 and the RF processor 1J-10. In addition, the controller 1J-40 records and reads data to and from the memory 1J-30. To this end, the controller 1J-40 may include at least one processor. For example, the controller 1J-40 may include a communication processor (CP) for performs a control for communication and an application processor (AP), for controlling a higher layer such as an application program.

FIG. 1I illustrates a block diagram of the configuration of a TRP in a radio communication system to which embodiments are applicable.

Figure 1J:
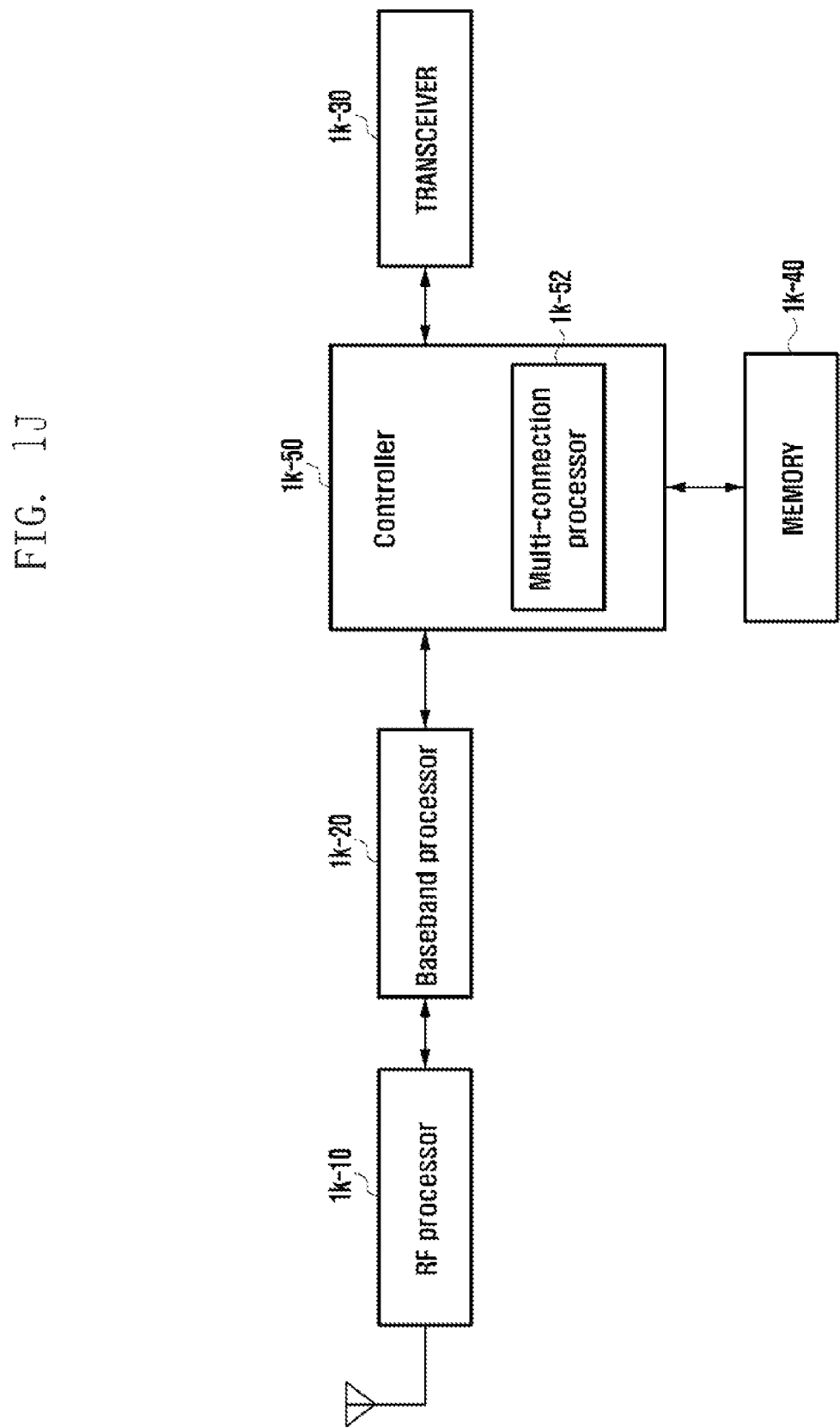
FIG. 1J illustrates a block diagram of the configuration of a TRP in a radio communication system to which embodiments are applicable.

As illustrated in FIG. 1J, the base station is configured to include an RF processor 1K-10, a baseband processor 1K-20, a backhaul transceiver 1K-30, a memory 1K-40, and a controller 1K-50.

The radio frequency (RF) processor 1K-10 performs a function of transmitting or receiving a signal through a radio channel, such as band conversion and amplification of a signal. That is, the RF processor 1K-10 up-converts a baseband signal provided from the baseband processor 1K-20 into an RF band signal and then transmits the baseband signal through an antenna, and down-converts the RF band signal received through the antenna into the baseband signal. For example, the RF processor 1K-10 may include a transmission filter, a reception filter, an amplifier, a mixer, an oscillator, a DAC, an ADC, or the like. FIG. 1J illustrates only one antenna but the first access node may include multiple antennas. In addition, the RF processor 1K-10 may include multiple RF chains. Moreover, the RF processor 1K-10 may perform beamforming. For the beamforming, the RF processor 1K-10 may adjust a phase and a size of each of signals transmitted or received through multiple antennas or antenna elements. The RF processor may perform a downward MIMO operation by transmitting one or more layers.

The baseband processor 1K-20 performs a function for conversion between a baseband signal and a bitstream according to the physical layer standard of a first radio access technology. For example, at the time of data transmission, the baseband processor 1K-20 produces complex symbols by encoding and modulating a transmission bitstream. In addition, at the time of data reception, the baseband processor 1K-20 restores a reception bitstream by demodulating and decoding a baseband signal provided from the RF processor 1K-10. For example, according to an OFDM scheme, at the time of data transmission, the baseband processor 1K-20 produces complex symbols by encoding and modulating a transmission bitstream, maps the complex symbols to subcarriers, and then configures OFDM symbols via an IFFT operation and a CP insertion. Moreover, at the time of data reception, the baseband processor 1K-20 divides a baseband signal provided from the RF processor 1K-10 into OFDM symbol units, restores signals mapped to subcarriers via an FFT operation, and then restores a reception bitstream via demodulation and decoding. The baseband processor 1K-20 and the RF processor 1K-10 transmit and receive a signal, as described above. Accordingly, each of the baseband processor 1K-20 and the RF processor 1K-10 may be referred to as a transmitter, a receiver, a transceiver, a communicator, or a radio communicator.

The transceiver 1K-30 provides an interface for performing communication with other nodes in a network.

The memory 1K-40 stores data such as a basic program, an application program, and configuration information for operations of the main base station. In particular, the memory 1K-40 may store information on a bearer assigned to a connected terminal, a measurement result reported by a connected terminal, or the like. In addition, the memory 1K-40 may store information which is a criterion for determining whether to provide or interrupt multi-connection for a terminal. Moreover, the memory 1K-40 provides stored data according to a request from the controller 1K-50.

The controller 1K-50 controls overall operations of the main base station. For example, the controller 1K-50 transmits or receives a signal through the baseband processor 1K-20 and the RF processor 1K-10 or through the backhaul transceiver 1K-30. In addition, the controller 1K-50 records and reads data to and from the memory 1K-40. To this end, the controller 1K-50 may include at least one processor.

Hereinafter, operation principles of the disclosure will be described in detail with reference to the accompanying drawings. Here, in describing the disclosure, a detailed description thereof will be omitted in case that it is determined that a detailed description related to well-known functions or features may unnecessarily obscure the main idea of the disclosure. Further, the terms as described below are terms defined in consideration of the functions in the disclosure, and may be different according to the intention of a user or an operator, convention, or the like. Therefore, the definitions of the terms should be made based on the contents throughout the specification.

Hereinafter, in describing the disclosure, a detailed description thereof will be omitted in case that it is determined that a detailed description related to well-known functions or features may unnecessarily obscure the main idea of the disclosure. Hereinafter, embodiments will be described in detail with reference to the accompanying drawings.

Terms for identifying access nodes, terms indicating network entities, terms indicating messages, terms indicating interfaces between network entities, terms indicating various pieces of identification information, and the like, that are used in the following description are exemplified for convenience of description. Therefore, the disclosure is not limited to terms to be described below, and other terms that indicate objects having equivalent technical meanings may be used.

Hereinafter, for convenience of description, the disclosure uses terms and names that are defined in the 3rd Generation Partnership Project Long Term Evolution (3GPP LTE) standard. However, the disclosure is not limited to the terms and names and may be identically applied to systems that comply with other standards. In the disclosure, for convenience of description, "eNB" may be used in combination with "gNB". That is, a base station described by "eNB" may refer to "gNB". In addition, the term "terminal" may refer to not only cellular phones, NB-IoT devices, and sensors but also other radio communication devices.

The disclosure proposes an efficient reception operation of a PDCP entity (PDCP layer) of a bearer configured for a terminal in a next generation radio communication system, such that security is enhanced and an unintended loss of data is prevented.

Figure 2A:
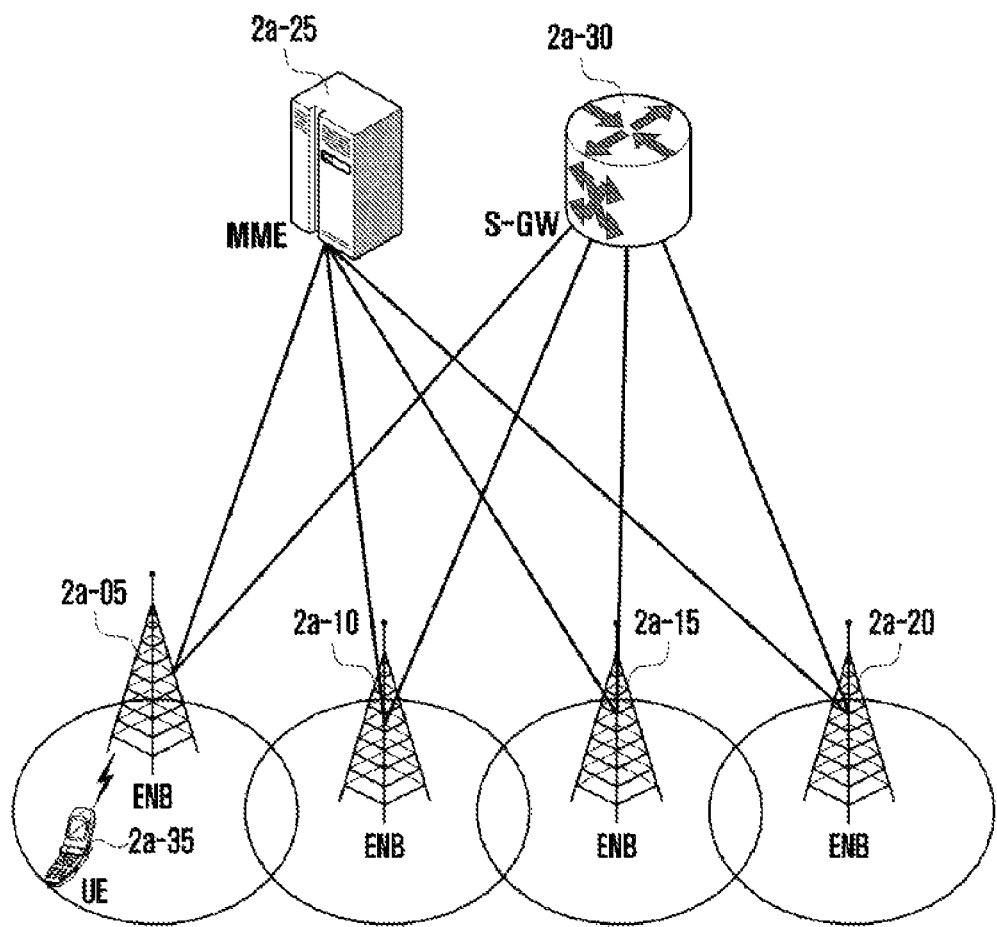
FIG. 2A illustrates a view of the structure of an LTE system to which the disclosure is applicable.

FIG. 2A illustrates a view of the structure of an LTE system to which the disclosure is applicable.

Referring to FIG. 2A, as illustrated therein, a radio access network of an LTE system is composed of a next generation base station (an evolved node B, hereinafter, an ENB, a node B, or a base station) 2A-05, 2A-10, 2A-15, or 2A-20, an MME 2A-25, and an S-GW 2A-30. A user terminal 2A-35 accesses an external network through ENBs 2A-05 to 2A-20 and an S-GW 2A-30.

In FIG. 2A, ENBs 2A-05 to 2A-20 correspond to an existing node B of a UMTS system. An ENB is connected to UE 2A-35 through a radio channel and performs a more complicated role than that of an existing node B. Since in an LTE system, all user traffics as well as a real time service such as VoIP using an Internet protocol are serviced through a shared channel, a device for performing scheduling by gathering state information such as buffer states, available transmission power states, and channel states of pieces of UE is required, and ENBs 2A-05 to 2A-20 serves as the device. One ENB generally controls multiple cells. For example, in order to implement a transmission speed of 100 Mbps. An LTE system uses, as a radio access technology, an orthogonal frequency division multiplexing (OFDM) scheme, for example, in a bandwidth of 20 MHz. In addition, an adaptive modulation-coding (AMC) scheme for determining a modulation scheme and a channel coding rate according to a channel state of a terminal is applied. An S-GW 2A-30 is a device for providing a data bearer and produces or removes a data bearer according to a control of an MME 2A-25. An MME is a device in charge of multiple control functions as well as a mobility management function for a terminal and is connected to multiple base stations.

Figure 2B:
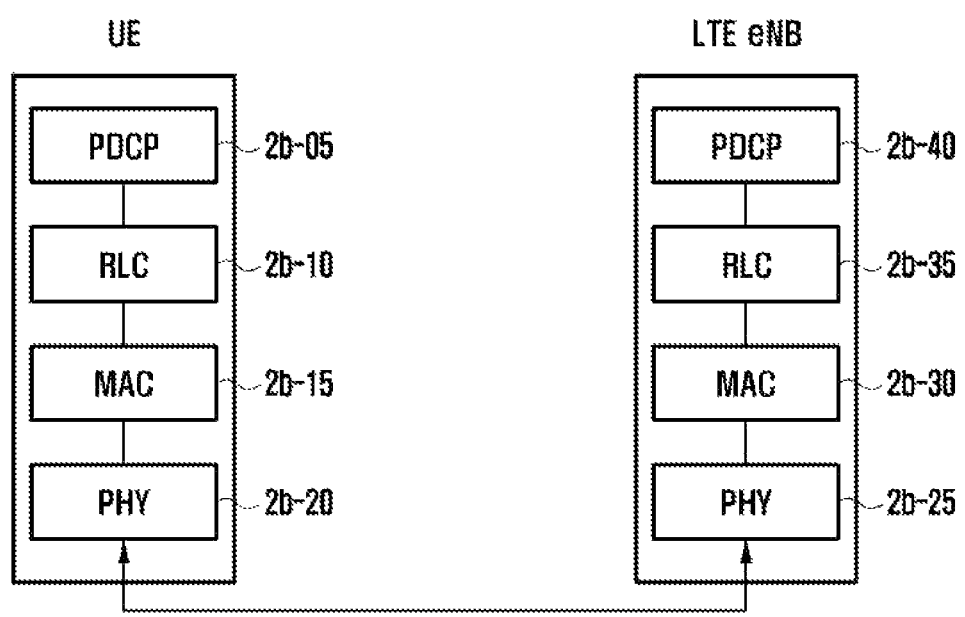
FIG. 2B illustrates a view showing a radio protocol structure in an LTE system to which the disclosure is applicable.

FIG. 2B illustrates a view showing a radio protocol structure in an LTE system to which the disclosure is applicable.

Referring to FIG. 2B, a radio protocol of an LTE system is composed of, in each of a terminal and an ENB, a PDCP 2B-05 or 2B-40, an RLC 2B-10 or 2B-35, and an MAC 2B-15 or 2B-30. A PDCP 2B-05 or 2B-40 is in charge of an operation such as IP header compression/restoration. The major functions of a PDCP are summarized as follows.

Header compression and decompression function (header compression and decompression: ROHC only).
User data transmission function (transfer of user data).
Sequential delivery function (in-sequence delivery of upper layer PDUs at PDCP re-establishment procedure for RLC AM).
Sequence rearrangement function (for split bearers in DC (only support for RLC AM): PDCP PDU routing for transmission and PDCP PDU reordering for reception).
Overlap detection function (duplicate detection of lower layer SDUs at PDCP re-establishment procedure for RLC AM).
Retransmission function (retransmission of PDCP SDUs at handover and, for split bearers in DC, of PDCP PDUs at PDCP data-recovery procedure, for RLC AM).
Ciphering and deciphering function.
Timer-based SDU removal function (timer-based SDU discard in uplink).

A radio link control (RLC) 2B-10 or 2B-35 reconfigures a PDCP packet data unit (PDU) to have an appropriate size and performs an ARQ operation or the like. The major functions of an RLC are summarized as follows.

Data transmission function (transfer of upper layer PDUs).
ARQ function (error correction through ARQ (only for AM data transfer)).
Concatenation, segmentation and reassembly function (concatenation, segmentation and reassembly of RLC SDUs (only for UM and AM data transfer)).
Re-segmentation function (re-segmentation of RLC data PDUs (only for AM data transfer)).
Sequence rearrangement function (reordering of RLC data PDUs (only for UM and AM data transfer)).
Overlap detection function (duplicate detection (only for UM and AM data transfer)).
Error detection function (protocol error detection (only for AM data transfer)).
RLC SDU removal function (RLC SDU discard (only for UM and AM data transfer)).
RLC re-establishment function.

An MAC 2B-15 or 2B-30 is connected to multiple RLC entities configured in one terminal and performs an operation of multiplexing RLC PDUs to an MAC PDU and demultiplexing the RLC PDUs from the MAC PDU. The major functions of an MAC are summarized as follows.

Mapping function (mapping between logical channels and transport channels).
Multiplexing and demultiplexing function (multiplexing/demultiplexing of MAC SDUs belonging to one or different logical channels into/from transport blocks (TB) delivered to/from the physical layer on transport channels).
Scheduling information reporting function.
HARQ function (error correction through HARQ).
Function of adjusting priority between logical channels (priority handling between logical channels of one UE).
Function of adjusting priority between terminals (priority handling between pieces of UE by means of dynamic scheduling).
MBMS service identification function.
Transmission format selection function (transport format selection).
Padding function.

A physical layer 2B-20 or 2B-25 performs an operation of performing channel coding and modulation on higher layer data to make an OFDM symbol therefrom and transmitting the OFDM symbol to a radio channel or an operation of performing demodulation and channel decoding on an OFDM symbol received through a radio channel and delivering the demodulated and channel-decoded symbol to a higher layer.

Figure 2C:
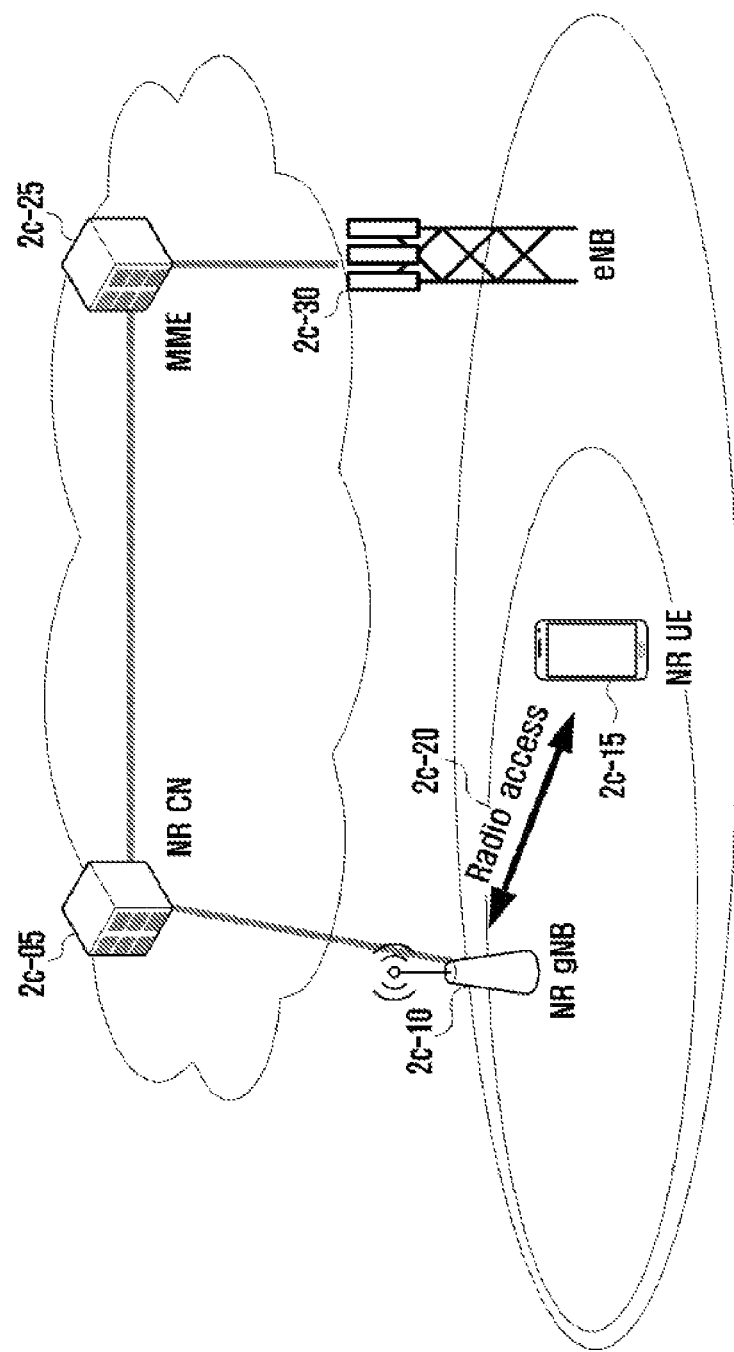
FIG. 2C illustrates a view of the structure of a next generation mobile communication system to which the disclosure is applicable.

FIG. 2C illustrates a view of the structure of a next generation mobile communication system to which the disclosure is applicable.

Referring to FIG. 2C, as illustrated therein, a radio access network of a next generation mobile communication system (hereinafter, NR or 5G) is composed of a next generation base station (a new radio node B, hereinafter, an NR gNB or an NR base station) 2C-10 and an NR CN 2C-05. A user terminal (new radio user equipment, hereinafter, NR UE or a terminal) 2C-15 accesses an external network through an NR gNB 2C-10 and an NR CN 2C-05.

In FIG. 2C, an NR gNB 2C-10 corresponds to an eNB of an existing LTE system. An NR gNB is connected to NR UE 2C-15 through a radio channel and may provide a better service than that of an existing node B. Since in a next generation mobile communication system, all user traffics are serviced through a shared channel, a device for performing scheduling by gathering state information such as buffer states, available transmission power states, and channel states of pieces of UE is required, and an NR NB 2C-10 serves as the device. One NR gNB generally controls multiple cells. In order to implement ultrahigh-speed data transmission compared to current LTE, an existing maximum bandwidth or a larger bandwidth may be included, and by using an orthogonal frequency division multiplexing (OFDM) scheme as a radio access technology, a beamforming technology may be additionally grafted. In addition, an adaptive modulation-coding (AMC) scheme for determining a modulation scheme and a channel coding rate according to a channel state of a terminal is applied. An NR-CN 2C-05 performs a function such as mobility support, bearer configuration, QoS configuration, or the like. An NR-CN is a device in charge of multiple control functions as well as a mobility management function for a terminal and is connected to multiple base stations. Moreover, a next generation mobile communication system may be linked with an existing LTE system, and an NR CN is connected to an MME 2C-25 through a network interface. An MME is connected to eNB 2C-30, an existing base station.

Figure 2D:
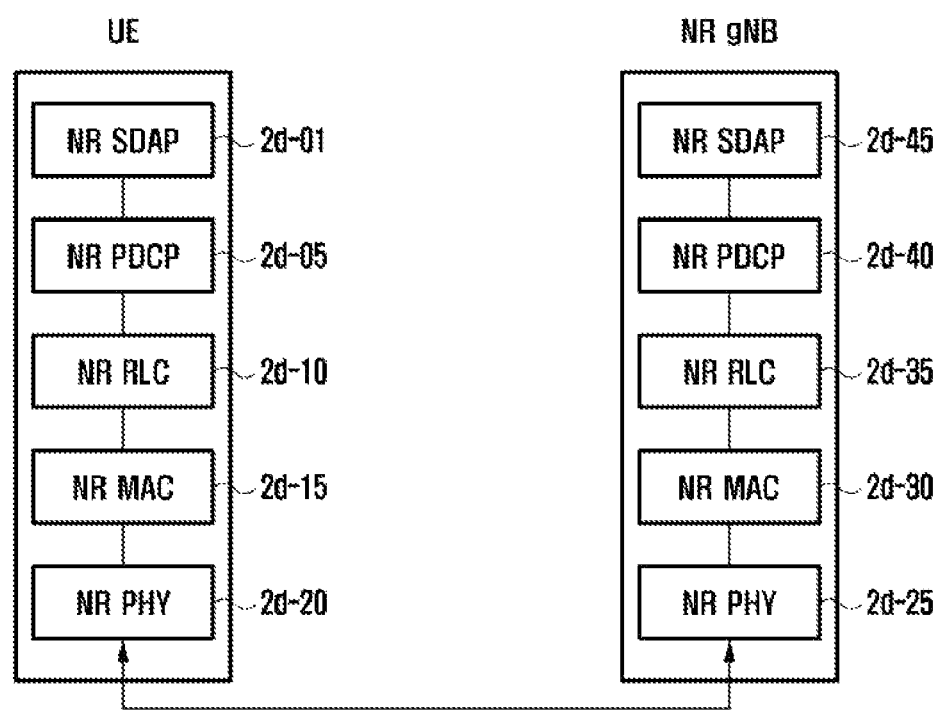
FIG. 2D illustrates a view showing a radio protocol structure of a next generation mobile communication system to which the disclosure is applicable.

FIG. 2D illustrates a view showing a radio protocol structure of a next generation mobile communication system to which the disclosure is applicable.

Referring to FIG. 2D, a radio protocol of a next generation mobile communication system is composed of, in each of a terminal and an NR base station, an NR SDAP 2D-01 or 2D-45, an NR PDCP 2D-05 or 2D-40, an NR RLC 2D-10 or 2D-35, and an NR MAC 2D-15 or 2D-30.

The major functions of an NR SDAP 2D-01 or 2D-45 may include a part of the following functions.

User data delivery function (transfer of user plane data).
Function of mapping a QoS flow and a data bearer for an uplink and a downlink (mapping between a QoS flow and a DRB for both DL and UL).
Function of marking QoS flow ID for an uplink and a downlink (marking QoS flow ID in both DL and UL packets).
Function of mapping a reflective QoS flow to a data bearer for uplink SDAP PDUs (reflective QoS flow to DRB mapping for the UL SDAP PDUs).

In relation to an SDAP entity, whether or not to use a header of the SDAP entity or whether or not to use a function of the SDAP entity may be configured for a terminal by an RRC message for each of PDCP entity (PDCP layer)s, each of bearers, or each of logical channels, and in case that an SDAP header is configured, an NAS QoS reflection configuration 1 bit indicator (NAS reflective QoS) and an AS QoS reflection configuration 1 bit indicator (AS reflective QoS) of the SDAP header may provide indication to a terminal such that the terminal may renew or reconfigure mapping information on a data bearer and a QoS flow of an uplink and a downlink. The SDAP header may include QoS flow ID information representing QoS. The QoS information may be used as data processing priority, scheduling information, or the like to support an active service.

The major functions of an NR PDCP 2D-05 or 2D-40 may include a part of the following functions.

Header compression and decompression function (header compression and decompression: ROHC only).
User data transmission function (transfer of user data).
Sequential delivery function (in-sequence delivery of upper layer PDUs).
Non-sequential delivery function (out-of-sequence delivery of upper layer PDUs).
Sequence rearrangement function (PDCP PDU reordering for reception).
Overlap detection function (duplicate detection of lower layer SDUs).
Retransmission function (retransmission of PDCP SDUs).
Ciphering and deciphering function.
Timer-based SDU removal function (timer-based SDU discard in uplink).

The sequence rearrangement function (reordering) for NR PDCP devices refers to a function of sequentially rearranging, based on a PDCP sequence number (SN), PDCP PDUs received from a lower layer, may include a function of delivering data to an upper layer in a rearranged sequence or a function of directly delivering data without considering a sequence, may include a function of recording lost PDCP PDUs by rearranging a sequence, may include a function of reporting, to a transmitter side, a state about lost PDCP PDUs, and may include a function of requesting for retransmission of lost PDCP PDUs.

The major functions of an NR RLC 2D-10 or 2D-35 may include a part of the following functions.

Data transmission function (transfer of upper layer PDUs).
Sequential delivery function (in-sequence delivery of upper layer PDUs).
Non-sequential delivery function (out-of-sequence delivery of upper layer PDUs).
ARQ function (error Correction through ARQ).
Concatenation, segmentation and reassembly function (concatenation, segmentation and reassembly of RLC SDUs).
Re-segmentation function (re-segmentation of RLC data PDUs).
Sequence rearrangement function (reordering of RLC data PDUs).
Overlap detection function (duplicate detection).
Error detection function (protocol error detection).
RLC SDU removal function (RLC SDU discard).
RLC re-establishment function (RLC re-establishment).

The sequential delivery function of an NR RLC device refers to a function of sequentially delivering RLC SDUs received from a lower layer to an upper layer, may have a function of, in case that original one RLC SDU is dividedly received as multiple RLC SDUs, reassembling and delivering the RLC SDUs, may include a function of rearranging, based on an RLC sequence number (SN) or a PDCP sequence number (SN), received RLC PDUs, may include a function of recording lost RLC PDUs by rearranging a sequence, may include a function of reporting, to a transmitter side, a state about lost RLC PDUs, may include a function of requesting for retransmission of lost RLC PDUs, and may include a function of, in case that there is a lost RLC SDU, sequentially delivering, to an upper layer, only RLC SDUs before the lost RLC SDU, a function of, if a designated timer expires although there is a lost RLC SDU, sequentially delivering, to an upper layer, all RLC SDUs received before the timer starts, or a function of, if a designated timer expires although there is a lost RLC SDU, sequentially delivering, to an upper layer, all RLC SDUs having been received until the present time. In addition, RLC PDUs may be processed in the order the RLC PDUs are received (in the order of arrival irrespective of a sequence of a sequence number), and may be delivered to a PDCP device irrespective of a sequence (out-of-sequence delivery). In case of a segment, segments stored in a buffer or to be received later may be received, reconstituted into one complete RLC PDU, processed, and delivered to a PDCP device. The NR RLC layer may not include a concatenation function. The function may be performed in an NR MAC layer or may be replaced by a multiplexing function of an NR MAC layer.

The non-sequential delivery function (out-of-sequence delivery) of an NR RLC device refers to a function of directly delivering, to an upper layer, irrespective of a sequence, RLC SDUs received from a lower layer, may include a function of, in case that original one RLC SDU is dividedly received as multiple RLC SDUs, reassembling and delivering the RLC SDUs, and may include a function of storing an RLC SN or a PDCP SN of received RLC PDUs and arranging sequences to record lost RLC PDUs.

An NR MAC 2D-15 or 2D-30 may be connected to multiple NR RLC entities configured in one terminal, and the major functions of an NR MAC may include a part of the following functions.

Mapping function (mapping between logical channels and transport channels).
Multiplexing and demultiplexing function (multiplexing/demultiplexing of MAC SDUs).
Scheduling information reporting function.
HARQ function (error correction through HARQ).
Function of adjusting priority between logical channels (priority handling between logical channels of one UE).
Function of adjusting priority between terminals (priority handling between pieces of UE by means of dynamic scheduling).
MBMS service identification function.
Transmission format selection function (transport format selection).
Padding function.

An NR PHY layer 2D-20 or 2D-25 performs an operation of performing channel coding and modulation on higher layer data to make an OFDM symbol therefrom and transmitting the OFDM symbol to a radio channel or an operation of performing demodulation and channel decoding on an OFDM symbol received through a radio channel and delivering the demodulated and channel-decoded symbol to a higher layer.

Figure 2E:
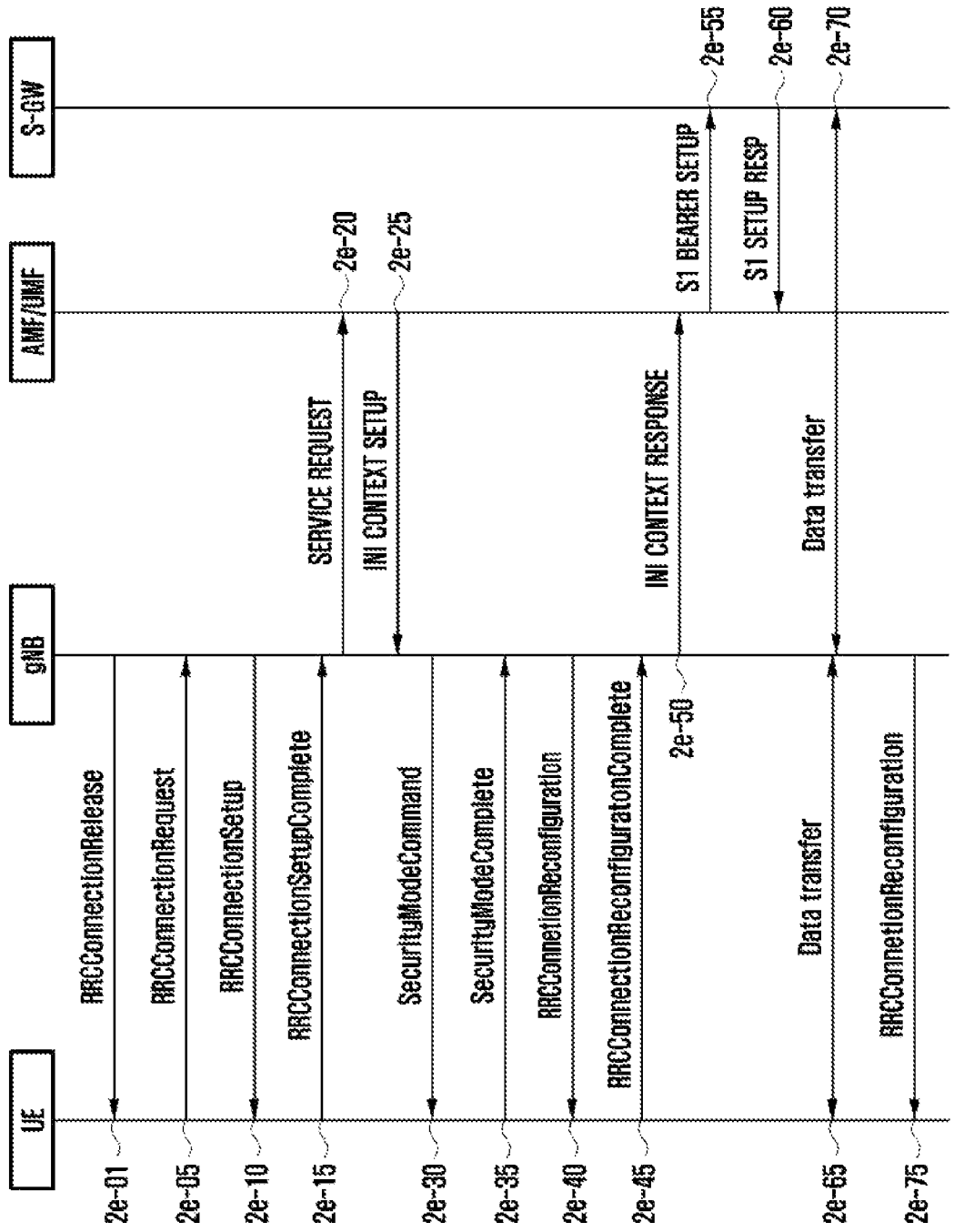
FIG. 2E illustrates a view explaining, in the disclosure, a procedure in which a base station releases connection of a terminal and thus the terminal shifts from an RRC connected mode to an RRC idle mode and a procedure in which the terminal configures connection with the base station and thus shifts from the RRC idle mode to the RRC connected mode.

FIG. 2E illustrates a view explaining, in the disclosure, a procedure in which a base station releases connection of a terminal and thus the terminal shifts from an RRC connected mode to an RRC idle mode and a procedure in which the terminal configures connection with the base station and thus shifts from the RRC idle mode to the RRC connected mode.

In FIG. 2E, if a terminal, which transmits or receives data in an RRC connected mode, does not transmit or receive data for a designated reason or for a certain period of time, a base station transmits an RRCConnectionRelease message to the terminal to shift the terminal to an RRC idle mode (2E-01). If data to be transmitted occurs later, a terminal (hereinafter, idle mode UE), for which connection is not currently configured, may perform an RRC connection establishment process with a base station. Via a random access process, a terminal may establish reverse direction transmission synchronization with a base station and transmit an RRCConnectionRelease message to the base station (2E-05). The message includes a reason (establishment-Cause) that connection with an identifier of a terminal is to be configured, or the like. A base station may transmit an RRCConnectionSetup message to allow a terminal to configure RRC connection (2E-10).

The RRCConnectionSetup message may include RRC connection configuration information or the like. In addition, the RRCConnectionSetup message may include bearer configuration information of a terminal, configuration information of a PHY layer, configuration information of an MAC layer, configuration information of an RLC layer, configuration information of a PDCP layer (PDCP entity), or configuration information of an SDAP layer, and the configuration information of the PDCP entity (PDCP layer) may include an indicator for providing, to each of bearers, each of PDCP entity (PDCP layer)s, an SRB, or a DRB, indication of whether or not to use an integrity protection or authentication function, so as to enhance security.

RRC connection is also referred to as a signaling radio bearer (SRB) and is used for transmission/reception of an RRC message which is a control message between a terminal and a base station. A terminal, for which RRC connection has been configured, may transmit an RRCConnetionSetupComplete message to a base station (2E-15). The message may include a control message (for example, SERVICE REQUEST) by which, to an MME, a terminal requests for bearer configuration for a designated service. A base station transmits, to an MME, a SERVICE REQUEST message stored in an RRCConnetionSetupComplete message (2E-20), and the MME determines whether or not to provide a service requested by a terminal.

As a result of the determination, if it is determined to provide a service requested by a terminal, an MME may transmit, to a base station, an INITIAL CONTEXT SETUP REQUEST message (2E-25). The message includes information such as quality of service (QoS) information to be applied at the time of data radio bearer (DRB) configuration and security-related information (for example, a security key or a security algorithm) to be applied to a DRB.

In order to configure security with a terminal, a base station exchanges a SecurityModeCommand message (2E-30) and a SecurityModeComplete message (2E-35). If security configuration is completed, a base station may transmit an RRCConnectionReconfiguration message to a terminal (2E-40).

In addition, the RRCConnectionReconfiguration message may include bearer configuration information of a terminal, configuration information of a PHY layer, configuration information of an MAC layer, configuration information of an RLC layer, configuration information of a PDCP layer (PDCP entity), or configuration information of an SDAP layer, and the configuration information of the PDCP entity (PDCP layer) may include an indicator for providing, to each of bearers, each of PDCP entity (PDCP layer)s, an SRB, or a DRB, indication of whether or not to use an integrity protection or authentication function, so as to enhance security.

Configuration information of a DRB, by which user data is to be processed, is included in the message, and a terminal configures the DRB by applying the information and transmits an RRCConnectionReconfigurationComplete message to a base station (2E-45). A base station, which has completed DRB configuration with a terminal, transmits an INITIAL CONTEXT SETUP COMPLETE message to an MME (2E-50), and the MME which has received the message may exchange an S1 BEARER SETUP message and an S1 BEARER SETUP RESPONSE message so as to configure an S-GW and an S1 bearer (2E-055 and 2E-60). An S1 bearer is connection for data transmission, as configured between an S-GW and a base station, and may correspond to a DRB one to one.

Once the above-described process is entirely completed, a terminal may transmit or receive data to or from a base station through an S-GW (2E-65 and 2E-70). A general data transmission process includes three broad steps such as RRC connection configuration, security configuration, and DRB configuration. In addition, in order to renew, add, or change configuration for a terminal for a designated reason, a base station may transmit an RRCConnectionReconfiguration message (2E-75).

In the disclosure, a bearer may mean including an SRB and a DRB, wherein the SRB may mean a signaling radio bearer and the DRB may mean a data radio bearer. The SRB is generally used to transmit and receive an RRC message of an RRC layer, and the DRB is generally used to transmit and receive user layer data. In addition, a UM DRB means a DRB using an RLC layer operated in an unacknowledged mode (UM), and an AM DRB means a DRB using an RLC layer operated in an acknowledged mode (AM).

The disclosure proposes a method for processing data of a receiver end to prevent an attack which causes a data loss due to abuse of an integrity protection or authentication procedure and a data overlap detection method, when data is transmitted or received between a terminal and a base station.

The above-stated attack which causes a data loss may be performed by abuse of a reception operation of a PDCP entity (PDCP layer).

A first embodiment of operations of a receiving PDCP entity (PDCP layer) for an SRB or a DRB, which may be abused as described above, is as follows.

A receiving PDCP entity (PDCP layer) may maintain and manage three COUNT variables when received data is processed. When received data is processed, the receiving PDCP entity (PDCP layer) uses a second COUNT variable maintaining a COUNT value of data (for example, a PDCP SDU) anticipated to be received next, and the second COUNT variable may be denominated as RX_NEXT. In addition, when received data is processed, the receiving PDCP entity (PDCP layer) uses a third COUNT variable maintaining a COUNT value of first data (for example, a PDCP SDU) which has not been delivered to an upper layer, and the third COUNT variable may be denominated as RX_DELIV. Moreover, when received data is processed, the receiving PDCP entity (PDCP layer) uses a fourth COUNT variable maintaining a COUNT value of data (for example, a PDCP SDU) which has made a PDCP rearrangement timer (t-Reordering) triggered, and the fourth COUNT variable may be denominated as RX_REORD. Furthermore, when received data is processed, the receiving PDCP entity (PDCP layer) uses a fifth COUNT variable maintaining a COUNT value of data (for example, a PDCP SDU) which has been currently received, and the fifth COUNT variable may be denominated as RCVD_COUNT. The PDCP rearrangement timer uses a timer value or section configured by an RRC message in an upper layer (an RRC layer) as in FIG. 1E, and the timer is used to detect a lost PDCP PDU. Only one timer is operated at a time.

In addition, in operations of a receiving PDCP entity (PDCP layer), a terminal may define and use the following variables.

HFN: Refers to a hyper frame number (HFN) part of a window state variable.

SN: Refers to a sequence number (SN) part of a window state variable.

RCVD_SN: A PDCP sequence number included in a header of a received PDCP PDU.

RCVD_HFN: An HFN value of a received PDCP PDU as calculated by a receiving PDCP entity (PDCP layer).

Operations of a receiving PDCP entity (PDCP layer) of a terminal or a base station, proposed by the disclosure, are as follows.

When a PDCP PDU is received from a lower layer, a receiving PDCP entity (PDCP layer) may determine a COUNT value of the received PDCP PDU as follows.

If received RCVD_SN satisfies RCVD_SN<=SN(RX_DELIV)−Window_Size, an update is made into RCVD_HFN=HFN(RX_DELIV)+1.

Otherwise, if RCVD_SN satisfies RCVD_SN>SN(RX_DELIV)+Window_Size, an update is made into RCVD_HFN=HFN(RX_DELIV)−1.

In another case, an update is made into RCVD_HFN=HFN(RX_DELIV).

RCVD_COUNT is determined as RCVD_COUNT=[RCVD_HFN, RCVD_SN].

After the COUNT value of the received PDCP PDU is determined, the receiving PDCP entity (PDCP layer) updates window state variables and processes the PDCP PDU as follows.

By using the RCVD_COUNT value, for the PDCP PDU, deciphering is performed and integrity verification is performed.

If integrity verification fails, an integrity verification failure is indicated to an upper layer, and a received PDCP Data PDU (a data part of the PDCP PDU) is discarded.

If RCVD_COUNT<RX_DELIV is satisfied or if a PDCP PDU having the value of RCVD_COUNT has been previously received (in case of an expiring, out-of-period, or out-of-window packet or an overlapping packet), a received PDCP Data PDU (a data part of the PDCP PDU) is discarded.

If the received PDCP PDU has not been discarded, the receiving PDCP entity (PDCP layer) operates as follows.

A processed PDCP SDU is stored in a reception buffer.

If RCVD_COUNT>=RX_NEXT is satisfied,

RX_NEXT is updated into RCVD_COUNT+1.

If a non-sequential delivery indicator (outOfOrderDelivery) has been configured (if a non-sequential delivery operation is indicated), the PDCP SDU is delivered to an upper layer.

If RCVD_COUNT is the same as RX_DELIV, the pieces of data are delivered to an upper layer in the order of COUNT values.

All of continuous PDCP SDUs, starting from the value of COUNT=RX_DELIV, are delivered to an upper layer.

An RX_DELIV value is updated to a COUNT value of a first PDCP SDU which has a COUNT value equal to or larger than RX_DELIV and has not been delivered to an upper layer.

If a t-Reordering timer is being operated and an RX_DELIV value is equal to or larger than RX_REORD, the t-Reordering timer is stopped and reset.

If a t-Reordering timer is not being operated (including a case of a stop in the above-mentioned condition) and RX_DELIV is smaller than RX_NEXT,
    an RX_REORD value is updated to RX_NEXT.
    The t-Reordering timer starts.

When a PDCP rearrangement timer (t-Reordering) expires, the receiving PDCP entity (PDCP layer) may operate as follows.

If a header decompression procedure has not been previously applied (that is, if data processing has not been performed yet for an upper layer header), a header decompression procedure is performed for stored pieces of data, and the pieces of data are delivered to an upper layer in the order of COUNT values.
    All of PDCP SDUs having COUNT values smaller than an RX_REORD value are delivered.
    All of PDCP SDUs having continuous COUNT values, starting from an RX_REORD value, are delivered.

An RX_DELIV value is updated to a COUNT value of a first PDCP SDU which has a COUNT value equal to or larger than RX_REORD and has not been delivered to an upper layer.

If an RX_DELIV value is smaller than an RX_NEXT value,
    an RX_REORD value is updated to an RX_NEXT value.
    A t-Reordering timer starts.

In the first embodiment of operations of a receiving PDCP entity (PDCP layer), an integrity protection or authentication procedure may be configured for an SRB or a DRB. If an integrity verification (or integrity authentication) failure of received data occurs even when an integrity protection or authentication procedure is configured for an SRB, the integrity verification failure may be reported to an upper layer (for example, an RRC layer (or RRC entity)) and the higher layer entity may trigger an RRC connection re-establishment procedure. That is, since connection of a terminal is reconfigured, a bearer may be canceled and reconfigured. It serves to consider the occurrence of an integrity failure as an attack and avoid the attack by newly configuring RRC connection because important messages, such as an RRC message, for transmitting or receiving configuration between a terminal and a base station are transmitted and received.

However, in case that an integrity protection or authentication procedure is configured for a DRB, if the integrity verification procedure for received data fails, a receiving PDCP entity (PDCP layer) may report an integrity verification failure to an upper layer and discard data in which the integrity verification failure has occurred, but may still data transmission/reception. Here, attention should be paid to an overlap detection procedure performed after the integrity verification procedure.

In the first embodiment of operations of a receiving PDCP entity (PDCP layer) of the disclosure, when data corresponding to a COUNT value is received, a receiving PDCP entity (PDCP layer) may perform an integrity verification procedure by the COUNT value and discard data in which a failure occurs, and in an overlap detection procedure, if a COUNT value corresponding to currently received data has ever been received, that is, if data corresponding to the COUNT value has ever been received, the receiving PDCP entity (PDCP layer) may discard the data.

Accordingly, there may occur a data-using attack due to abuse of the first embodiment of operations of a receiving PDCP entity (PDCP layer) or use of shortcomings thereof.

Figure 2F:
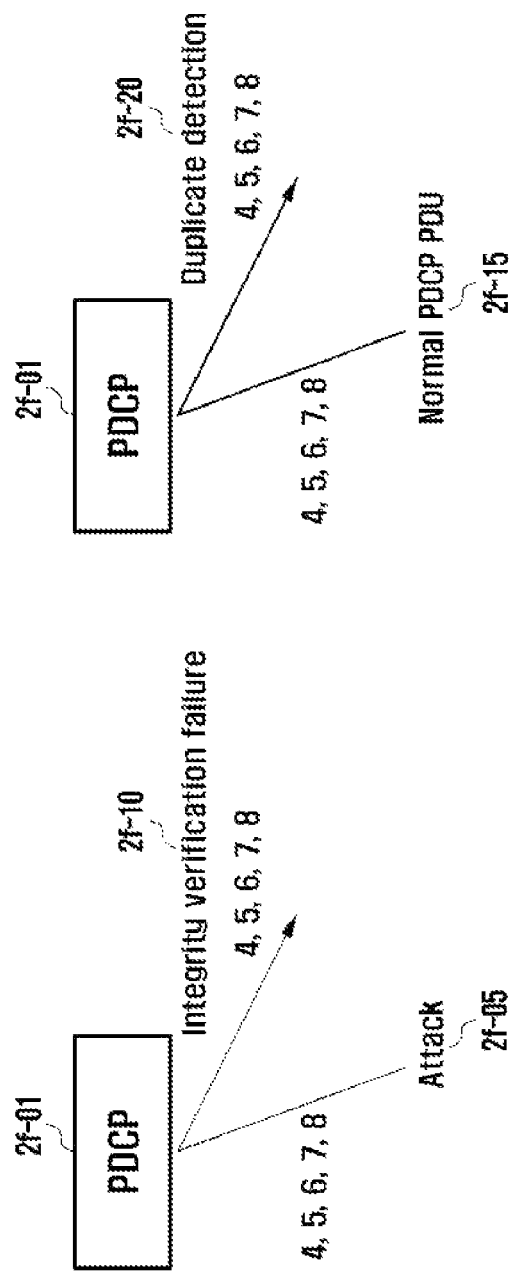
FIG. 2F illustrates a view showing a security problem which may occur in a first embodiment of a receiving PDCP entity (PDCP layer) (a receiving PDCP entity or a receiving PDCP layer) operation of the disclosure.

FIG. 2F illustrates a view showing a security problem which may occur in a first embodiment of a receiving PDCP entity (PDCP layer) operation for an SRB or a DRB of the disclosure.

Referring to FIG. 2F, many pieces of data having different COUNT values from each other because of an external attack may be transmitted to a receiving PDCP entity (PDCP layer) (2F-05). Then, in case that an integrity protection or authentication procedure is configured, the receiving PDCP entity (PDCP layer) may identify an integrity verification failure of the transmitted data and discard data corresponding to the attack (2F-10).

However, the problem is that a PDCP entity (PDCP layer) considers that a COUNT value corresponding to data caused by the attack has been received. Accordingly, although normal data transmitted from a transmitter end, not data by an attack, is received, if a COUNT value corresponding to the normal data is the same as the COUNT value of the data by the attack (2F-15), a receiving PDCP entity (PDCP layer) considers, by an overlap detection procedure, the normal data as overlap reception and discards the normal data (2F-20). Accordingly, a receiving PDCP entity (PDCP layer) discards normal data by an overlap detection procedure, and thus a data loss may occur.

Accordingly, the disclosure proposes embodiments of a receiving PDCP entity (PDCP layer) as follows to prevent an attack which causes a data loss due to abuse of an integrity protection or authentication procedure and an overlap detection procedure as described above.

Figure 2G:
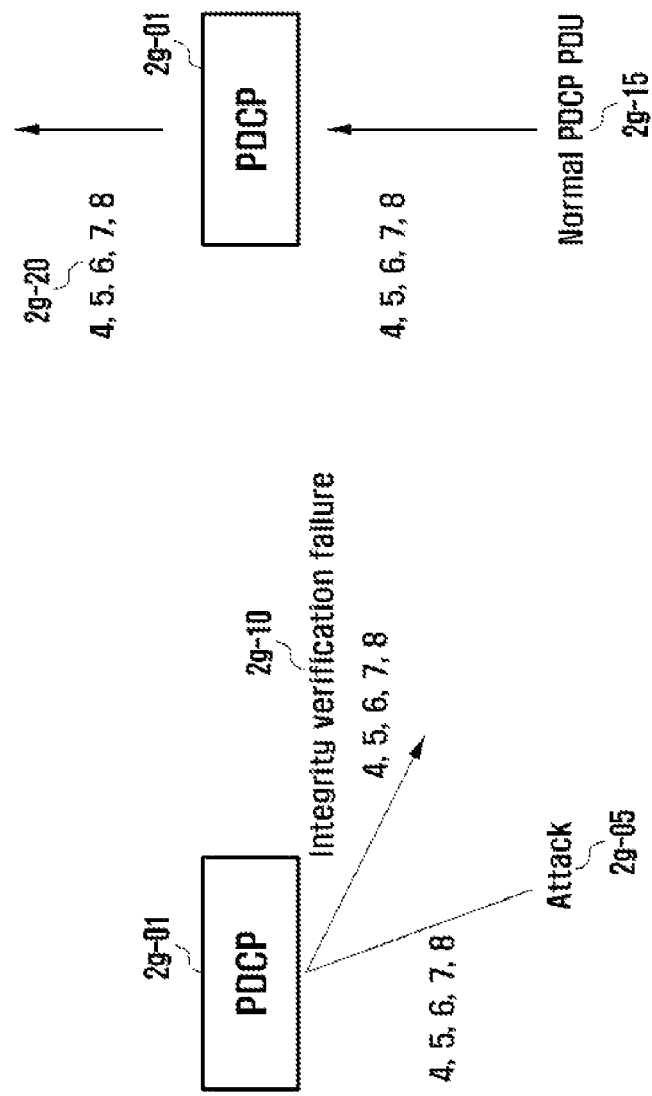
FIG. 2G illustrates a view showing embodiments of an efficient PDCP entity (PDCP layer), proposed by the disclosure.

FIG. 2G illustrates a view showing embodiments of an efficient PDCP entity (PDCP layer) for an SRB or a DRB, proposed by the disclosure.

In embodiments of a receiving PDCP entity (PDCP layer), proposed by the disclosure, in an overlap detection procedure, in case that a COUNT value corresponding to currently received data has been previously received and data corresponding to the COUNT value has been previously received successfully, not just received simply, a receiving PDCP entity (PDCP layer) may determine that overlap detection has occurred and may discard the received data to enhance the overlap detection procedure and to prevent an external attack.

For example, many pieces of data having different COUNT values from each other may be transmitted to a receiving PDCP entity (PDCP layer) (2G-05). In case that an integrity protection or authentication procedure is configured, the receiving PDCP entity (PDCP layer) may identify an integrity verification failure of the transmitted data and discard data corresponding to an attack (2G-10). In addition, since the data by the attack has not been successfully received, the receiving PDCP entity (PDCP layer) may consider that a COUNT value corresponding to the data has never been received.

Accordingly, in case that normal data transmitted from a transmitter end, not data by an attack, is received, although a COUNT value corresponding to the normal data is the same as the COUNT value of the data by the attack (2G-15), a receiving PDCP entity (PDCP layer) may not consider, by an overlap detection procedure, the normal data as overlap reception and may not discard the normal data. Accordingly, the receiving PDCP entity (PDCP layer) may perform, on the normal data, data processing of a PDCP entity (PDCP layer), such as deciphering, integrity verification, or header decompression, and then may sequentially deliver the data to an upper layer (sG-20). Accordingly, a security problem in which a receiving PDCP entity (PDCP layer) discards normal data by an overlap detection procedure may be solved.

The disclosure proposes a second embodiment of a receiving PDCP entity (PDCP layer) for an SRB or a DRB as follows to prevent an attack which causes a data loss due to abuse of an integrity protection or authentication procedure and an overlap detection procedure as described above. Specifically, in an overlap detection procedure, if a COUNT value corresponding to currently received data has been previously received and data corresponding to the COUNT value has been previously received successfully, not just received simply, a receiving PDCP entity (PDCP layer) may determine that overlap detection has occurred and may discard the received data to enhance the overlap detection procedure and to prevent an external attack. The successful reception of data may indicate that: data corresponding to the COUNT value has been processed and stored in a buffer; the data has been received, processed, and delivered to an upper layer; the data has been delivered to an upper layer (upper entity) and has been discarded; or in case that an integrity protection or authentication procedure is configured, integrity verification has been successfully performed on the data corresponding to the COUNT value. That is, it may be determined that a failure of integrity verification for received data due to an external attack has not been successfully received by data, and thus normal data may be prevented from being discarded in an overlap detection procedure. A specific procedure of the second embodiment of a receiving PDCP entity (PDCP layer), proposed by the disclosure, is as follows.

When a PDCP PDU is received from a lower layer, a receiving PDCP entity (PDCP layer) may determine a COUNT value of the received PDCP PDU as follows.
    If received RCVD_SN satisfies RCVD_SN<=SN (RX_DELIV)−Window_Size,
        an update is made into RCVD_HFN=HFN(RX_DELIV)+1.
    Otherwise, if RCVD_SN satisfies RCVD_SN>SN (RX_DELIV)+Window_Size,
        an update is made into RCVD_HFN=HFN(RX_DELIV)−1.
    In another case,
        an update is made into RCVD_HFN=HFN(RX_DELIV).
    RCVD_COUNT is determined as RCVD_COUNT=[RCVD_HFN, RCVD_SN].

After the COUNT value of the received PDCP PDU is determined, the receiving PDCP entity (PDCP layer) updates window state variables and processes the PDCP PDU as follows.
    By using the RCVD_COUNT value, for the PDCP PDU, deciphering is performed and integrity verification is performed.
        If integrity verification fails,
            an integrity verification failure is indicated to an upper layer, and a received PDCP Data PDU (a data part of the PDCP PDU) is discarded.
    If RCVD_COUNT<RX_DELIV is satisfied or
    if a PDCP PDU having the value of RCVD_COUNT has been previously received successfully,
        a received PDCP Data PDU (a data part of the PDCP PDU) is discarded.

If the received PDCP PDU has not been discarded, the receiving PDCP entity (PDCP layer) operates as follows.
    A processed PDCP SDU is stored in a reception buffer.
    If RCVD_COUNT>=RX_NEXT is satisfied,
        RX_NEXT is updated into RCVD_COUNT+1.
    If a non-sequential delivery indicator (outOfOrderDelivery) has been configured (if a non-sequential delivery operation is indicated),
        the PDCP SDU is delivered to an upper layer.
    If RCVD_COUNT is the same as RX_DELIV,
        the pieces of data are delivered to an upper layer in the order of COUNT values.
            All of continuous PDCP SDUs, starting from the value of COUNT=RX_DELIV, are delivered to an upper layer.
            An RX_DELIV value is updated to a COUNT value of a first PDCP SDU which has a COUNT value equal to or larger than RX_DELIV and has not been delivered to an upper layer.
    If a t-Reordering timer is being operated and an RX_DELIV value is equal to or larger than RX_REORD,
        the t-Reordering timer is stopped and reset.
    If a t-Reordering timer is not being operated (including a case of a stop in the above-mentioned condition) and RX_DELIV is smaller than RX_NEXT,
        an RX_REORD value is updated to RX_NEXT.
        The t-Reordering timer starts.

When a PDCP rearrangement timer (t-Reordering) expires, the receiving PDCP entity (PDCP layer) may operate as follows.
    If a header decompression procedure has not been previously applied (that is, if data processing has not been performed yet for an upper layer header), a header decompression procedure is performed for stored pieces of data, and the pieces of data are delivered to an upper layer in the order of COUNT values.
    All of PDCP SDUs having COUNT values smaller than an RX_REORD value are delivered.
    All of PDCP SDUs having continuous COUNT values, starting from an RX_REORD value, are delivered.
    An RX_DELIV value is updated to a COUNT value of a first PDCP SDU which has a COUNT value equal to or larger than RX_REORD and has not been delivered to an upper layer.
    If an RX_DELIV value is smaller than an RX_NEXT value,
        an RX_REORD value is updated to an RX_NEXT value.
    A t-Reordering timer starts.

In addition, the disclosure proposes a third embodiment of a receiving PDCP entity (PDCP layer) for an SRB or a DRB as follows to prevent an attack which causes a data loss due to abuse of an integrity protection or authentication procedure and an overlap detection procedure as described above.

Specifically, in an overlap detection procedure, if a COUNT value corresponding to currently received data has been previously received and data corresponding to the COUNT value has been previously received successfully (in case that an integrity protection or authentication procedure is configured, if data corresponding to the COUNT value has been previously received and the integrity verification procedure has been successfully performed), a receiving PDCP entity (PDCP layer) may determine that overlap detection has occurred and may discard the received data to enhance the overlap detection procedure and to prevent an external attack.

The successful reception of data may indicate that: data corresponding to the COUNT value has been processed and stored in a buffer; the data has been received, processed, and delivered to an upper layer; the data has been delivered to an upper layer and has been discarded; or in case that an integrity protection or authentication procedure is configured, integrity verification has been successfully performed on the data corresponding to the COUNT value. That is, it may be determined that a failure of integrity verification for received data due to an external attack has not been successfully received by data, and thus normal data may be prevented from being discarded in an overlap detection procedure. A specific procedure of the third embodiment of a receiving PDCP entity (PDCP layer), proposed by the disclosure, is as follows.

When a PDCP PDU is received from a lower layer, a receiving PDCP entity (PDCP layer) may determine a COUNT value of the received PDCP PDU as follows.
If received RCVD_SN satisfies RCVD_SN<=SN (RX_DELIV)−Window_Size,
an update is made into RCVD_HFN=HFN(RX_DELIV)+1.
Otherwise, if RCVD_SN satisfies RCVD_SN>SN (RX_DELIV)+Window_Size,
an update is made into RCVD_HFN=HFN(RX_DELIV)−1.
In another case,
an update is made into RCVD_HFN=HFN(RX_DELIV).
RCVD_COUNT is determined as RCVD_COUNT= [RCVD_HFN, RCVD_SN].

After the COUNT value of the received PDCP PDU is determined, the receiving PDCP entity (PDCP layer) updates window state variables and processes the PDCP PDU as follows.
By using the RCVD_COUNT value, for the PDCP PDU, deciphering is performed and integrity verification is performed.
If integrity verification fails,
an integrity verification failure is indicated to an upper layer, and a received PDCP Data PDU (a data part of the PDCP PDU) is discarded.
If RCVD_COUNT<RX_DELIV is satisfied or
if a PDCP PDU having the value of RCVD_COUNT has been previously received successfully and if, in case that an integrity protection or authentication procedure is configured, the integrity verification procedure for a PDCP PDU corresponding to the value of RCVD_COUNT has been previously performed successfully,
a received PDCP Data PDU (a data part of the PDCP PDU) is discarded.
If the received PDCP PDU has not been discarded, the receiving PDCP entity (PDCP layer) operates as follows.
A processed PDCP SDU is stored in a reception buffer.
If RCVD_COUNT>=RX_NEXT is satisfied,
RX_NEXT is updated into RCVD_COUNT+1.
If a non-sequential delivery indicator (outOfOrderDelivery) has been configured (if a non-sequential delivery operation is indicated),
the PDCP SDU is delivered to an upper layer.
If RCVD_COUNT is the same as RX_DELIV,
the pieces of data are delivered to an upper layer in the order of COUNT values.
All of continuous PDCP SDUs, starting from the value of COUNT=RX_DELIV, are delivered to an upper layer.
An RX_DELIV value is updated to a COUNT value of a first PDCP SDU which has a COUNT value equal to or larger than RX_DELIV and has not been delivered to an upper layer.
If a t-Reordering timer is being operated and an RX_DELIV value is equal to or larger than RX_REORD,
the t-Reordering timer is stopped and reset.
If a t-Reordering timer is not being operated (including a case of a stop in the above-mentioned condition) and RX_DELIV is smaller than RX_NEXT,
an RX_REORD value is updated to RX_NEXT.
The t-Reordering timer starts.

When a PDCP rearrangement timer (t-Reordering) expires, the receiving PDCP entity (PDCP layer) may operate as follows.
If a header decompression procedure has not been previously applied (that is, if data processing has not been performed yet for an upper layer header), a header decompression procedure is performed for stored pieces of data, and the pieces of data are delivered to an upper layer in the order of COUNT values.
All of PDCP SDUs having COUNT values smaller than an RX_REORD value are delivered.
All of PDCP SDUs having continuous COUNT values, starting from an RX_REORD value, are delivered.
An RX_DELIV value is updated to a COUNT value of a first PDCP SDU which has a COUNT value equal to or larger than RX_REORD and has not been delivered to an upper layer.
If an RX_DELIV value is smaller than an RX_NEXT value,
an RX_REORD value is updated to an RX_NEXT value.
A t-Reordering timer starts.

In addition, the disclosure proposes a (3-2)th embodiment of a receiving PDCP entity (PDCP layer) for an SRB or a DRB as follows to prevent an attack which causes a data loss due to abuse of an integrity protection or authentication procedure and an overlap detection procedure as described above. Specifically, in an overlap detection procedure, if a COUNT value corresponding to currently received data has been previously received and data corresponding to the COUNT value has been previously received successfully (in case that an integrity protection or authentication procedure is configured, if data corresponding to the COUNT value has been previously received and the integrity verification procedure has been successfully performed), a receiving PDCP entity (PDCP layer) may determine that overlap detection has occurred and may discard the received data to enhance the overlap detection procedure and to prevent an attack of a hacker. In addition, in case that an integrity protection or authentication procedure is not configured, if a COUNT value corresponding to currently received data has been previously received, the data may be immediately discarded. The successful reception of data may indicate that: data corresponding to the COUNT value has been processed and stored in a buffer; the data has been received, processed, and delivered to an upper layer; the data has been delivered to an upper layer and has been discarded; or in case that an integrity protection or authentication procedure is configured, integrity verification has been successfully performed on the data corresponding to the COUNT value. That is, it may be determined that a failure of integrity verification for received data due to an attack of a hacker has not been successfully received by data, and thus normal data may be prevented from being discarded in an overlap detection procedure. A specific procedure of the (3-2)th embodiment of a receiving PDCP entity (PDCP layer), proposed by the disclosure, is as follows.

When a PDCP PDU is received from a lower layer, a receiving PDCP entity (PDCP layer) may determine a COUNT value of the received PDCP PDU as follows.

If received RCVD_SN satisfies RCVD_SN<=SN (RX_DELIV)−Window_Size,
an update is made into RCVD_HFN=HFN(RX_DELIV)+1.
Otherwise, if RCVD_SN satisfies RCVD_SN>SN (RX_DELIV)+Window_Size,
an update is made into RCVD_HFN=HFN(RX_DELIV)−1.
In another case,
an update is made into RCVD_HFN=HFN(RX_DELIV).
RCVD_COUNT is determined as RCVD_COUNT= [RCVD_HFN, RCVD_SN].

After the COUNT value of the received PDCP PDU is determined, the receiving PDCP entity (PDCP layer) updates window state variables and processes the PDCP PDU as follows.

By using the RCVD_COUNT value, for the PDCP PDU, deciphering is performed and integrity verification is performed.
If integrity verification fails,
an integrity verification failure is indicated to an upper layer, and a received PDCP Data PDU (a data part of the PDCP PDU) is discarded.
If RCVD_COUNT<RX_DELIV is satisfied,
if a PDCP PDU having the value of RCVD_COUNT has been previously received successfully, an integrity protection or authentication procedure is configured, and the integrity verification procedure for a PDCP PDU corresponding to the value of RCVD_COUNT has been previously performed successfully, or
if a PDCP PDU having the value of RCVD_COUNT has been previously received successfully and if an integrity protection or authentication procedure is not configured,
a received PDCP Data PDU (a data part of the PDCP PDU) is discarded.
If the received PDCP PDU has not been discarded, the receiving PDCP entity (PDCP layer) may operate as follows.
A processed PDCP SDU is stored in a reception buffer.
If RCVD_COUNT>=RX_NEXT is satisfied,
RX_NEXT is updated into RCVD_COUNT+1.
If a non-sequential delivery indicator (outOfOrderDelivery) has been configured (if a non-sequential delivery operation is indicated),
the PDCP SDU is delivered to an upper layer.
If RCVD_COUNT is the same as RX_DELIV,
the pieces of data are delivered to an upper layer in the order of COUNT values.
All of continuous PDCP SDUs, starting from the value of COUNT=RX_DELIV, are delivered to an upper layer.
An RX_DELIV value is updated to a COUNT value of a first PDCP SDU which has a COUNT value equal to or larger than RX_DELIV and has not been delivered to an upper layer.
If a t-Reordering timer is being operated and an RX_DELIV value is equal to or larger than RX_REORD, the t-Reordering timer is stopped and reset.
If a t-Reordering timer is not being operated (including a case of a stop in the above-mentioned condition) and RX_DELIV is smaller than RX_NEXT,
an RX_REORD value is updated to RX_NEXT.
The t-Reordering timer starts.

When a PDCP rearrangement timer (t-Reordering) expires, the receiving PDCP entity (PDCP layer) operates as follows.

If a header decompression procedure has not been previously applied (that is, if data processing has not been performed yet for an upper layer header), a header decompression procedure is performed for stored pieces of data, and the pieces of data are delivered to a higher layer in the order of COUNT values.
All of PDCP SDUs having COUNT values smaller than an RX_REORD value are delivered.
All of PDCP SDUs having continuous COUNT values, starting from an RX_REORD value, are delivered.
An RX_DELIV value is updated to a COUNT value of a first PDCP SDU which has a COUNT value equal to or larger than RX_REORD and has not been delivered to an upper layer.
If an RX_DELIV value is smaller than an RX_NEXT value,
an RX_REORD value is updated to an RX_NEXT value.
A t-Reordering timer starts.

In addition, the disclosure proposes a (3-3)th embodiment of a receiving PDCP entity (PDCP layer) for an SRB or a DRB as follows to prevent an attack which causes a data loss due to abuse of an integrity protection or authentication procedure and an overlap detection procedure as described above. Specifically, in an overlap detection procedure, if a COUNT value corresponding to currently received data has been previously received and data corresponding to the COUNT value has been previously received successfully (in case that an integrity protection or authentication procedure is configured, if data corresponding to the COUNT value has been previously received and the integrity verification procedure has been successfully performed), a receiving PDCP entity (PDCP layer) may determine that overlap detection has occurred and may discard the received data to enhance the overlap detection procedure and to prevent an external attack.

Specifically, in the proposed (3-3)th embodiment, a receiving PDCP entity (PDCP layer) may consider data discarded due to an integrity verification failure as data which is not received or data which has never been received, and it may be considered that an RCVD_COUNT value of the data discarded due to an integrity verification failure has never been received, wherein the RCVD_COUNT value is not updated by a window variable. Accordingly, although data having the same RCVD_COUNT value as the RCVD_COUNT value of the data discarded due to an integrity verification failure is received later, the received data may be prevented from being discarded by an overlap detection procedure if an integrity verification procedure therefor is successful. In addition, in case that an integrity protection or authentication procedure is not configured, if a COUNT value corresponding to currently received data has been previously received, the data may be immediately discarded.

The successful reception of data may indicate that: data corresponding to the COUNT value has been processed and stored in a buffer; the data has been received, processed, and delivered to an upper layer; the data has been delivered to an upper layer and has been discarded; or in case that an integrity protection or authentication procedure is configured, integrity verification has been successfully performed on the data corresponding to the COUNT value. That is, it may be determined that a failure of integrity verification for received data has not been successfully received by data, and thus normal data may be prevented from being discarded in an overlap detection procedure. A specific procedure of the (3-3)th embodiment of a receiving PDCP entity (PDCP layer), proposed by the disclosure, is as follows.

When a PDCP PDU is received from a lower layer, a receiving PDCP entity (PDCP layer) may determine a COUNT value of the received PDCP PDU as follows.
If received RCVD_SN satisfies RCVD_SN<=SN(RX_DELIV)−Window_Size,
an update is made into RCVD_HFN=HFN(RX_DELIV)+1.
Otherwise, if RCVD_SN satisfies RCVD_SN>SN(RX_DELIV)+Window_Size,
an update is made into RCVD_HFN=HFN(RX_DELIV)−1.
In another case,
an update is made into RCVD_HFN=HFN(RX_DELIV).
RCVD_COUNT is determined as RCVD_COUNT=[RCVD_HFN, RCVD_SN].

After the COUNT value of the received PDCP PDU is determined, the receiving PDCP entity (PDCP layer) updates window state variables and processes the PDCP PDU as follows.
By using the RCVD_COUNT value, for the PDCP PDU,
deciphering is performed and integrity verification is performed.
If integrity verification fails,
an integrity verification failure is indicated to an upper layer.
In addition, a received PDCP Data PDU (for example, a data part of the PDCP PDU) is discarded. Moreover, a receiving PDCP entity (PDCP layer) may consider data discarded due to an integrity verification failure as data which is not received or data which has never been received, and it may be considered that an RCVD_COUNT value of the data discarded due to an integrity verification failure has never been received, wherein the RCVD_COUNT value is not updated by a window variable. Accordingly, although data having the same RCVD_COUNT value as the RCVD_COUNT value of the data discarded due to an integrity verification failure is received later, the received data may be prevented from being discarded by an overlap detection procedure if an integrity verification procedure therefor is successful.
If RCVD_COUNT<RX_DELIV is satisfied or
if a PDCP PDU having the value of RCVD_COUNT has been previously received successfully,
a received PDCP Data PDU (a data part of the PDCP PDU) is discarded.
If the received PDCP PDU has not been discarded, the receiving PDCP entity (PDCP layer) may operate as follows.
A processed PDCP SDU is stored in a reception buffer.
If RCVD_COUNT>=RX_NEXT is satisfied,
RX_NEXT is updated into RCVD_COUNT+1.
If a non-sequential delivery indicator (outOfOrderDelivery) has been configured (if a non-sequential delivery operation is indicated),
the PDCP SDU is delivered to an upper layer.
If RCVD_COUNT is the same as RX_DELIV,
the pieces of data are delivered to an upper layer in the order of COUNT values.
All of continuous PDCP SDUs, starting from the value of COUNT=RX_DELIV, are delivered to an upper layer.
An RX_DELIV value is updated to a COUNT value of a first PDCP SDU which has a COUNT value equal to or larger than RX_DELIV and has not been delivered to an upper layer.
If a t-Reordering timer is being operated and an RX_DELIV value is equal to or larger than RX_REORD,
the t-Reordering timer is stopped and reset.
If a t-Reordering timer is not being operated (including a case of a stop in the above-mentioned condition) and RX_DELIV is smaller than RX_NEXT,
an RX_REORD value is updated to RX_NEXT.
The t-Reordering timer starts.

When a PDCP rearrangement timer (t-Reordering) expires, the receiving PDCP entity (PDCP layer) may operate as follows.
If a header decompression procedure has not been previously applied (that is, if data processing has not been performed yet for an upper layer header), a header decompression procedure is performed for stored pieces of data, and the pieces of data are delivered to an upper layer in the order of COUNT values.
All of PDCP SDUs having COUNT values smaller than an RX_REORD value are delivered.
All of PDCP SDUs having continuous COUNT values, starting from an RX_REORD value, are delivered.
An RX_DELIV value is updated to a COUNT value of a first PDCP SDU which has a COUNT value equal to or larger than RX_REORD and has not been delivered to an upper layer.
If an RX_DELIV value is smaller than an RX_NEXT value,
an RX_REORD value is updated to an RX_NEXT value.
A t-Reordering timer starts.

Accordingly, the disclosure proposes a fourth embodiment of a receiving PDCP entity (PDCP layer) for an SRB or a DRB as follows to prevent an attack which causes a data loss due to abuse of an integrity protection or authentication procedure and an overlap detection procedure as described above. Specifically, in an overlap detection procedure, if a COUNT value corresponding to currently received data has been previously received and data corresponding to the COUNT value has been previously received successfully, not just received simply, and has never been discarded, a receiving PDCP entity (PDCP layer) may determine that overlap detection has occurred and may discard the received data to enhance the overlap detection procedure and to prevent an external attack. The successful reception of data may indicate that: data corresponding to the COUNT value has been processed and stored in a buffer; the data has been received, processed, and delivered to an upper layer; the data has been delivered to an upper layer and has been discarded; or in case that an integrity protection or authentication procedure is configured, integrity verification has been successfully performed on the data corresponding to the COUNT value. That is, it may be determined that a failure of integrity verification for received data due to an external attack has not been successfully received by data, and normal data having the same COUNT value as that of data discarded due to an integrity verification failure is not considered as overlapping data, and thus normal data may be prevented from being discarded in an overlap detection procedure. A specific procedure of the fourth embodiment of a receiving PDCP entity (PDCP layer), proposed by the disclosure, is as follows.

When a PDCP PDU is received from a lower layer, a receiving PDCP entity (PDCP layer) may determine a COUNT value of the received PDCP PDU as follows.
  If received RCVD_SN satisfies RCVD_SN<=SN (RX_DELIV)−Window_Size,
    an update is made into RCVD_HFN=HFN(RX_DE-LIV)+1.
  Otherwise, if RCVD_SN satisfies RCVD_SN>SN (RX_DELIV)+Window_Size,
    an update is made into RCVD_HFN=HFN(RX_DE-LIV)−1.
  In another case,
    an update is made into RCVD_HFN=HFN(RX_DE-LIV).
  RCVD_COUNT is determined as RCVD_COUNT=[RCVD_HFN, RCVD_SN].

After the COUNT value of the received PDCP PDU is determined, the receiving PDCP entity (PDCP layer) may update window state variables and process the PDCP PDU as follows.
  By using the RCVD_COUNT value, for the PDCP PDU, deciphering is performed and integrity verification is performed.
    If integrity verification fails,
      an integrity verification failure is indicated to an upper layer and a received PDCP Data PDU (a data part of the PDCP PDU) is discarded.
  If RCVD_COUNT<RX_DELIV is satisfied or
  if a PDCP PDU having the value of RCVD_COUNT has been previously received successfully and has never been discarded,
    a received PDCP Data PDU (a data part of the PDCP PDU) is discarded.
  If the received PDCP PDU has not been discarded, the receiving PDCP entity (PDCP layer) may operate as follows.
  A processed PDCP SDU is stored in a reception buffer.
  If RCVD_COUNT>=RX_NEXT is satisfied,
    RX_NEXT is updated into RCVD_COUNT+1.
  If a non-sequential delivery indicator (outOfOrderDelivery) has been configured (if a non-sequential delivery operation is indicated),
    the PDCP SDU is delivered to an upper layer.
  If RCVD_COUNT is the same as RX_DELIV,
    the pieces of data are delivered to an upper layer in the order of COUNT values.
      All of continuous PDCP SDUs, starting from the value of COUNT=RX_DELIV, are delivered to an upper layer.
    An RX_DELIV value is updated to a COUNT value of a first PDCP SDU which has a COUNT value equal to or larger than RX_DELIV and has not been delivered to an upper layer.
  If a t-Reordering timer is being operated and an RX_DELIV value is equal to or larger than RX_REORD,
    the t-Reordering timer is stopped and reset.
  If a t-Reordering timer is not being operated (including a case of a stop in the above-mentioned condition) and RX_DELIV is smaller than RX_NEXT,
    an RX_REORD value is updated to RX_NEXT.
    The t-Reordering timer starts.

When a PDCP rearrangement timer (t-Reordering) expires, the receiving PDCP entity (PDCP layer) may operate as follows.
  If a header decompression procedure has not been previously applied (that is, if data processing has not been performed yet for an upper layer header), a header decompression procedure is performed for stored pieces of data, and the pieces of data are delivered to an upper layer in the order of COUNT values.
    All of PDCP SDUs having COUNT values smaller than an RX_REORD value are delivered.
    All of PDCP SDUs having continuous COUNT values, starting from an RX_REORD value, are delivered.
  An RX_DELIV value is updated to a COUNT value of a first PDCP SDU which has a COUNT value equal to or larger than RX_REORD and has not been delivered to an upper layer.
  If an RX_DELIV value is smaller than an RX_NEXT value,
    an RX_REORD value is updated to an RX_NEXT value.
    A t-Reordering timer starts.

In the procedure above, for example, a received first PDCP PDU is successfully received, and may be delivered to an upper layer and then discarded. If an overlapping packet which is the same as the first PDCP PDU is received later, the overlapping packet which is the same as the first PDCP PDU is not discarded by an overlap detection procedure but may be discarded while being considered as out-of-window data because the overlapping packet is out of a PDCP reception window. It is because, in case that the received first PDCP PDU is successfully received and delivered to an upper layer, the PDCP reception window moves in a direction in which a COUNT value increases.

A fifth embodiment of operations of a receiving PDCP entity (PDCP layer) of a terminal or a base station, proposed by the disclosure, is as follows. In the fifth embodiment, in case that integrity verification is not configured, overlapping data and out-of-window data are immediately discarded without performing a deciphering operation, so as to prevent unnecessary deciphering operations.

When a PDCP PDU is received from a lower layer, a receiving PDCP entity (PDCP layer) may determine a COUNT value of the received PDCP PDU as follows.
  If received RCVD_SN satisfies RCVD_SN<=SN (RX_DELIV)−Window_Size,
    an update is made into RCVD_HFN=HFN(RX_DE-LIV)+1.
  Otherwise, if RCVD_SN satisfies RCVD_SN>SN (RX_DELIV)+Window_Size,
    an update is made into RCVD_HFN=HFN(RX_DE-LIV)−1.
  In another case,
    an update is made into RCVD_HFN=HFN(RX_DE-LIV).
  RCVD_COUNT is determined as RCVD_COUNT=[RCVD_HFN, RCVD_SN].

After the COUNT value of the received PDCP PDU is determined, the receiving PDCP entity (PDCP layer) may update window state variables and process the PDCP PDU as follows.
  If an integrity protection or authentication procedure is configured, by using the RCVD_COUNT value, for the PDCP PDU, deciphering is performed and integrity verification is performed.
    If integrity verification fails,
      an integrity verification failure is indicated to an upper layer and a received PDCP Data PDU (a data part of the PDCP PDU) is discarded.

If RCVD_COUNT<RX_DELIV is satisfied or
if a PDCP PDU having the value of RCVD_COUNT has been previously received and if, in case that an integrity protection or authentication procedure is configured, the integrity verification procedure for a PDCP PDU corresponding to the value of RCVD_COUNT has been previously performed successfully,
a received PDCP Data PDU (a data part of the PDCP PDU) is discarded.

If the received PDCP PDU has not been discarded, the receiving PDCP entity (PDCP layer) operates as follows.
If an integrity protection or authentication procedure is not configured (or a deciphering procedure is not performed), deciphering is performed for the PDCP PDU by using the value of RCVD_COUNT.
A processed PDCP SDU is stored in a reception buffer.
If RCVD_COUNT>=RX_NEXT is satisfied,
RX_NEXT is updated into RCVD_COUNT+1.
If a non-sequential delivery indicator (outOfOrderDelivery) has been configured (if a non-sequential delivery operation is indicated),
the PDCP SDU is delivered to an upper layer.
If RCVD_COUNT is the same as RX_DELIV,
after header decompression is performed in case that header compression has not been cancelled, pieces of data are delivered to an upper layer in the order of COUNT values.
All of continuous PDCP SDUs, starting from the value of COUNT=RX_DELIV, are delivered to an upper layer.
An RX_DELIV value is updated to a COUNT value of a first PDCP SDU which has a COUNT value equal to or larger than RX_DELIV and has not been delivered to an upper layer.
If a t-Reordering timer is being operated and an RX_DELIV value is equal to or larger than RX_REORD,
the t-Reordering timer is stopped and reset.
If a t-Reordering timer is not being operated (including a case of a stop in the above-mentioned condition) and RX_DELIV is smaller than RX_NEXT,
an RX_REORD value is updated to RX_NEXT.
The t-Reordering timer starts.

When a PDCP rearrangement timer (t-Reordering) expires, the receiving PDCP entity (PDCP layer) may operate as follows.
After header decompression is performed in case that header compression has not been cancelled, pieces of data are delivered to an upper layer in the order of COUNT values.
All of PDCP SDUs having COUNT values smaller than an RX_REORD value are delivered.
All of PDCP SDUs having continuous COUNT values, starting from an RX_REORD value, are delivered.
An RX_DELIV value is updated to a COUNT value of a first PDCP SDU which has a COUNT value equal to or larger than RX_REORD and has not been delivered to an upper layer.
If an RX_DELIV value is smaller than an RX_NEXT value,
an RX_REORD value is updated to an RX_NEXT value.
A t-Reordering timer starts.

A (5-2)th embodiment of operations of a receiving PDCP entity (PDCP layer) of a terminal or a base station, proposed by the disclosure, is as follows. In the (5-2)th embodiment, in case that integrity verification is not configured, overlapping data and out-of-window data are immediately discarded without performing a deciphering operation, so as to prevent unnecessary deciphering operations.

When a PDCP PDU is received from a lower layer, a receiving PDCP entity (PDCP layer) may determine a COUNT value of the received PDCP PDU as follows.
If received RCVD_SN satisfies RCVD_SN<=SN(RX_DELIV)−Window_Size,
an update is made into RCVD_HFN=HFN(RX_DELIV)+1.
Otherwise, if RCVD_SN satisfies RCVD_SN>SN(RX_DELIV)+Window_Size,
an update is made into RCVD_HFN=HFN(RX_DELIV)−1.
In another case,
an update is made into RCVD_HFN=HFN(RX_DELIV).
RCVD_COUNT is determined as RCVD_COUNT=[RCVD_HFN, RCVD_SN].

After the COUNT value of the received PDCP PDU is determined, the receiving PDCP entity (PDCP layer) may update window state variables and process the PDCP PDU as follows.
If an integrity protection or authentication procedure is configured, by using the RCVD_COUNT value, for the PDCP PDU, deciphering is performed and integrity verification is performed.
If integrity verification fails,
an integrity verification failure is indicated to an upper layer and a received PDCP Data PDU (a data part of the PDCP PDU) is discarded.
If RCVD_COUNT<RX_DELIV is satisfied,
if a PDCP PDU having the value of RCVD_COUNT has been previously received successfully, an integrity protection or authentication procedure is configured, and the integrity verification procedure for a PDCP PDU corresponding to the value of RCVD_COUNT has been previously performed successfully, or
if a PDCP PDU having the value of RCVD_COUNT has been previously received successfully and if an integrity protection or authentication procedure is not configured,
a received PDCP Data PDU (a data part of the PDCP PDU) is discarded.

If the received PDCP PDU has not been discarded, the receiving PDCP entity (PDCP layer) operates as follows.
If an integrity protection or authentication procedure is not configured (or a deciphering procedure is not performed), deciphering is performed for the PDCP PDU by using the value of RCVD_COUNT.
A processed PDCP SDU is stored in a reception buffer.
If RCVD_COUNT>=RX_NEXT is satisfied,
RX_NEXT is updated into RCVD_COUNT+1.
If a non-sequential delivery indicator (outOfOrderDelivery) has been configured (if a non-sequential delivery operation is indicated),
the PDCP SDU is delivered to an upper layer.
If RCVD_COUNT is the same as RX_DELIV,
after header decompression is performed in case that header compression has not been cancelled, pieces of data are delivered to an upper layer in the order of COUNT values.
All of continuous PDCP SDUs, starting from the value of COUNT=RX_DELIV, are delivered to an upper layer.
An RX_DELIV value is updated to a COUNT value of a first PDCP SDU which has a COUNT value equal to or larger than RX_DELIV and has not been delivered to an upper layer.

If a t-Reordering timer is being operated and an RX_DELIV value is equal to or larger than RX_REORD,
the t-Reordering timer is stopped and reset.

If a t-Reordering timer is not being operated (including a case of a stop in the above-mentioned condition) and RX_DELIV is smaller than RX_NEXT,
an RX_REORD value is updated to RX_NEXT.
The t-Reordering timer starts.

When a PDCP rearrangement timer (t-Reordering) expires, the receiving PDCP entity (PDCP layer) may operate as follows.

After header decompression is performed in case that header compression has not been cancelled, pieces of data are delivered to an upper layer in the order of COUNT values.
All of PDCP SDUs having COUNT values smaller than an RX_REORD value are delivered.
All of PDCP SDUs having continuous COUNT values, starting from an RX_REORD value, are delivered.
An RX_DELIV value is updated to a COUNT value of a first PDCP SDU which has a COUNT value equal to or larger than RX_REORD and has not been delivered to an upper layer.

If an RX_DELIV value is smaller than an RX_NEXT value,
an RX_REORD value is updated to an RX_NEXT value.
A t-Reordering timer starts.

A (5-3)th embodiment of operations of a receiving PDCP entity (PDCP layer) of a terminal or a base station, proposed by the disclosure, is as follows. In the (5-3)th embodiment, in case that integrity verification is not configured, overlapping data and out-of-window data are immediately discarded without performing a deciphering operation, so as to prevent unnecessary deciphering operations. In addition, a receiving PDCP entity (PDCP layer) may consider data discarded due to an integrity verification failure as data which is not received or data which has never been received, and it may be considered that an RCVD_COUNT value of the data discarded due to an integrity verification failure has never been received, wherein the RCVD_COUNT value is not updated by a window variable. Accordingly, although data having the same RCVD_COUNT value as the RCVD_COUNT value of the data discarded due to an integrity verification failure is received later, the received data may be prevented from being discarded by an overlap detection procedure if an integrity verification procedure therefor is successful.

When a PDCP PDU is received from a lower layer, a receiving PDCP entity (PDCP layer) may determine a COUNT value of the received PDCP PDU as follows.

If received RCVD_SN satisfies RCVD_SN<=SN(RX_DELIV)–Window_Size,
an update is made into RCVD_HFN=HFN(RX_DELIV)+1.
Otherwise, if RCVD_SN satisfies RCVD_SN>SN(RX_DELIV)+Window_Size,
an update is made into RCVD_HFN=HFN(RX_DELIV)–1.
In another case,
an update is made into RCVD_HFN=HFN(RX_DELIV).
RCVD_COUNT is determined as RCVD_COUNT=[RCVD_HFN, RCVD_SN].

After the COUNT value of the received PDCP PDU is determined, the receiving PDCP entity (PDCP layer) may update window state variables and process the PDCP PDU as follows.

If an integrity protection or authentication procedure is configured,
by using the RCVD_COUNT value, for the PDCP PDU, deciphering is performed and integrity verification is performed.
If integrity verification fails,
an integrity verification failure is indicated to an upper layer.
In addition, a received PDCP Data PDU (for example, a data part of the PDCP PDU) is discarded. Moreover, a receiving PDCP entity (PDCP layer) may consider data discarded due to an integrity verification failure as data which is not received or data which has never been received, and it may be considered that an RCVD_COUNT value of the data discarded due to an integrity verification failure has never been received, wherein the RCVD_COUNT value is not updated by a window variable. Accordingly, although data having the same RCVD_COUNT value as the RCVD_COUNT value of the data discarded due to an integrity verification failure is received later, the received data may be prevented from being discarded by an overlap detection procedure if an integrity verification procedure therefor is successful.

If RCVD_COUNT<RX_DELIV is satisfied or
if a PDCP PDU having the value of RCVD_COUNT has been previously received,
a received PDCP Data PDU (a data part of the PDCP PDU) is discarded.

If the received PDCP PDU has not been discarded, the receiving PDCP entity (PDCP layer) may operate as follows.

If an integrity protection or authentication procedure is not configured (or a deciphering procedure is not performed),
deciphering is performed for the PDCP PDU by using the value of RCVD_COUNT.
A processed PDCP SDU is stored in a reception buffer.
If RCVD_COUNT>=RX_NEXT is satisfied,
RX_NEXT is updated into RCVD_COUNT+1.
If a non-sequential delivery indicator (outOfOrderDelivery) has been configured (if a non-sequential delivery operation is indicated),
the PDCP SDU is delivered to an upper layer.
If RCVD_COUNT is the same as RX_DELIV,
after header decompression is performed in case that header compression has not been cancelled, pieces of data are delivered to an upper layer in the order of COUNT values.
All of continuous PDCP SDUs, starting from the value of COUNT=RX_DELIV, are delivered to an upper layer.
An RX_DELIV value is updated to a COUNT value of a first PDCP SDU which has a COUNT value equal to or larger than RX_DELIV and has not been delivered to an upper layer.
If a t-Reordering timer is being operated and an RX_DELIV value is equal to or larger than RX_REORD,
the t-Reordering timer is stopped and reset.
If a t-Reordering timer is not being operated (including a case of a stop in the above-mentioned condition) and RX_DELIV is smaller than RX_NEXT, an RX_REORD value is updated to RX_NEXT.

The t-Reordering timer starts.

When a PDCP rearrangement timer (t-Reordering) expires, the receiving PDCP entity (PDCP layer) may operate as follows.

After header decompression is performed in case that header compression has not been cancelled, pieces of data are delivered to an upper layer in the order of COUNT values.

All of PDCP SDUs having COUNT values smaller than an RX_REORD value are delivered.

All of PDCP SDUs having continuous COUNT values, starting from an RX_REORD value, are delivered.

An RX_DELIV value is updated to a COUNT value of a first PDCP SDU which has a COUNT value equal to or larger than RX_REORD and has not been delivered to an upper layer.

If an RX_DELIV value is smaller than an RX_NEXT value, an RX_REORD value is updated to an RX_NEXT value.

A t-Reordering timer starts.

Figure 2H:
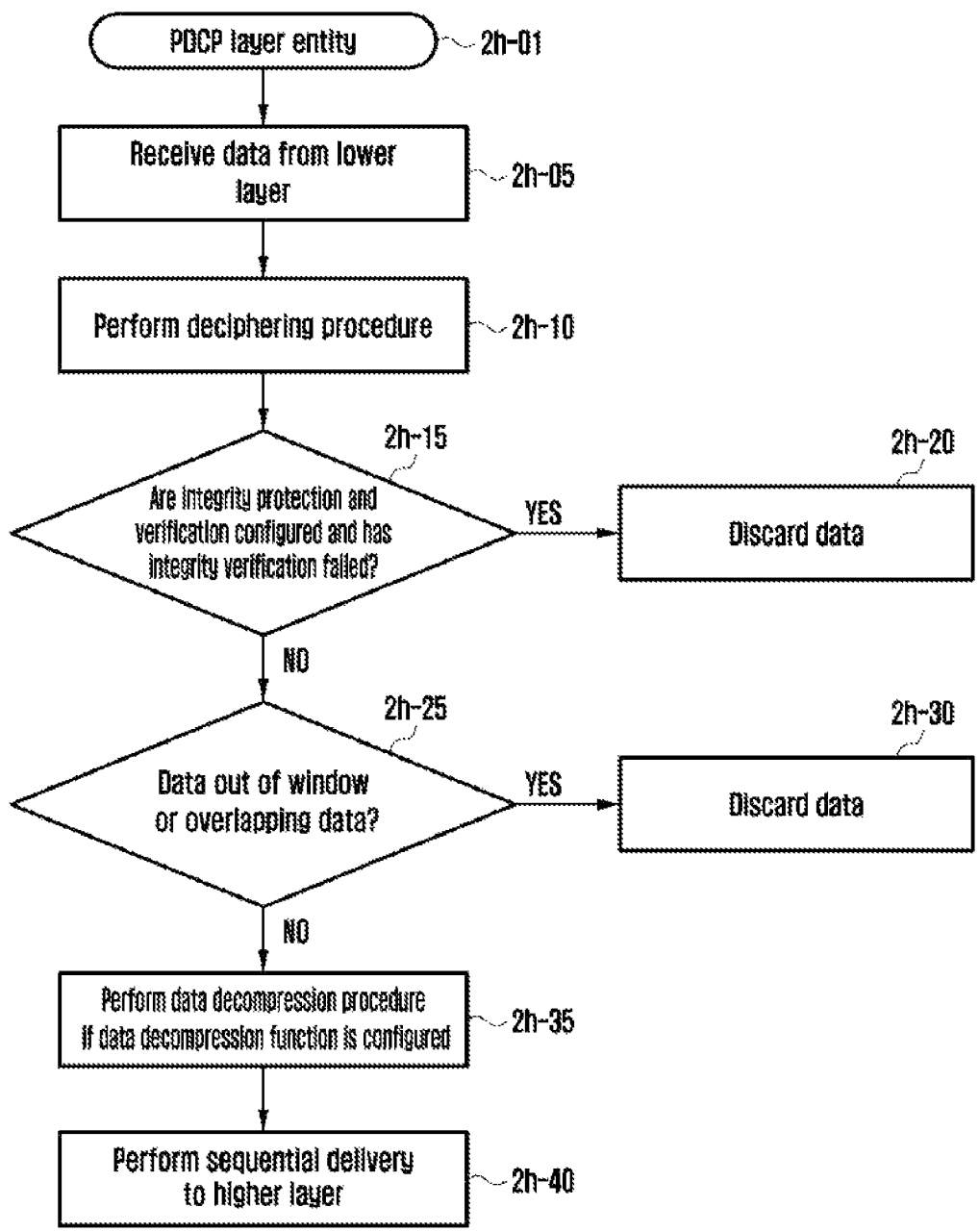
FIG. 2H illustrates a view showing a receiving a PDCP entity (PDCP layer) operation of a terminal, proposed by the disclosure.
Figure 21:
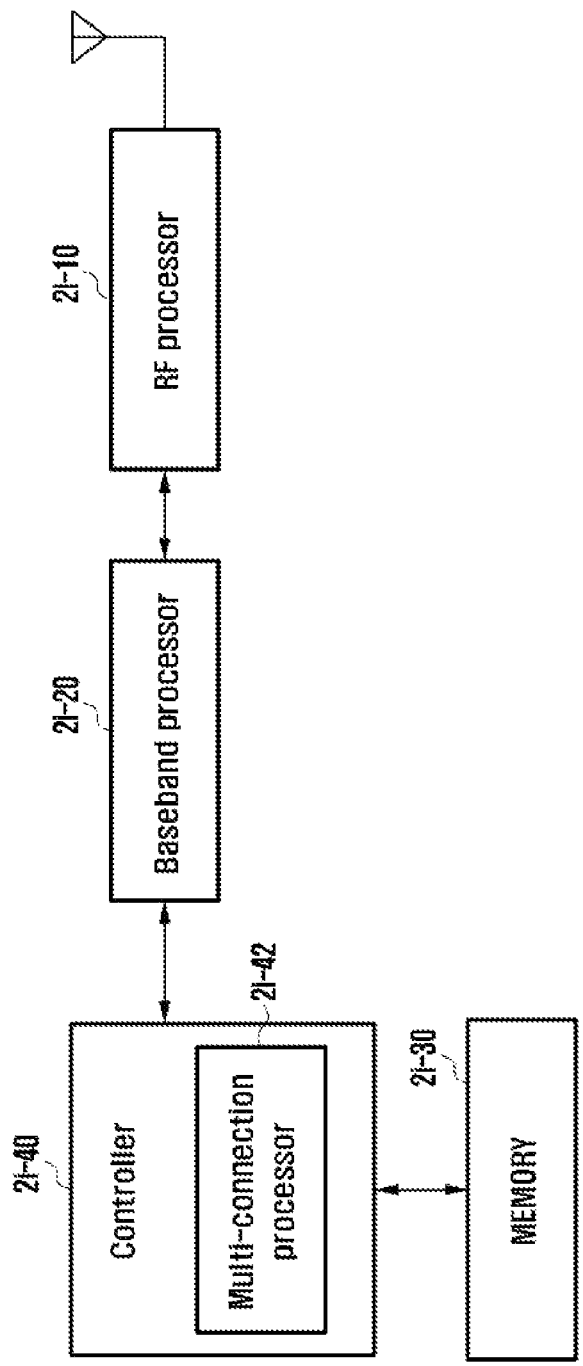

FIG. 2H illustrates a view showing a receiving PDCP entity (PDCP layer) operation of a terminal, proposed by the disclosure.

In embodiments of a receiving PDCP entity (PDCP layer), proposed by the disclosure, specifically, a receiving PDCP entity (PDCP layer) may receive data from a lower layer device (2H-05) and may perform a deciphering procedure for the data (2H-10).

In addition, if integrity protection is configured, a receiving PDCP entity (PDCP layer) may perform an integrity verification procedure for the data (2H-15).

Moreover, if integrity verification fails, a receiving PDCP entity (PDCP layer) may discard the data (2H-20).

If integrity verification is successful, a receiving PDCP entity (PDCP layer) may identify whether the data is out-of-window data or data which has been previously received successfully (2H-25).

If the data is out-of-window data or data which has been previously received successfully, a receiving PDCP entity (PDCP layer) may discard the data (2H-30).

Otherwise, in case that a header or data compression function is configured, a receiving PDCP entity (PDCP layer) may apply a decompression procedure (2H-35) and may sequentially deliver the data to an upper layer (2H-40).

FIG. 2I illustrates the structure of a terminal or a radio node to which embodiments are applicable.

Referring to FIG. 2I, the terminal includes a radio frequency (RF) processor 2I-10, a baseband processor 2I-20, a memory 2I-30, and a controller 2I-40.

The radio frequency (RF) processor 2I-10 performs a function of transmitting or receiving a signal through a radio channel, such as band conversion and amplification of a signal. That is, the RF processor 2I-10 up-converts a baseband signal provided from the baseband processor 2I-20 into an RF band signal and then transmits the baseband signal through an antenna, and down-converts the RF band signal received through the antenna into the baseband signal. For example, the RF processor 2I-10 may include a transmission filter, a reception filter, an amplifier, a mixer, an oscillator, a digital to analog convertor (DAC), an analog to digital convertor (ADC), or the like. FIG. 2I illustrates only one antenna but the terminal may include multiple antennas. In addition, the RF processor 2I-10 may include multiple RF chains. Moreover, the RF processor 2I-10 may perform beamforming. For the beamforming, the RF processor 2I-10 may adjust a phase and a size of each of signals transmitted or received through multiple antennas or antenna elements. Furthermore, the RF processor may perform a MIMO operation and receive multiple layers when the MIMO operation is performed. The RF processor 2I-10 may appropriately configure multiple antennas or antenna elements according to a control of the controller so as to perform reception beam sweeping, or may adjust the direction of a reception beam and a beam width such that a reception beam accords with a transmission beam.

The baseband processor 2I-20 performs a function for conversion between a baseband signal and a bitstream according to the physical layer standard of a system. For example, at the time of data transmission, the baseband processor 2I-20 produces complex symbols by encoding and modulating a transmission bitstream. In addition, at the time of data reception, the baseband processor 2I-20 restores a reception bitstream by demodulating and decoding a baseband signal provided from the RF processor 2I-10. For example, according to an orthogonal frequency division multiplexing (OFDM) scheme, at the time of data transmission, the baseband processor 2I-20 produces complex symbols by encoding and modulating a transmission bitstream, maps the complex symbols to subcarriers, and then configures OFDM symbols via an inverse fast Fourier transform (IFFT) operation and a cyclic prefix (CP) insertion. Moreover, at the time of data reception, the baseband processor 2I-20 divides a baseband signal provided from the RF processor 2I-10 into OFDM symbol units, restores signals mapped to subcarriers via a fast Fourier transform (FFT) operation, and then restores a reception bitstream via demodulation and decoding.

The baseband processor 2I-20 and the RF processor 2I-10 transmit and receive a signal, as described above. Accordingly, each of the baseband processor 2I-20 and the RF processor 2I-10 may be referred to as a transmitter, a receiver, a transceiver, or a communicator. In addition, at least one of the baseband processor 2I-20 or the RF processor 2I-10 may include multiple communication modules so as to support multiple different radio access technologies from each other. Moreover, at least one of the baseband processor 2I-20 and the RF processor 2I-10 may include different communication modules from each other to process signals of different frequency bands from each other. For example, the different radio access technologies from each other may include an LTE network, an NR network, and the like. Furthermore, the different frequency bands from each other may include a super-high frequency (SHF) (for example: 2.2 GHz and 2 GHz) band and a millimeter (mm) wave (for example: 60 GHz) band.

The memory 2I-30 stores data such as a basic program, an application program, and configuration information for operations of the terminal. The memory 2I-30 provides stored data according to a request from the controller 2I-40.

The controller 2I-40 controls overall operations of the terminal. For example, the controller 2I-40 transmits or receives a signal through the baseband processor 2I-20 and the RF processor 2I-10. In addition, the controller 2I-40 records and reads data to and from the memory 2I-30. To this end, the controller 2I-40 may include at least one processor. For example, the controller 2I-40 may include a communication processor (CP) for performs a control for communication and an application processor (AP), for controlling an upper layer such as an application program.

Figure 2J:
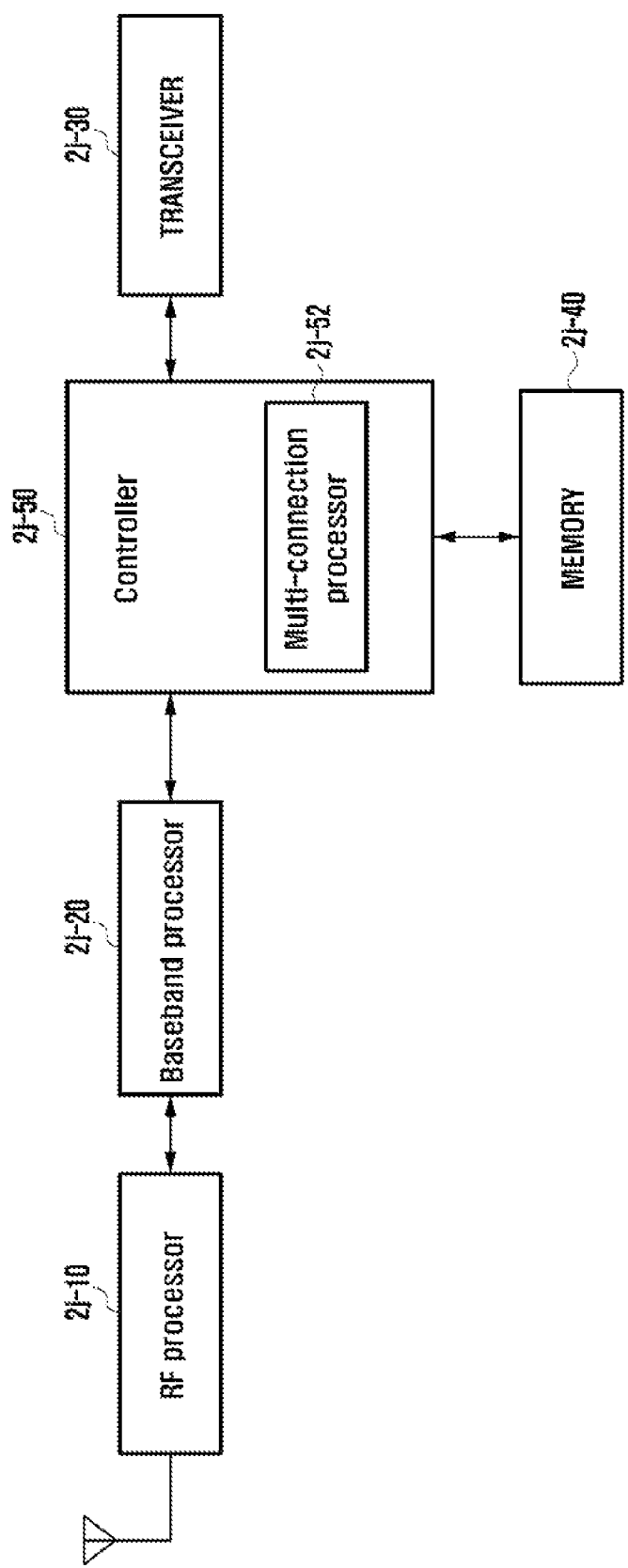
FIG. 2J illustrates a block diagram of the configuration of a TRP or a radio node in a radio communication system to which embodiments are applicable.

FIG. 2J illustrates a block diagram of the configuration of a TRP or a radio node in a radio communication system to which embodiments are applicable.

As illustrated in FIG. 2J, the base station is configured to include an RF processor 2J-10, a baseband processor 2J-20, a backhaul transceiver 2J-30, a memory 2J-40, and a controller 2J-50.

The radio frequency (RF) processor 2J-10 performs a function of transmitting or receiving a signal through a radio channel, such as band conversion and amplification of a signal. That is, the RF processor 2J-10 up-converts a baseband signal provided from the baseband processor 2J-20 into an RF band signal and then transmits the baseband signal through an antenna, and down-converts the RF band signal received through the antenna into the baseband signal. For example, the RF processor 2J-10 may include a transmission filter, a reception filter, an amplifier, a mixer, an oscillator, a DAC, an ADC, or the like. FIG. 2J illustrates only one antenna but the first access node may include multiple antennas. In addition, the RF processor 2J-10 may include multiple RF chains. Moreover, the RF processor 2J-10 may perform beamforming. For the beamforming, the RF processor 2J-10 may adjust a phase and a size of each of signals transmitted or received through multiple antennas or antenna elements. The RF processor may perform a downward MIMO operation by transmitting one or more layers.

The baseband processor 2J-20 performs a function for conversion between a baseband signal and a bitstream according to the physical layer standard of a first radio access technology. For example, at the time of data transmission, the baseband processor 2J-20 produces complex symbols by encoding and modulating a transmission bitstream. In addition, at the time of data reception, the baseband processor 2J-20 restores a reception bitstream by demodulating and decoding a baseband signal provided from the RF processor 2J-10. For example, according to an OFDM scheme, at the time of data transmission, the baseband processor 2J-20 produces complex symbols by encoding and modulating a transmission bitstream, maps the complex symbols to subcarriers, and then configures OFDM symbols via an IFFT operation and a CP insertion. Moreover, at the time of data reception, the baseband processor 2J-20 divides a baseband signal provided from the RF processor 2J-10 into OFDM symbol units, restores signals mapped to subcarriers via an FFT operation, and then restores a reception bitstream via demodulation and decoding. The baseband processor 2J-20 and the RF processor 2J-10 transmit and receive a signal, as described above. Accordingly, each of the baseband processor 2J-20 and the RF processor 2J-10 may be referred to as a transmitter, a receiver, a transceiver, a communicator, or a radio communicator.

The transceiver 2J-30 provides an interface for performing communication with other nodes in a network.

The memory 2J-40 stores data such as a basic program, an application program, and configuration information for operations of the main base station. In particular, the memory 2J-40 may store information on a bearer assigned to a connected terminal, a measurement result reported by a connected terminal, or the like. In addition, the memory 2J-40 may store information which is a criterion for determining whether to provide or interrupt multi-connection for a terminal. Moreover, the memory 2J-40 provides stored data according to a request from the controller 2J-50.

The controller 2J-50 controls overall operations of the main base station. For example, the controller 2J-50 transmits or receives a signal through the baseband processor 2J-20 and the RF processor 2J-10 or through the backhaul transceiver 2J-30. In addition, the controller 2J-50 records and reads data to and from the memory 2J-40. To this end, the controller 2J-50 may include at least one processor.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, from a first base station, a radio resource control (RRC) message for configuring a dual connectivity (DC) for the terminal, wherein the first base station operates as a master cell group (MCG) of the DC and a second base station operates as a secondary cell group (SCG) of the DC;
receiving, from the first base station, an RRC release message to suspend an RRC connection;
storing a configuration for the MCG and a configuration for the SCG in a terminal context, in case that the RRC connection is suspended;
receiving, from the first base station, an RRC resume message to resume the suspended RRC connection;
in case that the RRC resume message includes first information indicating to maintain the configuration for the SCG, maintaining the configuration for the SCG stored in the terminal context based on the first information; and
in case that the RRC resume message includes second information indicating to maintain a configuration for at least one secondary cell (SCell) of the MCG, maintaining the configuration for the at least one SCell of the MCG stored in the terminal context based on the second information.

2. The method of claim 1,
wherein the RRC resume message further includes third information indicating that an SCell of the MCG is to be activated, and
wherein the SCell of the MCG is activated based on the third information.

3. The method of claim 1, further comprising:
identifying whether an activation of the SCG is indicated by the RRC resume message, and
in case that the activation of the SCG is indicated by the RRC resume message, performing a random access procedure with the second base station.

4. The method of claim 1, further comprising:
transmitting, to the first base station, an RRC resume request message, wherein the RRC resume message is received, as a response to the RRC resume request message; and
performing a measurement based on measurement configuration information included in the RRC resume message.

5. A method performed by a first base station in a wireless communication system, the method comprising:
transmitting, to a terminal, a radio resource control (RRC) message for configuring a dual connectivity (DC) for the terminal, wherein the first base station operates as a master cell group (MCG) of the DC and a second base station operates as a secondary cell group (SCG) of the DC;
transmitting, to the terminal, an RRC release message to suspend an RRC connection; and
transmitting, to the terminal, an RRC resume message to resume the suspended RRC connection, the RRC resume message including first information indicating to maintain a configuration for the SCG which is stored in a terminal context based on suspension of the RRC connection and second information indicating to maintain a configuration for at least one secondary cell (SCell) of the MCG, wherein the configuration for the SCG is maintained in the terminal context, based on the first information included in the RRC resume message, and wherein the configuration for the at least one SCell of the MCG is maintained in the terminal context, based on the second information.

6. The method of claim 5, wherein the RRC resume message further includes third information indicating that an SCell of the MCG is to be activated, and wherein the SCell of the MCG is activated based on the third information.

7. The method of claim 5, wherein, in case that an activation of the SCG is indicated by the RRC resume message, a random access procedure is performed between the terminal and the second base station.

8. The method of claim 5, further comprising:

receiving, from the terminal, an RRC resume request message, wherein the RRC resume message is transmitted, as a response to the RRC resume request message, and wherein the RRC resume message further includes measurement configuration information.

9. A terminal in a wireless communication system, the terminal comprising:

a transceiver; and a controller configured to:

control the transceiver to receive, from a first base station, a radio resource control (RRC) message for configuring a dual connectivity (DC) for the terminal, wherein the first base station operates as a master cell group (MCG) of the DC and a second base station operates as a secondary cell group (SCG) of the DC, control the transceiver to receive, from the first base station, an RRC release message to suspend an RRC connection, store a configuration for the MCG and a configuration for the SCG in a terminal context, in case that the RRC connection is suspended, control the transceiver to receive, from the first base station, an RRC resume message to resume the suspended RRC connection, in case that the RRC resume message includes first information indicating to maintain the configuration for the SCG, maintain the configuration for the SCG stored in the terminal context based on the first information, and in case that the RRC resume message includes second information indicating to maintain a configuration for at least one secondary cell (SCell) of the MCG, maintain the configuration for the at least one SCell of the MCG stored in the terminal context based on the second information.

10. The terminal of claim 9, wherein the RRC resume message further includes third information indicating that an SCell of the MCG is to be activated, and wherein the SCell of the MCG is activated based on the third information.

11. The terminal of claim 9, wherein the controller is further configured to:

identify whether an activation of the SCG is indicated by the RRC resume message; and in case that the activation of the SCG is indicated by the RRC resume message, perform a random access procedure with the second base station.

12. The terminal of claim 9, wherein the controller is further configured to control the transceiver to transmit, to the first base station, an RRC resume request message, and perform a measurement based on measurement configuration information included in the RRC resume message, and wherein the RRC resume message is received, as a response to the RRC resume request message.

13. A first base station in a wireless communication system, the first base station comprising:

a transceiver; and a controller configured to:

control the transceiver to transmit, to a terminal, a radio resource control (RRC) message for configuring a dual connectivity (DC) for the terminal, wherein the first base station operates as a master cell group (MCG) of the DC and a second base station operates as a secondary cell group (SCG) of the DC, control the transceiver to transmit, to the terminal, an RRC release message to suspend an RRC connection, and control the transceiver to transmit, to the terminal, an RRC resume message to resume the suspended RRC connection, the RRC resume message including first information indicating to maintain a configuration for the SCG which is stored in a terminal context based on suspension of the RRC connection and second information indicating to maintain a configuration for at least one secondary cell (SCell) of the MCG, wherein the configuration for the SCG is maintained in the terminal context, based on the first information included in the RRC resume message, and wherein the configuration for the at least one SCell of the MCG is maintained in the terminal context, based on the second information.

14. The first base station of claim 13, wherein the RRC resume message further includes third information indicating that an SCell of the MCG is to be activated, and wherein the SCell of the MCG is activated based on the third information.

15. The first base station of claim 13, wherein, in case that an activation of the SCG is indicated by the RRC resume message, a random access procedure is performed between the terminal and the second base station.

16. The first base station of claim 13, wherein the controller is further configured to control the transceiver to receive, from the terminal, an RRC resume request message and to transmit the RRC resume message as a response to the RRC resume request message, and wherein the RRC resume message further includes measurement configuration information.

* * * * *